United States Patent
Shimada et al.

[11] Patent Number: 6,119,065
[45] Date of Patent: Sep. 12, 2000

[54] PEDESTRIAN INFORMATION PROVIDING SYSTEM, STORAGE UNIT FOR THE SAME, AND PEDESTRIAN INFORMATION PROCESSING UNIT

[75] Inventors: Takanori Shimada, Funabashi; Akihiro Abe, Yokohama; Nobuhiro Kambe, Suginami-ku, all of Japan

[73] Assignee: Matsushita Electric Industrial Co., Ltd., Osaka, Japan

[21] Appl. No.: 09/029,845

[22] PCT Filed: Jul. 9, 1997

[86] PCT No.: PCT/JP97/02382

§ 371 Date: Mar. 9, 1998

§ 102(e) Date: Mar. 9, 1998

[87] PCT Pub. No.: WO98/01843

PCT Pub. Date: Jan. 15, 1998

[30]  Foreign Application Priority Data

| Jul. 9, 1996 | [JP] | Japan | 8-196976 |
| Mar. 18, 1997 | [JP] | Japan | 9-083421 |
| May 15, 1997 | [JP] | Japan | 9-139098 |

[51] Int. Cl.[7] .......... G06F 165/00; G01C 21/00; G09B 29/00
[52] U.S. Cl. .......... 701/201; 340/944
[58] Field of Search .......... 701/201, 202, 701/208, 209, 211, 300; 340/944

[56]  References Cited

U.S. PATENT DOCUMENTS

| 4,991,126 | 2/1991 | Reiter et al. | 364/561 |
| 5,470,233 | 11/1995 | Fruchterman et al. | 434/112 |
| 5,842,145 | 11/1998 | Zimmer | 701/201 |
| 5,908,465 | 6/1999 | Ito et al. | 701/211 |

FOREIGN PATENT DOCUMENTS

| 6-19276 | 3/1994 | Japan . |
| 8-68643 | 3/1996 | Japan . |
| 8-202982 | 8/1996 | Japan . |
| 9-62998 | 3/1997 | Japan . |
| 9-220266 | 8/1997 | Japan . |

Primary Examiner—Michael J. Zanelli
Attorney, Agent, or Firm—McDermott, Will & Emery

[57] ABSTRACT

A system for providing information on a route for pedestrians. The system comprises a storage unit, which stores a data on area divided to a non-pedestrian area and a pedestrian area, a data on street, i.e. a region where pedestrians can walk in each of the areas, a data of block where pedestrians cannot walk in each of the areas, an index for searching the block or the street from an address or a name, and a table describing areas belonging to each section on a map, and a pedestrian information processing unit, which comprises an input/output control unit for receiving input from a user, a pedestrian map data searching unit for acquiring a pedestrian map data suitable for inputting from the storage unit, and a pedestrian route searching unit for searching a route for pedestrians using the acquired data. The system can quickly provide the user with pedestrian route information suitable for pedestrians and walking conditions.

43 Claims, 117 Drawing Sheets

|  | PEDESTRIAN AREA | NON-PEDESTRIAN AREA |
|---|---|---|
| BLOCK | BUILDING | RIVER SYSTEM, SPACE, ROAD WITH WIDER WIDTH |
| STREET | SIDEWALK, ROAD | BRIDGE, PEDESTRIANS' CROSSING, FOOTBRIDGE, ELEVATOR, ESCALATOR |

ARRANGEMENT OF PEDESTRIAN MAP DATA

FIG. 9

| EXAMPLE OF PEDESTRIAN AREA DATA | |
|---|---|
| AREA ID | 35a |
| AREA NAME | null |
| AREA ATTRIBUTE | STREET |
| SLAVE BLOCK | 470b, 471b, 472b, 473b, 474b |
| SLAVE STREET | 11723st, 11724st, 11725st, 11727st |
| ENTRANCE/EXIT | 11725st-s, 11727st-s, |
| ADJACENT AREA | 32a, 34a, 36a, 39a |
| MASTER BLOCK | null |
| CORRESPONDING MAP | Map-23 |
| ADMINISTRATIVE REGION | 23, 4-CHOME, SHINAGAWA-KU, TOKYO |
| TOWN INFORMATION | TOWN-34 |
| RECTANGULAR INFORMATION | ((15, 23), (45, 52) ... ) |

| | |
|---|---|
| AREA ID | 36a |
| AREA NAME | null |
| AREA ATTRIBUTE | STREET |
| SLAVE BLOCK | 475b, 476b, 477b, 478b, 479b, 480b, 481b |
| SLAVE STREET | 11732st, 11733st, 11734st, 11736st |
| ENTRANCE/EXIT | 11733st-e, 11735st-e, |
| ADJACENT AREA | 34a, 35a, 37a |
| MASTER BLOCK | null |
| CORRESPONDING MAP | Map-23 |
| ADMINISTRATIVE REGION | 24, 4-CHOME, SHINAGAWA-KU, TOKYO |
| TOWN INFORMATION | TOWN-35 |
| RECTANGULAR INFORMATION | ((16, 23), (45, 52) ... ) |

ARRANGEMENT OF NAME SEARCH TREE

ARRANGEMENT OF ADDRESS SEARCH TREE

FIG. 13

MAP-AREA CORRESPONDENCE TABLE

| MAP NO. | AREA NO. |
|---|---|
| 5637-24-23 | AREA 2233, AREA 2234, AREA 2235, AREA 2355, AREA 2356 |
| 5637-24-24 | AREA 2423, AREA 2424, AREA 2425, AREA 2425, AREA 2486 |

FIG. 14

EXAMPLE OF TOWN TABLE

TOWN-34
------------------------------------------------------------

| CITY HALL | BLOCK 22 |
|---|---|
| FIRE DEPARTMENT | null |
| . . . . | |
| POST OFFICE | null |
| . . . . | |

TOWN-35
------------------------------------------------------------

| POLICE BOX | BLOCK 43 |
|---|---|
| CITY HALL | null |
| FIRE DEPARTMENT | null |
| . . . . | |
| POST OFFICE | BLOCK 53 |
| . . . . | |

1-50, 6-CHOME, HONCHO, FUNABASHI CITY, CHIBA PREFECTURE
TYPE OF SEARCHED DATA: BLOCK
CLASSIFICATION OF SEARCHING: SEARCHING OF ADDRESS

PREFECTURE     : CHIBA PREFECTURE
MUNICIPALITY   : FUNABASHI CITY
REGION         : 6-CHOME, HONCHO
STREET NUMBER  : 1
HOUSE NUMBER   : 50

FIG. 19

EAST LONGITUDE 137° 22′ 23″

NORTH LATITUDE 37° 42′ 27″

TYPE OF SEARCHED DATA: BLOCK

FIG. 20

EXAMPLE OF BLOCK b1248 DATA

| | |
|---|---|
| BLOCK NUMBER | b1248 |
| NAME | HACHIKOU |
| AREA NUMBER | a443 |
| CONNECTING STREET | ST33345 |
| MAP NUMBER | Map153 |
| ADDRESS | 1-50, 6-CHOME, HONCHO, FUNABASHI CITY, CHIBA PREFECTURE |
| LATITUDE/LONGITUDE | E 135° 26′ 35″ 35° 22′ 45″, |
| BLOCK ATTRIBUTE | BUILDING |
| 3-DIMENSIONAL INFORMATION | . . . . . . . . . . . . . . . . . |
| RECTANGULAR INFORMATION | ( (15,23) , (45,52) . . . ) |

NAME: HACHIKOU

TYPE OF SEARCHED DATA: BLOCK

PRESENT POSITION: EAST LONGITUDE 137° 22' 23"
NORTH LATITUDE 37° 42' 27"
INPUT ATTRIBUTE: LATITUDE/LONGITUDE
ITEM TO BE SEARCHED: POST OFFICE
ATTRIBUTE OF ITEM TO BE SEARCHED: NAME
TYPE OF SEARCHED DATA: BLOCK

FIG. 26

1. USER CATEGORY
   WOMAN   ○
   BAGGAGE ×
2. DEPARTURE POINT: SHINAGAWA BUILDING
3. DESTINATION: LANDMARK TOWER, YOKOHAMA
4. TIME: 16:35
5. WEATHER: RAIN
6. INDEX: DISTANCE

FIG. 27

USER CATEGORY TABLE

| USER | 1 | 2 | 3 | 4 | 5 | 6 |
|---|---|---|---|---|---|---|
| GROUP | ROAD WIDTH | CROWDEDNESS OF PEDESTRIANS | VEHICLE TRAFFIC DENSITY | OBSTACLES | | |
| SALESMAN | TIME | FATIGUE | SCHEDULE | | | |
| BLIND PERSON | PLATE FOR BLIND | PAVEMENT | CROWDEDNESS OF PEDESTRIANS | VEHICLE TRAFFIC DENSITY | TRAFFIC SIGNAL FOR BLIND | OBSTACLES |
| WHEELCHAIR | ROAD WIDTH | PAVEMENT | CROWDEDNESS OF PEDESTRIANS | VEHICLE TRAFFIC DENSITY | OBSTACLES | |
| WOMAN | STREET LIGHT | SHOP | VEHICLE TRAFFIC DENSITY | CROWDEDNESS OF PEDESTRIANS | POLICE BOX | |
| ELDERLY PEOPLE | ROAD SURFACE | CROWDEDNESS OF PEDESTRIANS | VEHICLE TRAFFIC DENSITY | OBSTACLES | | |
| CARRIER | ROAD SURFACE | CROWDEDNESS OF PEDESTRIAN | ROAD WIDTH | | | |
| ACCOMPANIED WITH PET | PAVEMENT | ROADSIDE TREE | CROWDEDNESS OF PEDESTRIANS | VEHICLE TRAFFIC DENSITY | | |
| ACCOMPANIED WITH INFANT | ROAD WIDTH | PAVEMENT | CROWDEDNESS OF PEDESTRIANS | VEHICLE TRAFFIC DENSITY | | |
| CARRYING BAGGAGE | ROAD SURFACE | DISTANCE | | | | |
| BICYCLE | ROAD WIDTH | PAVEMENT | CROWDEDNESS OF PEDESTRIANS | VEHICLE TRAFFIC DENSITY | OBSTACLES | |
| SMOKER | ASH TRAY | SMOKING AREA | CIGARETTE END DISPOSAL CASE | | | |

FIG. 28

| WEATHER | 1 | 2 | 3 | 4 | 5 | 6 |
|---|---|---|---|---|---|---|
| RAIN : | UNDERGROUND PASSAGE | COVERING | ROADSIDE DITCH | VEHICLE TRAFFIC DENSITY | PEDESTRIAN CROWDEDNESS | |
| FINE : | UNDERGROUND PASSAGE | COVERING | BUILDING HEIGHT | SHADY SPOT | SUNNY PLACE | |
| WIND : | BUILDING | COVERING | UNDERGROUND PASSAGE | | | |
| ... | | | | | | |

| TIME | 1 | 2 | 3 | 4 | 5 | 6 |
|---|---|---|---|---|---|---|
| DAYTIME : | SUNLIGHT | VEHICLE TRAFFIC DENSITY | | | | |
| NIGHTTIME: | STREET LIGHT | PEDESTRIAN CROWDEDNESS | VEHICLE TRAFFIC DENSITY | | | |

FIG. 29

STREET ATTRIBUTE DETERMINED ACCORDING TO INPUT AND REFERRED DURING ROUTE SEARCHING AND PRIORITY RANK OF ATTRIBUTE

ATTRIBUTE: STREET LIGHT, SHOP OPEN TILL LATE AT NIGHT, POLICE BOX, AVOIDANCE OF PARK AND PARKING AREA, HIGH PEDESTRIANS CROWDEDNESS >3 (PERSON/$M^2$)HIGH VEHICLE TRAFFIC DENSITY (20/MIN.)

RANK: PEDESTRIAN CROWDEDNESS, VEHICLE TRAFFIC DENSITY, STREET LIGHT, SHOP, POLICE BOX

FIG. 31

| ATTRIBUTE | : INPUT Xi |
|---|---|
| GROUP | : 0 |
| SALESMAN | : 0 |
| BLIND PERSON | : 0 |
| WHEELCHAIR | : 0 |
| WOMAN | : 1 |
| ELDERLY PEOPLE | : 0 |
| CARRIER | : 0 |
| ACCOMPANIED WITH PET | : 0 |
| ACCOMPANIED WITH INFANT | : 0 |
| ACCOMPANIED WITH BAGGAGE | : 0 |
| BICYCLE | : 0 |
| SMOKER | : 0 |
| ⋮ | |
| RAIN | : 0 |
| FINE WEATHER | : 0 |
| WIND | : 0 |
| MORNING | : 0 |
| NOON | : 0 |
| EVENING, NIGHT | : 1 |

FIG. 32

WEIGHT CONSTANT OF INPUT/OUTPUT

| | | \multicolumn{10}{c}{OUTPUT} | |
|---|---|---|---|---|---|---|---|---|---|---|---|
| | | 1 | 2 | 3 | 4 | 5 | 6 | 7 | 8 | 9 | 10 | .... |
| | 1 | 0.8 | 0.3 | 0.1 | 0.2 | 0.2 | 0.9 | 0.4 | 0.5 | 0.6 | 0.7 |
| | 2 | 0.3 | 0.1 | 0.2 | 0.2 | 0.9 | 0.4 | 0.5 | 0.6 | 0.7 | 0.8 |
| | 3 | 0.1 | 0.2 | 0.2 | 0.9 | 0.4 | 0.5 | 0.6 | 0.7 | 0.8 | 0.3 |
| INPUT | 4 | 0.2 | 0.2 | 0.9 | 0.4 | 0.5 | 0.6 | 0.7 | 0.8 | 0.3 | 0.1 |
| | 5 | 0.2 | 0.9 | 0.4 | 0.5 | 0.6 | 0.7 | 0.8 | 0.3 | 0.1 | 0.2 |
| | 6 | 09 | 0.4 | 0.5 | 0.6 | 0.7 | 0.8 | 0.3 | 0.1 | 0.2 | 0.2 |
| | 7 | 0.9 | 0.4 | 0.5 | 0.6 | 0.7 | 0.8 | 0.3 | 0.2 | 0.2 | 0.1 |
| | 8 | 0.6 | 0.9 | 0.4 | 0.5 | 0.7 | 0.8 | 0.3 | 0.2 | 0.2 | 0.1 |
| | 9 | 0.8 | 0.3 | 0.2 | 0.2 | 0.1 | 0.6 | 0.9 | 0.4 | 0.5 | 0.7 |
| | 10 | 0.2 | 0.2 | 0.1 | 0.6 | 0.9 | 0.8 | 0.3 | 0.4 | 0.5 | 0.7 |
| | ⋮ | | | | | | | | | | |

FIG. 33

EXAMPLE OF OUTPUT

| ATTRIBUTE | : OUTPUT Yj | : OUTPUT Yj' | PRIORITY RANK |
|---|---|---|---|
| ROAD WIDTH | : 0 | : 0.2 | |
| PAVEMENT | : 0 | : 0.11 | |
| ROADSIDE TREE | : 0 | : 0.44 | |
| STREET LIGHT | : 1 | : 0.94 | 1 |
| ROAD SURFACE CONDITION | : 0 | : 0.09 | |
| MANHOLE | : 0 | : 0.23 | |
| PLATE FOR BLIND | : 0 | : 0.34 | |
| TRAFFIC SIGNAL FOR BLIND | : 0 | : 0.33 | |
| AUTOMATIC VENDING MACHINE | : 0 | : 0.19 | |
| BICYCLE | : 0 | : 0.39 | |
| CROWDEDNESS | : 1 | : 0.82 | 3 |
| . . | | | |
| HEIGHT OF BUILDING | : 0 | : 0.24 | |
| SUNNY PLACE | : 0 | : 0.37 | |
| ROADSIDE DITCH | : 0 | : 0.29 | |
| . | | | |
| COVERING | : 0 | : 0.22 | |
| UNDERGROUND PASSAGE | : 0 | : 0.14 | |
| VEHICLE TRAFFIC DENSITY | : 1 | : 0.85 | 2 |

FIG. 36

INPUT (EXAMPLE)
DEPARTURE POINT  : JR LINE ROPPONGI STATION
INPUT ATTRIBUTE  : NAME
DESTINATION      : ROPPONGI MURASAKI
INPUT ATTRIBUTE  : NAME
INPUTTER         : A 72-YEAR-OLD WOMAN
PURPOSE          : ROUTE SEARCHING TO DESTINATION

FIG. 37A

EXAMPLE OF AREA DATA (1) AREA ID : 32a
    AREA ATTRIBUTE : STREET
    SLAVE BLOCK : 390b, 391b, 392b, 393b, 394b
    SLAVE STREET : 11692st, 11693st
    ENTRANCE/EXIT : 11894
    ADJACENT AREA : 35a
    MASTER BLOCK : null
    CORRESPONDING MAP : Map-23
    ADMINISTRATIVE REGION : 25, 4-CHOME, SHINAGAWA-KU, TOKYO (2) AREA ID : 34a
    AREA ATTRIBUTE : UNDERGROUND SHOPPING CENTER
    SLAVE BLOCK : 410b, 411b, 412b, 413b, 414b
    SLAVE STREET : 11714st, 11715st, 11717st, 11718st
    ENTRANCE/EXIT :
    ADJACENT AREA : 35a, 36a
    MASTER BLOCK : null
    CORRESPONDING MAP : Map-23
    ADMINISTRATIVE REGION : 25, 4-CHOME, SHINAGAWA-KU, TOKYO (3) AREA ID : 35a
    AREA ATTRIBUTE : STREET
    SLAVE BLOCK : 420b, 421b, 422b, 423b, 424b
    SLAVE STREET : 11720st, 11721st, 11722st, 11723st, 11724st, 11725st, 11727st
    ENTRANCE/EXIT : 11894, 11892, 11824
    ADJACENT AREA : 32a, 34a, 36a, 39a
    MASTER BLOCK : null
    CORRESPONDING MAP : Map-23
    ADMINISTRATIVE REGION : 23, 4-CHOME, SHINAGAWA-KU, TOKYO

FIG. 37B (4) AREA ID : 36a
   AREA ATTRIBUTE : STREET
   SLAVE BLOCK : 430b, 431b, 432b, 433b, 434b
   SLAVE STREET : 11732st, 11733st, 11734st
   11736st, 11737st

ENTRANCE/EXIT : 11726st, 11735st, 11736st, 11827st
   ADJACENT AREA : 34a, 35a, 37a, 39a
   MASTER BLOCK : null
   CORRESPONDING MAP : Map-23
   ADMINISTRATIVE REGION : 24, 4-CHOME, SHINAGAWA-KU, TOKYO (5) AREA ID : 37a
   AREA ATTRIBUTE : STREET
   SLAVE BLOCK : 440b, 441b, 442b, 443b, 444b
   SLAVE STREET : 11741st, 11744st, 11745st
   11747st, 11748st ENTRANCE/EXIT : 11744st-e, 11745st-e, 11747st-e
   ADJACENT AREA : 36a, 39a
   MASTER BLOCK : null
   CORRESPONDING MAP : Map-23
   ADMINISTRATIVE REGION : 25, 4-CHOME, SHINAGAWA-KU, TOKYO

FIG. 37C (6) AREA ID : 38a
AREA ATTRIBUTE : RIVER SYSTEM
SLAVE BLOCK :
SLAVE STREET : 11892st, 11894st, 11895st, 11824st, 11826st, 11827st, 11836st, 11835st, 11847st, 11847st, 11848st, 11897st
ENTRANCE/EXIT :
ADJACENT AREA : 32a, 34a, 35a, 36a, 37a, 39a
MASTER BLOCK : null
CORRESPONDING MAP : Map-23
ADMINISTRATIVE REGION : 25, 4-CHOME, SHINAGAWA-KU, TOKYO (7) AREA ID : 39a
AREA ATTRIBUTE : STREET
SLAVE BLOCK : 490b, 491b, 492b, 493b, 494b
SLAVE STREET : 11792st, 11794st, 11795st, 11797st, 11798st,
ENTRANCE/EXIT : 11895, 11897, 11847, 11848
ADJACENT AREA : 35a, 36a, 37a
MASTER BLOCK : null
CORRESPONDING MAP : Map-23
ADMINISTRATIVE REGION : 25, 4-CHOME, SHINAGAWA-KU, TOKYO

FIG. 38A (8)  AREA ID                 : 1037a
     AREA ATTRIBUTE          : FLOOR
     SLAVE BLOCK             : 110b, 115b
     SLAVE STREET            : 21734st, 21735st
     ENTRANCE/EXIT           : 22800st, 11734st
     ADJACENT AREA           : 1038a
     MASTER BLOCK            : 100b
     CORRESPONDING MAP       : Map-23
     ADMINISTRATIVE REGION   : 25, 4-CHOME, CHUOU-KU, TOKYO (9)  AREA ID                 : 1038a
     AREA ATTRIBUTE          : FLOOR
     SLAVE BLOCK             : 120b, 125b
     SLAVE STREET            : 22734st, 22735st
     ENTRANCE/EXIT           : 22800st, 22810st
     ADJACENT AREA           : 1037a, 1039a
     MASTER BLOCK            : 100b
     CORRESPONDING MAP       : Map-23
     ADMINISTRATIVE REGION   : 25, 4-CHOME, CHUOU-KU, TOKYO

(10) AREA ID                 : 1039a
     AREA ATTRIBUTE          : FLOOR
     SLAVE BLOCK             : 130b, 135b
     SLAVE STREET            : 23734st, 23735st
     ENTRANCE/EXIT           : 22810st
     ADJACENT AREA           : 1039a
     MASTER BLOCK            : 100b
     CORRESPONDING MAP       : Map-23
     ADMINISTRATIVE REGION   : 25, 4-CHOME, CHUOU-KU, TOKYO

FIG. 38B

(11) AREA ID : 2038a
AREA ATTRIBUTE : SPACE
SLAVE BLOCK :
SLAVE STREET : 22800st
ENTRANCE/EXIT :
ADJACENT AREA : 1037a, 1038a
MASTER BLOCK : 100b
CORRESPONDING MAP : Map-23
ADMINISTRATIVE REGION : 25, 4-CHOME, CHUOU-KU, TOKYO

(12) AREA ID : 2039a
AREA ATTRIBUTE : SPACE
SLAVE BLOCK :
SLAVE STREET : 22800st
ENTRANCE/EXIT :
ADJACENT AREA : 1038a, 1039a
MASTER BLOCK : 100b
CORRESPONDING MAP : Map-23
ADMINISTRATIVE REGION : 25, 4-CHOME, CHUOU-KU, TOKYO

FIG. 38C

(13) AREA ID : 4001a
    AREA ATTRIBUTE : STREET
    SLAVE BLOCK : 432b
    SLAVE STREET : 42800st
    ENTRANCE/EXIT :
    ADJACENT AREA : 4000a, 4039a
    MASTER BLOCK :
    CORRESPONDING MAP : Map-39
    ADMINISTRATIVE REGION : OOIMINAMI, SHINAGAWA-KU, TOKYO

(14) AREA ID : 5002a
    AREA ATTRIBUTE : AIRPORT
    SLAVE BLOCK : 534b
    SLAVE STREET : 58800st
    ENTRANCE/EXIT :
    ADJACENT AREA : 5083a, 5094a
    MASTER BLOCK :
    CORRESPONDING MAP : Map-53
    ADMINISTRATIVE REGION : HANEDA, OHTA-KU, TOKYO

FIG. 39A

EXAMPLE OF BLOCK DATA (1) BLOCK ID : 420b
BLOCK NAME : JR ROPPONGI STATION
MASTER AREA : 35a
SLAVE AREA : null
BLOCK ATTRIBUTE : BUILDING
CONNECTING STREET NO. : 11723st
CORRESPONDING MAP : Map-23
COORDINATES : (135.2, 35.1)
ADDRESS : 23-12, 4-CHOME, SHINAGAWA-KU, TOKYO (2) BLOCK ID : 443b
BLOCK NAME : ROPPONGI MURASAKI
MASTER AREA : 37a
SLAVE AREA : null
BLOCK ATTRIBUTE : BUILDING
CONNECTING STREET NO. : 11747st
CORRESPONDING MAP : Map-23
COORDINATES : (134.0, 35.2)
ADDRESS : 23-14, 4-CHOME, SHINAGAWA-KU, TOKYO (3) BLOCK ID : 444b
BLOCK NAME : ROPPONGI KIMIDORI
MASTER AREA : 37a
SLAVE AREA : null
BLOCK ATTRIBUTE : BUILDING
CONNECTING STREET NO. : 11741st
CORRESPONDING MAP : Map-23
COORDINATES : (134.0, 35.2)
ADDRESS : 23-14, 4-CHOME, SHINAGAWA-KU, TOKYO

FIG. 39B (4) BLOCK ID : 431b
    BLOCK NAME : ROPPONGI DAIDAI
    MASTER AREA : 36a
    SLAVE AREA : null
    BLOCK ATTRIBUTE : BUILDING
    CONNECTING STREET NO. : 11731st
    CORRESPONDING MAP : Map-23
    COORDINATES : (134.0, 35.2)
    ADDRESS : 23-14, 4-CHOME, SHINAGAWA-KU, TOKYO (5) BLOCK ID : 491b
    BLOCK NAME : ROPPONGI MIZUIRO
    MASTER AREA : 39a
    SLAVE AREA : null
    BLOCK ATTRIBUTE : BUILDING
    CONNECTING STREET NO. : 11795st
    CORRESPONDING MAP : Map-23
    COORDINATES : (134.0, 35.2)
    ADDRESS : 23-14, 4-CHOME, SHINAGAWA-KU, TOKYO (6) BLOCK ID : 391b
    BLOCK NAME : ROPPONGI MOMOIRO
    MASTER AREA : 32a
    SLAVE AREA : null
    BLOCK ATTRIBUTE : BUILDING
    CONNECTING STREET NO. : 11692st
    CORRESPONDING MAP : Map-23
    COORDINATES : (134.0, 35.2)
    ADDRESS : 23-14, 4-CHOME, SHINAGAWA-KU, TOKYO

FIG. 40A (7) BLOCK ID : 240b
    BLOCK NAME : AOMONO YOKOCHO STATION, KEIHIN EXPRESS
    MASTER AREA : 27a
    SLAVE AREA : null
    BLOCK ATTRIBUTE : BUILDING
    CONNECTING STREET NO. : 12447st
    CORRESPONDING MAP : Map-03
    COORDINATES : (135.2, 35.1)
    ADDRESS : 23-12, 4-CHOME, SHINAGAWA-KU, TOKYO (8) BLOCK ID : 250b
    BLOCK NAME : SHINAGAWA MURASAKI
    MASTER AREA : 27a
    SLAVE AREA : null
    BLOCK ATTRIBUTE : BUILDING
    CONNECTING STREET NO. : 12423st
    CORRESPONDING MAP : Map-03
    COORDINATES : (135.2, 35.1)
    ADDRESS : 23-12, 4-CHOME, SHINAGAWA-KU, TOKYO (9) BLOCK ID : 260b
    BLOCK NAME : ROPPONGI STATION, HIBIYA LINE
    MASTER AREA : 34a
    SLAVE AREA : null
    BLOCK ATTRIBUTE : BUILDING
    CONNECTING STREET NO. : 11711st
    CORRESPONDING MAP : Map-23
    COORDINATES : (135.2, 35.1)
    ADDRESS : 23-12, 4-CHOME, SHINAGAWA-KU, TOKYO

FIG. 40B

(10) BLOCK ID             : 100b
    BLOCK NAME           : TBS
    MASTER AREA          : 36a
    SLAVE AREA           : 1037a,1038a,1039a
    BLOCK ATTRIBUTE      : BUILDING
    CONNECTING STREET NO.: 11734st
    CORRESPONDING MAP    : Map-23
    COORDINATES          : (135.2, 35.1)
    ADDRESS              : 1-CHOME, CHUOU-KU, TOKYO

(11) BLOCK ID             : 110b
    BLOCK NAME           : TBS STUDIO 01
    MASTER AREA          : 1037a
    SLAVE AREA           : null
    BLOCK ATTRIBUTE      : BUILDING
    CONNECTING STREET NO.: 21734st
    CORRESPONDING MAP    : Map-23
    COORDINATES          : (135.2, 35.1)
    ADDRESS              : 1-CHOME, CHUOU-KU, TOKYO

(12) BLOCK ID             : 115b
    BLOCK NAME           : TBS STUDIO 02
    MASTER AREA          : 1037a
    SLAVE AREA           : null
    BLOCK ATTRIBUTE      : BUILDING
    CONNECTING STREET NO.: 21735st
    CORRESPONDING MAP    : Map-23
    COORDINATES          : (135.2, 35.1)
    ADDRESS              : 1-CHOME, CHUOU-KU, TOKYO

FIG. 41A

(13)  BLOCK ID              : 120b
      BLOCK NAME            : TBS STUDIO 03
      MASTER AREA           : 1038a
      SLAVE AREA            : null
      BLOCK ATTRIBUTE       : BUILDING
      CONNECTING STREET NO. : 22734st
      CORRESPONDING MAP     : Map-23
      COORDINATES           : (135.2, 35.1)
      ADDRESS               : 1-CHOME, CHUOU-KU, TOKYO

(14)  BLOCK ID              : 125b
      BLOCK NAME            : TBS STUDIO 04
      MASTER AREA           : 1038a
      SLAVE AREA            : null
      BLOCK ATTRIBUTE       : BUILDING
      CONNECTING STREET NO. : 22735st
      CORRESPONDING MAP     : Map-23
      COORDINATES           : (135.2, 35.1)
      ADDRESS               : 1-CHOME, CHUOU-KU, TOKYO

(15)  BLOCK ID              : 130b
      BLOCK NAME            : TBS STUDIO 05
      MASTER AREA           : 1039a
      SLAVE AREA            : null
      BLOCK ATTRIBUTE       : BUILDING
      CONNECTING STREET NO. : 23734st
      CORRESPONDING MAP     : Map-23
      COORDINATES           : (135.2, 35.1)
      ADDRESS               : 1-CHOME, CHUOU-KU, TOKYO

FIG. 41B

(16) BLOCK ID : 135b
    BLOCK NAME : TBS STUDIO 06
    MASTER AREA : 1039a
    SLAVE AREA : null
    BLOCK ATTRIBUTE : BUILDING
    CONNECTING STREET NO. : 22735st
    CORRESPONDING MAP : Map-23
    COORDINATES : (135.2, 35.1)
    ADDRESS : 1-CHOME, CHUOU-KU, TOKYO

(17) BLOCK ID : 432b
    BLOCK NAME : SHINAGAWA PORT
    MASTER AREA : 4001a
    SLAVE AREA : null
    BLOCK ATTRIBUTE : BUILDING
    CONNECTING STREET NO. : 43275st
    CORRESPONDING MAP : Map-39
    COORDINATES : (135.2, 35.1)
    ADDRESS : OOIMINAMI, SHINAGAWA-KU, TOKYO

(18) BLOCK ID : 534b
    BLOCK NAME : HANEDA AIRPORT
    MASTER AREA : 5002a
    SLAVE AREA : null
    BLOCK ATTRIBUTE : BUILDING
    CONNECTING STREET NO. : 53435st
    CORRESPONDING MAP : Map-53
    COORDINATES : (135.2, 35.1)
    ADDRESS : HANEDA, OHTA-KU, TOKYO

FIG. 42A
EXAMPLE OF STREET DATA

| | | |
|---|---|---|
| (1) | STREET NAME | : ECHIZEN STREET |
| | STREET ID | : 11723st |
| | STREET CLASSIFICATION: SIDEWALK | : SIDEWALK |
| | MASTER AREA | : 35a |
| | CORRESPONDING MAP | : Map-23 |
| | ADDRESS | : 23-12, 4-CHOME, SHINAGAWA-KU, TOKYO |
| | ADJACENT BLOCK | : 466b, 467b, 468b, 469b, 470b, |
| | COORDINATES OF STARTING POINT | : (100, 23) |
| | LINKED STREET NO. OF STARTING POINT | : 11727st |
| | COORDINATES OF END POINT | : (100, 22) |
| | LINKED STREET NO. OF END POINT | : 11722st |
| | LENGTH OF STREET | : 30(m) |
| | ATTRIBUTE OF STREET | : |
| | WALKING DISTANCE(m) | 10 |

| | |
|---|---|
| DIFFERENCE IN HEIGHT | null |
| ROAD SURFACE CONDITION | GOOD |
| COVERING | null |
| STREET LIGHT | null |
| ROADSIDE TREE | null |
| MAILBOX | (150.3, 37.2) |
| TELEPHONE POLE | 2 |
| PUBLIC TELEPHONE | null |
| AUTOMATIC VENDING MACHINE | nul |
| ROADSIDE DITCH | null |
| MANHOLE | null |
| BUS STOP | BUS11723 |
| APPARATUS FOR WHEELCHAIR | null |
| YELLOW LINE | null |
| SUNNY PLACE INFORMATION | |
| CROWDEDNESS INFORMATION | null |
| SEASONAL CHANGE | null |
| BICYCLE | LESS |
| GARBAGE DUMP | L |
| SIDEWALK | null |
| STAIRWAY | null |
| TRAFFIC DENSITY | SCARCE |
| CROWDEDNESS INFORMATION | |
| TRAFFIC CONGESTION INFORMATION | |
| HYDRANT | |
| FIRE EXTINGUISHER | |
| WATER PIPE | |

FIG. 42B (2) STREET NAME : ECHIZEN STREET
    STREET ID : 11720st
    MASTER AREA : 35a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11894st
    COORDINATES OF END POINT : (110, 22)
    LINKED STREET NO. OF END POINT : 11721st (3) STREET NAME : ECHIZEN STREET
    STREET ID : 11721st
    MASTER AREA : 35a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11722st
    COORDINATES OF END POINT : (110, 22)
    LINKED STREET NO. OF END POINT : 11720st (4) STREET NAME : ECHIZEN STREET
    STREET ID : 11722st
    MASTER AREA : 35a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11723st
    COORDINATES OF END POINT : (110, 22)
    LINKED STREET NO. OF END POINT : 11721st

FIG. 43A (5) STREET NAME : ECHIZEN STREET
    STREET ID : 11725st
    MASTER AREA : 35a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11895st
    COORDINATES OF END POINT : (110, 22)
    LINKED STREET NO. OF END POINT : 11892st (6) STREET NAME : ECHIZEN STREET
    STREET ID : 11727st
    MASTER AREA : 35a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11826st
    COORDINATES OF END POINT : (110, 22)
    LINKED STREET NO. OF END POINT : 11723st (7) STREET NAME : ECHIZEN STREET
    STREET ID : 11731st
    MASTER AREA : 36a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11737st
    COORDINATES OF END POINT : (110, 22)
    LINKED STREET NO. OF END POINT : 11826st

FIG. 43B (8) STREET NAME : ECHIZEN STREET
    STREET ID : 11733st
    MASTER AREA : 36a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11734st
    COORDINATES OF END POINT : (110, 22)
    LINKED STREET NO. OF END POINT : 11826st
    BUS STOP : BUS11733

(9) STREET NAME : ECHIZEN STREET
    STREET ID : 11734st
    MASTER AREA : 36a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11735st
    COORDINATES OF END POINT : (110, 22)
    LINKED STREET NO. OF END POINT : 11733st

(10) STREET NAME : ECHIZEN STREET
    STREET ID : 11737st
    MASTER AREA : 36a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11736st
    COORDINATES OF END POINT : (110, 22)
    LINKED STREET NO. OF END POINT : 11731st

FIG. 44A

(11) STREET NAME : ECHIZEN STREET
    STREET ID : 11741st
    MASTER AREA : 37a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11742st
    COORDINATES OF END POINT : (110, 22)
    LINKED STREET NO. OF END POINT : 11836st

(12) STREET NAME : ECHIZEN STREET
    STREET ID : 11742st
    MASTER AREA : 37a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11747st
    COORDINATES OF END POINT : (110, 22)
    LINKED STREET NO. OF END POINT : 11741st

(13) STREET NAME : ECHIZEN STREET
    STREET ID : 11743st
    MASTER AREA : 37a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11747st
    COORDINATES OF END POINT : (110, 22)
    LINKED STREET NO. OF END POINT : 11848st

FIG. 44B

(14) STREET NAME : ECHIZEN STREET
    STREET ID : 11747st
    MASTER AREA : 37a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11743st
    COORDINATES OF END POINT : (110, 22)
    LINKED STREET NO. OF END POINT : 11835st

(15) STREET NAME : ECHIZEN STREET
    STREET ID : 11797st
    MASTER AREA : 39a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11848st
    COORDINATES OF END POINT : (110, 22)
    LINKED STREET NO. OF END POINT : 11795st

(16) STREET NAME : ECHIZEN STREET
    STREET ID : 11795st
    MASTER AREA : 39a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11797st
    COORDINATES OF END POINT : (110, 22)
    LINKED STREET NO. OF END POINT : 11792st, 11897st

FIG. 45A

(17) STREET NAME : ECHIZEN STREET
    STREET ID : 11792st
    MASTER AREA : 39a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11795st, 11897st
    COORDINATES OF END POINT : (110, 22)
    LINKED STREET NO. OF END POINT : 11895st

(18) STREET NAME : ECHIZEN STREET
    STREET ID : 11692st
    MASTER AREA : 32a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11892st
    COORDINATES OF END POINT : (110, 22)
    LINKED STREET NO. OF END POINT : 11693st

(19) STREET NAME : ECHIZEN STREET
    STREET ID : 11693st
    MASTER AREA : 32a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11692st
    COORDINATES OF END POINT : (110, 22)
    LINKED STREET NO. OF END POINT : 11894st

FIG. 45B

(20) STREET NAME : MOHRI STREET
    STREET ID : 11711st
    MASTER AREA : 34a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11827st
    COORDINATES OF END POINT : (110, 22)
    LINKED STREET NO. OF END POINT : 11824st

(21) STREET NAME : null
    STREET ID : 11824st
    STREET ATTRIBUTE : STAIRWAY
    MASTER AREA : 38a
    CORRESPONDING MAP : Map-23
    ADDRESS : 23-12, 4-CHOME, SHINAGAWA-KU, TOKYO
    ADJACENT BLOCK : 35a, 36a
    COORDINATES OF STARTING POINT : (100, 23)
    LINKED STREET NO. OF STARTING POINT : 11711st
    COORDINATES OF END POINT : (110, 22)
    LINKED STREET NO. OF END POINT :

(22) STREET NAME : ECHIZEN BRIDGE
    STREET ID : 11826st
    STREET ATTRIBUTE : BRIDGE
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11731st
    COORDINATES OF END POINT : (110, 22)
    LINKED STREET NO. OF END POINT : 11727st

FIG. 46A

(23) STREET NAME : null
    STREET ID : 11827st
    STREET ATTRIBUTE : STAIRWAY
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11711st
    COORDINATES OF END POINT : (110, 22)
    LINKED STREET NO. OF END POINT :

(24) STREET NAME : MOHRI BRIDGE
    STREET ID : 11835st
    STREET ATTRIBUTE : BRIDGE
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11747st
    COORDINATES OF END POINT : (110, 22)
    LINKED STREET NO. OF END POINT : 11734st

(25) STREET NAME : TOSA BRIDGE
    STREET ID : 11836st
    STREET ATTRIBUTE : BRIDGE
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11741st
    COORDINATES OF END POINT : (110, 22)
    LINKED STREET NO. OF END POINT : 11737st

FIG. 46B

(26) STREET NAME : ECHIZEN STREET
    STREET ID : 11847st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT :
    COORDINATES OF END POINT : (110, 22)
    LINKED STREET NO. OF END POINT :

(27) STREET NAME : ECHIZEN STREET
    STREET ID : 11848st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11743st
    COORDINATES OF END POINT : (110, 22)
    LINKED STREET NO. OF END POINT : 11797st

(28) STREET NAME : ECHIZEN STREET
    STREET ID : 11892st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11725st
    COORDINATES OF END POINT : (110, 22)
    LINKED STREET NO. OF END POINT : 11692st

FIG. 47A

(29) STREET NAME : ECHIZEN STREET
    STREET ID : 11894st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11693st
    COORDINATES OF END POINT : (110, 22)
    LINKED STREET NO. OF END POINT : 11720st

(30) STREET NAME : ECHIZEN STREET
    STREET ID : 11895st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11792st
    COORDINATES OF END POINT : (110, 22)
    LINKED STREET NO. OF END POINT : 11725st

(31) STREET NAME : ECHIZEN STREET
    STREET ID : 11897st
    MASTER AREA : 38a
    CORRESPONDING MAP : Map-23
    ADDRESS : 23-12, 4-CHOME, SHINAGAWA-KU, TOKYO
    ADJACENT BLOCK :
    COORDINATES OF STARTING POINT : (100, 23)
    LINKED STREET NO. OF STARTING POINT : 11795st, 11792st
    COORDINATES OF END POINT : (110, 22)
    LINKED STREET NO. OF END POINT :

FIG. 47B

(32) STREET NAME : TBS 1ST FLOOR, CORRIDOR A
    STREET ID : 21734st
    MASTER AREA : 1037a
    CORRESPONDING MAP : Map-23
    ADDRESS : 23-12, 4-CHOME, SHINAGAWA-KU, TOKYO
    ADJACENT BLOCK : 110b
    COORDINATES OF STARTING POINT : (100, 23)
    LINKED STREET NO. OF STARTING POINT : 22800st
    COORDINATES OF END POINT : (110, 22)
    LINKED STREET NO. OF END POINT : null

(33) STREET NAME : TBS 1ST FLOOR, CORRIDOR B
    STREET ID : 21735st
    MASTER AREA : 1037a
    CORRESPONDING MAP : Map-23
    ADDRESS : 23-12, 4-CHOME, SHINAGAWA-KU, TOKYO
    ADJACENT BLOCK : 115b
    COORDINATES OF STARTING POINT : (100, 23)
    LINKED STREET NO. OF STARTING POINT : 22800st
    COORDINATES OF END POINT : (110, 22)
    LINKED STREET NO. OF END POINT :

(34) STREET NAME : TBS 2ND FLOOR, CORRIDOR A
    STREET ID : 22734st
    MASTER AREA : 1038a
    CORRESPONDING MAP : Map-23
    ADDRESS : 23-12, 4-CHOME, SHINAGAWA-KU, TOKYO
    ADJACENT BLOCK : 120b
    COORDINATES OF STARTING POINT : (100, 23)
    LINKED STREET NO. OF STARTING POINT : 22800st, 22810st
    COORDINATES OF END POINT : (110, 22)
    LINKED STREET NO. OF END POINT :

FIG. 48A

(35) STREET NAME : TBS 2ND FLOOR, CORRIDOR B
    STREET ID : 22735st
    MASTER AREA : 1038a
    CORRESPONDING MAP : Map-23
    ADDRESS : 23-12, 4-CHOME, SHINAGAWA-KU, TOKYO
    ADJACENT BLOCK : 125b
    COORDINATES OF STARTING POINT : (100, 23)
    LINKED STREET NO. OF STARTING POINT : 22800st, 22810st
    COORDINATES OF END POINT : (110, 22)

FIG. 48B

(38) STREET NAME             :
    STREET ID                : 22800st
    STREET ATTRIBUTE         : ELEVATOR
    MASTER AREA              : 2038a
    CORRESPONDING MAP        : Map-23
    ADDRESS                  : 23-12,4--CHOME,SHINAGAWA-KU,TOKYO
    ADJACENT BLOCK           :
    COORDINATES OF STARTING POINT    : (100,23)
    LINKED STREET NO. OF STARTING POINT :
    COORDINATES OF END POINT : (110,22)
    LINKED STREET NO. OF END POINT    : 22810st

(39) STREET NAME             :
    STREET ID                : 22810st
    STREET ATTRIBUTE         : ELEVATOR
    MASTER AREA              : 2039a
    CORRESPONDING MAP        : Map-23
    ADDRESS                  : 23-12,4--CHOME,SHINAGAWA-KU,TOKYO
    ADJACENT BLOCK           :
    COORDINATES OF STARTING POINT    : (100,23)
    LINKED STREET NO. OF STARTING POINT : 22800st
    COORDINATES OF END POINT : (110,22)
    LINKED STREET NO. OF END POINT    :

(40) STREET NAME             : ECHIZEN STREET
    STREET ID                : 12434st
    MASTER AREA              : 26a
    CORRESPONDING MAP        : Map-45
    ADDRESS                  : 23-12,4--CHOME,SHINAGAWA-KU,TOKYO
    ADJACENT BLOCK           :
    COORDINATES OF STARTING POINT    : (100,23)
    LINKED STREET NO. OF STARTING POINT : 12433st
    COORDINATES OF END POINT : (110,22)
    LINKED STREET NO. OF END POINT    : 12435st
    BUS STOP                 : bus12434

FIG. 50

INPUT (EXAMPLE)
    DEPARTURE POINT    : ROPPONGI STATION, HIBIYA LINE
    INPUT ATTRIBUTE    : NAME
    DESTINATION        : ROPPONGI MURASAKI
    INPUT ATTRIBUTE    : NAME
    INPUTTER           : A 72-YEAR-OLD WOMAN
    PURPOSE            : ROUTE SEARCHING TO DESTINATION

FIG. 53

INPUT (EXAMPLE)
    DEPARTURE POINT    : ROPPONGI STATION, HIBIYA LINE
    INPUT ATTRIBUTE    : NAME
    DESTINATION        : TBS STUDIO 04
    INPUT ATTRIBUTE    : NAME
    INPUTTER           : A 72-YEAR-OLD WOMAN
    PURPOSE            : ROUTE SEARCHING TO DESTINATION

FIG. 55

| | |
|---|---|
| DEPARTURE POINT | : ROPPONGI STATION, HIBIYA LINE |
| INPUT ATTRIBUTE | : NAME |
| DESTINATION | : ROPPONGI MURASAKI |
| INPUT ATTRIBUTE | : NAME |
| DESTINATION | : ROPPONGI KIMIDORI |
| INPUT ATTRIBUTE | : NAME |
| DESTINATION | : ROPPONGI DAIDAI |
| INPUT ATTRIBUTE | : NAME |
| DESTINATION | : ROPPONGI MIZUIRO |
| INPUT ATTRIBUTE | : NAME |
| DESTINATION | : ROPPONGI MOMOIRO |
| INPUT ATTRIBUTE | : NAME |
| INPUTTER | : A 72-YEAR-OLD WOMAN |
| PURPOSE | : ROUTE SEARCHING TO DESTINATION |

FIG. 58

| | |
|---|---|
| INPUT (EXAMPLE) | |
| DEPARTURE POINT | : SHINAGAWA MURASAKI |
| INPUT ATTRIBUTE | : NAME |
| DESTINATION | : ROPPONGI MURASAKI |
| INPUT ATTRIBUTE | : NAME |
| INPUTTER | : A 72-YEAR-OLD WOMAN |
| PURPOSE | : ROUTE SEARCHING TO DESTINATION |
| METHOD | : MULTIMODE |

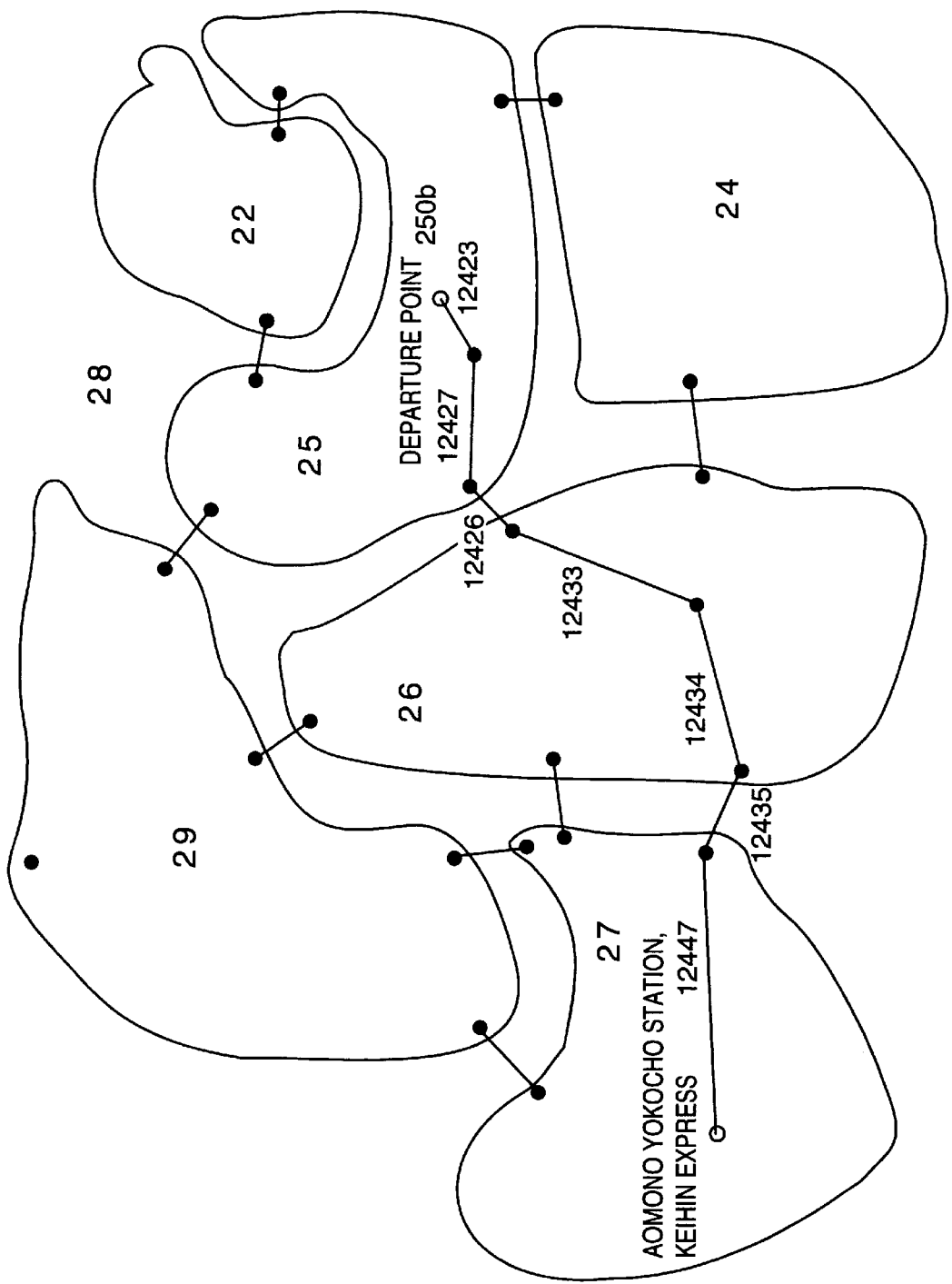

FIG. 61

```
INPUT (EXAMPLE)
DEPARTURE POINT    : SHINAGAWA MURASAKI
TIME OF DEPARTURE  : 12:00
DESTINATION        : ROPPONGI MURASAKI
INPUTTER           : A 72-YEAR-OLD WOMAN
PURPOSE            : CALCULATION OF ARRIVAL TIME
METHOD             : WALKING
WALKING SPEED      : 3.6(Km/h),1(m/s)
```

FIG. 62

| STREET NAME | DEPARTURE TIME | ARRIVAL TIME | TIME REQUIRED |
|---|---|---|---|
| 12423st | 12:00 | 12:07 | 00:07 |
| 12427st | 12:07 | 12:17 | 00:10 |
| 12426st | 12:17 | 12:22 | 00:05 |
| 12433st | 12:22 | 12:37 | 00:15 |
| 12434st | 12:37 | 12:52 | 00:15 |
| 12435st | 12:52 | 13:00 | 00:08 |
| 12447st | 13:00 | 13:19 | 00:19 |

AOMONO YOKOCHO STATION, KEIHIN EXPRESS-JR ROPPONGI STATION   13:23-13:45

| | | | |
|---|---|---|---|
| 11723st | 13:46 | 13:53 | 00:07 |
| 11727st | 13:53 | 14:03 | 00:10 |
| 11726st | 14:03 | 14:08 | 00:05 |
| 11733st | 14:08 | 14:23 | 00:15 |
| 11734st | 14:23 | 14:38 | 00:15 |
| 11735st | 14:38 | 14:46 | 00:08 |
| 11747st | 14:46 | 15:05 | 00:19 |

FIG. 64

| | |
|---|---|
| INPUTTER | : A 72-YEAR-OLD WOMAN |
| PURPOSE | : ROUTE SEARCHING BETWEEN DESTINATIONS |

| | |
|---|---|
| INPUT ATTRIBUTE | : NAME |
| EXPECTED TIME OF ARRIVAL | : ARBITRARY |
| COORDINATES | : (300,250) |
| PLACE ID | : A |

| | |
|---|---|
| INPUT ATTRIBUTE | : NAME |
| EXPECTED TIME OF ARRIVAL | : 12:30 |
| COORDINATES | : (100,450) |
| PLACE ID | : B |

| | |
|---|---|
| INPUT ATTRIBUTE | : NAME |
| EXPECTED TIME OF ARRIVAL | : 14:00 |
| COORDINATES | : (150,200) |
| PLACE ID | : C |

| | |
|---|---|
| INPUT ATTRIBUTE | : NAME |
| EXPECTED TIME OF ARRIVAL | : ARBITRARY |
| COORDINATES | : (50,300) |
| PLACE ID | : D |

| | |
|---|---|
| INPUT ATTRIBUTE | : NAME |
| EXPECTED TIME OF ARRIVAL | : 13:00 |
| COORDINATES | : (230,150) |
| PLACE ID | : E |

| | |
|---|---|
| INPUT ATTRIBUTE | : NAME |
| EXPECTED TIME OF ARRIVAL | : ARBITRARY |
| COORDINATES | : (200,130) |
| PLACE ID | : F |

FIG. 66

INPUT (EXAMPLE)
DEPARTURE POINT    : SHINAGAWA MURASAKI
INPUT ATTRIBUTE    : NAME
DESTINATION        : ROPPONGI MURASAKI
INPUT ATTRIBUTE    : NAME
INPUTTER           : A 72-YEAR-OLD WOMAN
DEPARTURE TIME     : 12:00
PURPOSE            : ROUTE SEARCHING TO DESTINATION
METHOD             : MULTI-MODE

FIG. 67

BUS SCHEDULE

KEIKYU BUS

| BUS STOP NAME | DEPARTURE TIME |
|---|---|
| bus12434 | 12:50 |
|  | 13:00 |
|  | 13:12 |
|  | 13:22 |

ROPPONGI BUS

| BUS STOP NAME | DEPARTURE TIME |
|---|---|
| JR ROPPONGI STATION | 13:30 |
|  | 13:40 |
|  | 13:50 |
|  | 14:00 |

FIG. 68

| STREET NAME | DEPARTURE TIME | ARRIVAL TIME | TIME REQUIRED |
|---|---|---|---|
| 12423st | 12:00 | 12:07 | 00:07 |
| 12427st | 12:07 | 12:17 | 00:10 |
| 12426st | 12:17 | 12:22 | 00:05 |
| 12433st | 12:22 | 12:37 | 00:15 |
| 12434st | 12:37 | 12:52 | 00:15 |

KEIKYU BUS            13:00-13:16
AOMONO YOKOCHO STATION, KEIHIN EXPRESS-JR ROPPONGI STATION    13:19-13:41
ROPPONGI BUS     13:50-14:03

| | | | |
|---|---|---|---|
| 11733st | 14:03 | 14:18 | 00:15 |
| 11734st | 14:18 | 14:33 | 00:15 |
| 11735st | 14:33 | 14:41 | 00:08 |
| 11747st | 14:41 | 15:00 | 00:19 |

FIG. 69

| STREET NAME | DEPARTURE TIME | ARRIVAL TIME | TIME REQUIRED |
|---|---|---|---|
| 12423st | 12:00 | 12:07 | 00:07 |
| 12427st | 12:07 | 12:17 | 00:10 |
| 12426st | 12:17 | 12:22 | 00:05 |
| 12433st | 12:22 | 12:37 | 00:15 |
| 12434st | 12:37 | 12:52 | 00:15 |

KEIKYU BUS            13:00-13:16
AOMONO YOKOCHO STATION, KEIHIN EXPRESS-JR ROPPONGI STATION    13:19-13:41

| | | | |
|---|---|---|---|
| 11723st | 13:41 | 13:48 | 00:07 |
| 11727st | 13:48 | 13:58 | 00:10 |
| 11726st | 13:58 | 14:03 | 00:05 |
| 11733st | 14:03 | 14:18 | 00:15 |
| 11734st | 14:18 | 14:33 | 00:15 |
| 11735st | 14:33 | 14:41 | 00:08 |
| 11747st | 14:41 | 15:00 | 00:19 |

FIG. 74

LINK DATA
| | | |
|---|---|---|
| ROAD1 | (10,40) | (10,70) |
| ROAD2 | (10,10) | (10,40) |
| ROAD3 | (10,0) | (10,10) |
| ROAD4 | (100,60) | (100,70) |
| ROAD5 | (100,10) | (100,60) |
| ROAD6 | (100,0) | (100,10) |
| ROAD7 | (10,40) | (100,60) |
| ROAD8 | (0,10) | (10,10) |
| ROAD9 | (10,10) | (100,10) |
| ROAD10 | (100,10) | (120,10) |

FIG. 75A (1)
- AREA ID : 9998a
- AREA ATTRIBUTE : ROAD
- SLAVE BLOCK : 9998b
- SLAVE STREET : 9997st,9996st
- ENTRANCE/EXIT : a6,a2,b4,b5
- ADJACENT AREA :
- MASTER BLOCK :
- CORRESPONDING MAP : Map-234
- ADMINISTRATIVE REGION : 25-4-CHOME,CHUOU-KU,TOKYO (2)
- BLOCK ID : 9998b
- BLOCK NAME : null
- MASTER AREA : 9998a
- SLAVE AREA : null
- BLOCK ATTRIBUTE : ROAD
- CONNECTING STREET NO. : 9996st
- CORRESPONDING MAP : Map-234
- COORDINATES : (100,10)
- ADDRESS : 25-4-CHOME,CHUOU-KU,TOKYO

FIG. 75B (3) BLOCK ID : 9997b
    BLOCK NAME : null
    MASTER AREA : 9998a
    SLAVE AREA : null
    BLOCK ATTRIBUTE : ROAD
    CONNECTING STREET NO. : 9996st,9997st
    CORRESPONDING MAP : Map-234
    COORDINATES : (100,63)
    ADDRESS : 25-4-CHOME,CHUOU-KU,TOKYO (4) BLOCK ID : 9996b
    BLOCK NAME : null
    MASTER AREA : 9998a
    SLAVE AREA : null
    BLOCK ATTRIBUTE : ROAD
    CONNECTING STREET NO. : 9997st
    CORRESPONDING MAP : Map-234
    COORDINATES : (100,67)

FIG. 75C (5) STREET NAME : null
    STREET ID : 9997st
    MASTER AREA : 9998a
    CORRESPONDING MAP : Map-234
    ADDRESS : 25-4-CHOME,SHINAGAWA-KU,TOKYO
    ADJACENT BLOCK :
    STARTING POINT COORDINATES : (95,67)
    STARTING POINT LINKED STREET NO. : a7
    END POINT COORDINATES : (105,67)
    END POINT LINKED STREET NO. : a6

(6) STREET NAME : null
    STREET ID : 9996st
    MASTER AREA : 9998a
    CORRESPONDING MAP : Map-234
    ADDRESS : 25-4-CHOME,SHINAGAWA-KU,TOKYO
    ADJACENT BLOCK : 9998b
    STARTING POINT COORDINATES : (95,63)
    STARTING POINT LINKED STREET NO. : b5
    END POINT COORDINATES : (105,63)
    END POINT LINKED STREET NO. : b4

FIG. 76

(1) AREA ID : 2345a
   AREA ATTRIBUTE : STREET
   SLAVE BLOCK : 2345b
   SLAVE STREET :
   ENTRANCE/EXIT :
   ADJACENT AREA : 2346a
   MASTER BLOCK :
   CORRESPONDING MAP : Map-234
   ADMINISTRATIVE REGION : 25-4-CHOME,CHUOU-KU,TOKYO (2) AREA ID : 2346a
   AREA ATTRIBUTE : STREET
   SLAVE BLOCK : 2346b
   SLAVE STREET :
   ENTRANCE/EXIT :
   ADJACENT AREA : 2345a
   MASTER BLOCK :
   CORRESPONDING MAP : Map-234
   ADMINISTRATIVE REGION : 25-4-CHOME,CHUOU-KU,TOKYO

FIG. 77

(1) BLOCK ID : 2345b
   BLOCK NAME : w1
   MASTER AREA : 2345a
   SLAVE AREA : null
   BLOCK ATTRIBUTE : STREET BLOCK
   CONNECTING STREET NO. :
   CORRESPONDING MAP : Map-234
   COORDINATES : (10,67)
   ADDRESS : 25-4-CHOME,CHUOU-KU,TOKYO (2) BLOCK ID : 2346b
   BLOCK NAME : Q1
   MASTER AREA : 2346a
   SLAVE AREA : null
   BLOCK ATTRIBUTE : STREET BLOCK
   CONNECTING STREET NO. :
   CORRESPONDING MAP : Map-234
   COORDINATES : (60,67)
   ADDRESS : 25-4-CHOME,CHUOU-KU,TOKYO

FIG. 78

(1) STREET NAME : a1
    STREET ID : 2345st
    MASTER AREA : 2345a
    CORRESPONDING MAP : Map-234
    ADDRESS : 25-4-CHOME,CHUOU-KU,TOKYO
    ADJACENT BLOCK : W1
    STARTING POINT COORDINATES : (10,67)
    STARTING POINT LINKED STREET NO. :
    END POINT COORDINATES : (20,67)
    END POINT LINKED STREET NO. :

(2) STREET NAME : e3
    STREET ID : 2346st
    MASTER AREA : 2346a
    CORRESPONDING MAP : Map-234
    ADDRESS : 25-4-CHOME,CHUOU-KU,TOKYO
    ADJACENT BLOCK : Q5
    STARTING POINT COORDINATES : (40,30)
    STARTING POINT LINKED STREET NO. :
    END POINT COORDINATES : (50,30)
    END POINT LINKED STREET NO. :

FIG. 79

(1) BLOCK ID : 2345b
BLOCK NAME : W1
MASTER AREA : 2345a
SLAVE AREA : null
BLOCK ATTRIBUTE : STREET BLOCK
CONNECTING STREET NO. : a1,z1
CORRESPONDING MAP : Map-234
COORDINATES : (10,67)
ADDRESS : 25-4-CHOME,CHUOU-KU,TOKYO (2) BLOCK ID : 2346b
BLOCK NAME : Q1
MASTER AREA : 2346a
SLAVE AREA : null
BLOCK ATTRIBUTE : STREET BLOCK
CONNECTING STREET NO. : a6,b4
CORRESPONDING MAP : Map-234
COORDINATES : (60,67)
ADDRESS : 25-4-CHOME,CHUOU-KU,TOKYO (3) STREET NAME : a1
STREET ID : 2345st
MASTER AREA : 2345a
CORRESPONDING MAP : Map-234
ADDRESS : 25-4-CHOME,CHUOU-KU,TOKYO
ADJACENT BLOCK : W1
STARTING POINT COORDINATES : (10,67)
STARTING POINT LINKED STREET NO. :
END POINT COORDINATES : (20,67)
END POINT LINKED STREET NO. : z1,z2,a2

(4) STREET NAME : e3
STREET ID : 2346st
MASTER AREA : 2346a
CORRESPONDING MAP : Map-234
ADDRESS : 25-4-CHOME,CHUOU-KU,TOKYO
ADJACENT BLOCK : Q5
STARTING POINT COORDINATES : (40,30)
STARTING POINT LINKED STREET NO. : e2,y4,y5
END POINT COORDINATES : (50,30)
END POINT LINKED STREET NO. : x4,x5,e4

PICK UP STREET BLOCK DATA OF STREET MAP

HOW TO PREPARE PEDESTRIAN MAP DATA

PERFORM GROUPING OF STREET BLOCKS WITH IN DISTANCE OF 5.5 M OR LESS AND EXTRACT PEDESTRIAN AREA

EXTRACT STREET DATA IN AREA

OVERLAP ON ROAD MAP DATA AND ACQUIRE NON-PEDESTRIAN AREA

FIG. 82

STREET BLOCK  COORDINATE DATA OF POLYGON (EXAMPLE)
---
A  {(0,200),(0,190),(20,190),(20,200)}
B  {(60,200),(60,190),(90,190),(90,200)}
C  {(95,200),(95,190),(125,190),(125,200)}
D  {(130,200),(130,190),(160,190),(160,200)}
E  {(165,200),(165,190),(195,190),(195,200)}
F  ................................
G  ................................

FIG. 83

AREA   ROAD DATA OF AREA
---
a  {a1:(0,190)-(20,190),a2:(20,190)-(20,200)}
b  {b1:(60,200)-(60,190),b2:(93,200)-(93,190),
   b3:(128,200)-(128,190),b4:(163,200)-(163,190),
   b5:(60,190)-(195,190)}
c  ................................
d  ................................

FIG. 84

(1) AREA ID                         : b
    AREA ATTRIBUTE                  : STREET
    SLAVE BLOCK                     : B,C,D,E
    SLAVE STREET                    : b1,b2,b3,b4,b5
    ENTRANCE/EXIT                   :
    ADJACENT AREA                   : 2345a
    MASTER BLOCK                    :
    CORRESPONDING MAP               : Map-900

(2) BLOCK ID                        : B
    MASTER AREA                     : b
    SLAVE AREA                      : null
    BLOCK ATTRIBUTE                 : STREET BLOCK
    CONNECTING STREET NO.           : b1,b5
    CORRESPONDING MAP               : Map-900
    COORDINATES                     : (10,67)

(3) STREET ID                       : b5
    MASTER AREA                     : b
    CORRESPONDING MAP               : Map-900
    ADJACENT BLOCK                  : B,C,D,E
    STARTING POINT COORDINATES      : (60,190)
    STARTING POINT LINKED STREET NO.: b1
    END POINT COORDINATES           : (195,190)
    END POINT LINKED STREET NO.     : null

FIG. 88

| AREA | STREET |
|------|--------|
| A | α |
| A | a |
| A | b |
| A | c |
| A | d |
| B | a |
| B | f |
| B | e |
| C | b |
| C | c |
| C | d |
| C | e |
| C | β |

FIG. 99
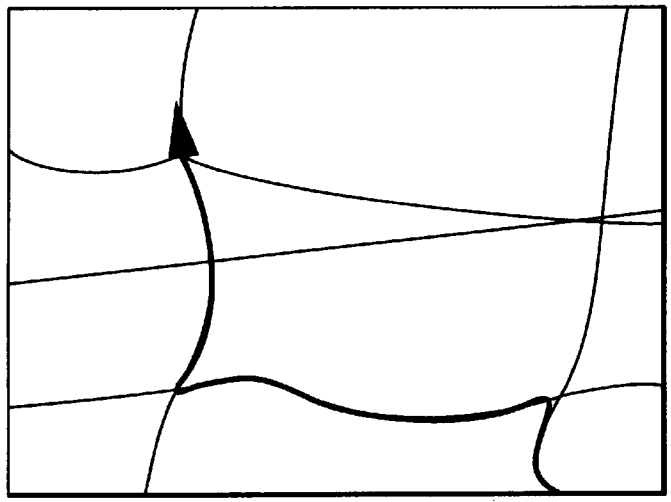
FIG. 100
| COEFFICIENT | | | | STARTING POINT | END POINT | INVERSE FUNCTION FLAG |
|---|---|---|---|---|---|---|
| 2 | 3 | 47 | 5 | 543 | 562 | 0 |
| 22 | 34 | 43 | -5 | 673 | 662 | 0 |
| -52 | 34 | -8 | -4 | 873 | 999 | 1 |
FIG. 101
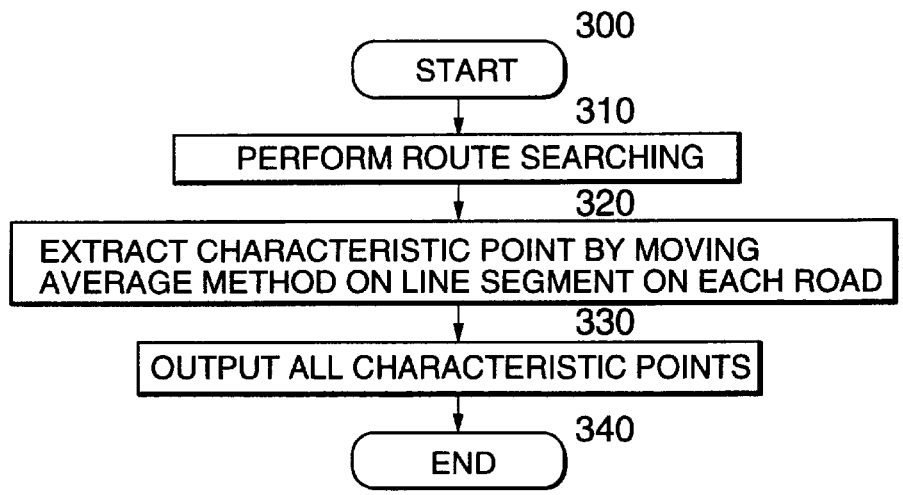

ALL ROAD / BASIC ROAD

ALL-ROAD NODE a

ALL-ROAD / BASIC ROAD

AREA A

AREA A

AREA A1

AREA A2

PEDESTRIAN INFORMATION PROVIDING SYSTEM, STORAGE UNIT FOR THE SAME, AND PEDESTRIAN INFORMATION PROCESSING UNIT

FIELD OF THE INVENTION

The present invention relates to a system for providing visible map information to pedestrians, and in particular, to a pedestrian information providing system for providing map data corresponding to information such as an address or latitude and longitude already inputted, and also for providing a route to walk to a destination in a manner visible to pedestrians.

BACKGROUND ART

A number of patent applications have been filed on navigation systems for automotive vehicles, while there have been very few applications, which proposed information providing system for providing map data and various other information for pedestrians. One of the systems for providing map information for pedestrians is proposed as "Portable Map Display System" in a Japanese Patent No.1895897 (Patent Application Publication JP-B-6-19276). This is a system which provides pedestrians with route information obtained from a road map.

Also, in the reference "Proposal of a Portable Information Providing System for Personal Trip", (Shimamura, Y. et al.: Journal of Association of Image Electronics, Vol. 23, No. 5, 1994, pp 422–427), a system is proposed, which searches a present position of a pedestrian on road and displays the position in a map on screen. This system is designed in such manner that, each time the pedestrian passes through an intersection, the user clicks advancing direction by selecting an intersection from configuration of the intersections displayed on screen. By repeating this procedure, walking speed of the pedestrian is calculated from the distance between the intersection and the time required. Also, the present position of the pedestrian is detected from amount of moving of the pedestrian and advancing direction at the intersection, and a doll icon is displayed at the present position in a map displayed on screen.

As a system for providing information by searching a route, various types of route guidance systems have been proposed, for example, in "Route Guidance System for Pedestrians", (Kato M., Association of Electronic Information and Communication, System Branch, Nationwide Meeting, 632), "Optimal Route Information Providing System in Urban Transportation" (Kato M., Association of Information Processing, Vol. 28, No. 3, pp. 307–314), etc.

In the conventional type system, however, pedestrian route is searched according to a road map, and pedestrian route well-matched to actual walking condition is not always searched, e.g. walking over pedestrians' crossing or footbridge when walking across a road.

Also, some pedestrians need to avoid a route with stairway, or in case of a woman, a road with good street light must be selected during nighttime. Thus, strict selection must be made on route searching depending on the conditions of each pedestrian. In the conventional system, sufficient analysis is not performed on pedestrian conditions, and route selection well-matched to the conditions of pedestrians is not always carried out.

Also, the conventional system has problems in that it takes much time to solve the problems relating to the route, and it is not possible to generate the information to be offered at high speed.

Further, there are the following problems:

In the conventional system, which displays route information near the present position of the pedestrian, the provided route guidance is based on a road map, and display of guidance information such as intersection information is not easily understandable to the pedestrians.

Also, the conventional system does not have route data such as premise, underground shopping center, information inside a building, station platform, etc., and route guidance cannot be provided for pedestrians on these places.

In case route information is provided to portable terminal equipment of the user, much time is required for data transfer because there are a plenty of amount of data in map data. For this reason, it is not possible to simultaneously display a plurality of geographical information on the screen of the portable terminal equipment.

Also, the data base to be used when providing route information for pedestrians must be prepared from data such as road map or street map currently used. In order to have more effective system to provide pedestrian information, the data base must be prepared automatically and efficiently.

SUMMARY OF THE INVENTION

To solve the above problems, it is an object of the present invention to provide a pedestrian information providing system, by which it is possible to generate pedestrian route information well-matched to actual walking conditions at high speed, with much consideration on conditions of pedestrians and walking conditions, and to present the information to the users.

To attain the above object, the pedestrian information providing system of the present invention comprises a storage unit for storing pedestrian map data and a pedestrian information processing unit for acquiring necessary pedestrian map data from the storage unit according to the input from the user and for generating the information to be offered, whereby the pedestrian map data comprises a data of an area divided to a non-pedestrian area where pedestrians cannot walk freely and a pedestrian area where pedestrians can walk freely, a data of street where pedestrians can walk in each of the areas, and a data of block where pedestrians cannot walk in each of the areas, and it has a data structure, which is specifically prepared for pedestrians and in which pedestrians are categorized. Also, there are provided various types of indices and a table to make it easier to search pedestrian map data at high speed.

Also, the data of the street is provided with attribute data such as geographical information of the street, information on attached facilities arranged on roadside, and time-related information indicating conditions which vary over time on the street. In the searching of pedestrian route, the attributes of the street to be selected are determined according to the inputted pedestrian condition and walking condition.

With the arrangement as described above, useful information relating to pedestrian route can be generated and presented at high speed, and pedestrian route suitable for pedestrians and walking condition can be selected and offered to the users.

The system for providing necessary information to pedestrians according to claim 1 of the present invention comprises a storage unit for storing pedestrian map data, and a pedestrian information processing unit for acquiring necessary pedestrian map data from the storage unit according to the input from a user and for generating information to be offered, whereby the storage unit stores a data of area divided to a non-pedestrian area where pedestrians cannot walk freely and a pedestrian area where pedestrians can walk freely, a data of street where pedestrians can walk in each of the areas, a data of block where pedestrians cannot walk in each of the areas, an index for searching block or street from address or name, and a table for describing an area belonging to each section on a map, and the pedestrian information processing unit comprises an input/output control means for receiving input from the user, a pedestrian map data searching means for acquiring pedestrian map data suitable for inputting from the storage unit, and a pedestrian route searching means searching a route for pedestrian using the acquired data, and pedestrian route suitable for pedestrians and walking conditions and useful route information and information such as map data of the vicinity of destination and departure point can be quickly provided to the users.

In the system according to claim 2 of the present invention, the data of area comprises an area ID, an area ID of an adjacent area, a data of entrance and exit to and from the adjacent area, IDs of blocks and streets belonging to the areas, and a data indicating positions of the areas on a map. The data of block comprises a block ID, a block name, an ID of the belonging area, an ID of the street, to which an entrance of the block is connected, an address of the block, and a data showing position of a block on a map. The data of street comprises street ID, street name ID of the belonging area, attribute data peculiar to the street, connecting information between streets, address of street, and data showing positions of the starting point and the end point of the street on a map. It is possible to search a pedestrian route using these data.

In the system according to claim 3 of the present invention, the data of the street comprises geographic information of the street, information on attached facilities provided on roadside, and time-related information to indicate conditions varying over time of the street as the inherent attribute data. Having these attribute data, it is possible to search a pedestrian route suitable for pedestrians and to provide useful information relating to attached facilities on the street.

In the system according to claim 4 of the present invention, in case the block is a building, the data of the block comprises 3-dimensional information for displaying the building 3-dimensionally. It is possible to provide the users with 3-dimensional simulation for displaying a building on a map 3-dimensionally.

The system according to claim 5 of the present invention is the same as the system according to claim 1, wherein a part of the block has an element of an area in it. By setting a region or a floor where pedestrians can walk as a pedestrian area and a space partitioned from the floor as a non-pedestrian area in a block of underground shopping center or a building, it is possible to perform route searching on these areas.

The system according to claim 6 of the present invention is the same as the system according to claim 1, wherein the pedestrian map data searching means comprises an address corresponding data searching means for searching data of block or street using the index from the inputted address. It is possible to search data of the corresponding block or street from an address at high speed.

The system according to claim 7 of the present invention is the same as the system according to claim 1, wherein the pedestrian map data searching means comprises a name corresponding data searching means for searching data of block or street using the index from the inputted name. It is possible to search data of corresponding block or street from the name at high speed.

In the system according to claim 8 of the present invention, the pedestrian map data searching means comprises a latitude/longitude corresponding data searching means for searching a block corresponding to a latitude/longitude data for calculating a section on a map from an inputted latitude/longitude data, searches an area belonging to the section using the table, searches an area corresponding to the latitude/longitude data from the area, and searches a block corresponding to the latitude/longitude data. It is possible to search data of the corresponding block from latitude/longitude data at high speed.

In the system according to claim 9 of the present invention, the storage unit stores a town table describing various types of objects included in each area and blocks where the objects are present as classified for each area, and there is provided a nearest information searching means where the pedestrian map data searching means searches a block where the inputted objects are present by extending object area to be searched to adjacent area using the town table. It is possible to search position of the nearest object at high speed and to present it to the user.

In the system according to claim 10 of the present invention, the pedestrian route searching means comprises an attribute determining means for determining attribute of a route to be selected according to categories of pedestrian, time zone or weather inputted. By taking the attributes into account, it is possible to select and present a route suitable for the purpose and the condition of the user.

In the system according to claim 11 of the present invention, the attribute determining means determines the attribute using a neural net. It is possible to adequately determine attributes of the street to be selected.

In the system according to claim 12 of the present invention, the pedestrian route searching means comprises a point-to-point route searching means for searching an optimal route from a departure point to a destination by giving consideration on the attribute determined by the attribute determining means. It is possible to search a pedestrian route suitable for pedestrians and walking conditions and to present it to the user.

In the system according to claim 13 of the present invention, a point-to-point route searching means searches an optimal route between areas from the area of the departure point to an area of the destination, and then searches an optimal route of a street in each area along the optimal route by giving consideration on the attributes determined by the attribute determining means. It is possible to search a pedestrian route suitable for pedestrians and walking conditions at high speed.

In the system according to claim 14 of the present invention, the pedestrian route searching means comprises a route searching means between a plurality of geographical points for searching an optimal route to go round from the departure point to a plurality of destinations by giving consideration on the attributes determined by the attribute determining means. It is possible to search a pedestrian route suitable for pedestrians and walking conditions and to present it to the user.

In the system according to claim 15 of the present invention, a transportation means data relating to lines and schedule of transportation means are stored in the storage unit, and the pedestrian route searching means comprises a route searching means for searching a route using transportation means for searching the nearest station of the departure point and the destination, searches an optimal route from the departure point and the destination to the nearest station by giving consideration on the attributes determined by the attribute determining means, and searches an optimal line from the station nearest to the departure point to the station nearest to the destination using the transportation means data. It is possible to provide the user with an optimal route in case the user follows the route by walking and using transportation means.

In the system according to claim 16 of the present invention, the pedestrian information processing unit comprises a scheduling means for searching an optimal route after determining an order to visit destinations, for which visiting time is already determined, a visiting order to all destinations including a destination, for which visiting time is not determined, is determined, and an optimal route for visiting the destinations is searched. It is possible to set up a schedule to visit destination with the visiting time already determined according to the schedule and to visit all destinations efficiently and to present it to the user.

In the system according to claim 17 of the present invention, the pedestrian information processing unit comprises a time simulation means for calculating time required from a departure point to a destination when a searched route is followed. It is possible to provide the user with information on time of arrival at the destination, or time of departure to arrive at the destination as scheduled.

In the system according to claim 18 of the present invention, the pedestrian information processing unit comprises a transportation means determining means, whereby a route from a departure point to a destination using all transportation means is searched, and by comparing the time required form the departure point to the destination through each of these routes, a transportation means to be used is determined. It is possible to search a route, by which the user can reach the destination within short time utilizing a transportation means and which is suitable for pedestrians and walking conditions, and to present it to the user.

In the system according claim 19 of the present invention, there is provided a pedestrian map data generating means for preparing the pedestrian map data from a road map. It is possible to prepare a pedestrian map data using a currently available road map and supplementarily overlapping a street map on it.

In the system according to claim 20 of the present invention, there is provided a pedestrian map data generating means for preparing the pedestrian map data from a street map. It is possible to prepare a pedestrian map data by using data of a currently available street map and by supplementarily overlapping a road map on it.

In the system according to claim 21 of the present invention, the pedestrian route searching means searches with priority a contour street on outer periphery of the pedestrian area as a route for pedestrians. It is possible to provide route guidance by putting importance on larger streets easily understandable for pedestrians.

In the system according to claim 22 of the present invention, streets of a pedestrian area are divided to contour streets and streets within the area and are stored in the storage unit, and the contour streets are sequentially arranged clockwise or counterclockwise from a starting point. It is possible to efficiently perform route searching with priority on contour street as described in claim 21.

In the system according to claim 23 of the present invention, guidance is provided on a route searched by the pedestrian route searching means by associating with advancing direction of vehicles. It is possible to clearly indicate advancing direction for pedestrians without indicating landmarks or other unnecessary objects.

In the system according to claim 24 of the present invention, a route searched by the pedestrian route searching means is converted to a route guidance information in icons displayed by characters and is offered. By providing characters to match the information serving as landmark on the terminal equipment, it is possible to provide route guidance with the data transfer amount reduced.

In the system according to claim 25 of the present invention, a route searched by the pedestrian route searching means is deformed and offered. It is possible to reduce data transfer amount by deforming.

In the system according to claim 26 of the present invention, the deforming processing is performed using a polynomial function. By simply transferring coordinates and coefficient of the starting point and the end point of the function to the terminal equipment, it is possible reproduce the deformed route map at the terminal equipment.

In the system according to claim 27 of the present invention, the deforming processing is performed by calculating moving average of coordinates of the searched route. By transferring coordinates of a plurality of geographical points obtained by moving average method to the terminal equipment, it is possible to reproduce the deformed route map at the terminal equipment.

In the system according to claim 28 of the present invention, guidance is provided for a route in a premise searched by the pedestrian route searching means using a side view of the premise as seen from the route. It is possible to provide route guidance in easily understandable manner.

In the system according to claim 29 of the present invention, graphic information and attribute information relating to each of facilities in the premise are stored in the storage unit. In case route guidance is provided by means of the side view described in claim 28, graphic data such as notice board, guide board, escalator, elevator, toilet, coin-operated locker, telephone box, hydrant, stairway, emergency exit, etc. are read from the storage unit and are presented.

In the system according to claim 30 of the present invention, there is provided a pedestrian map data generating means for preparing street information in a premise using a Voronoi diagram. It is possible to efficiently extract the street from a vector diagram to indicate configurations in the premise.

In the system according to claim 31 of the present invention, the pedestrian route searching means searches a route in a premise by broken line function approximation using a map data of the premise. Even when street data are not available, it is possible to search a route.

In the system according to claim 32 of the present invention, the invention described in one of claims 28 to 31 is applied to a premise such as underground shopping center, a building or a station, and it is possible to provide route guidance at these places in a manner easily understandable.

In the system according to claim 33 of the present invention, the pedestrian map data generating means picks up a region of pedestrian area and contour street of the region from a road map, generates data of the pedestrian area by incorporating information of street block in the pedestrian area from a street map, and corrects the data of the contour street to follow the street block. By correcting deviation, which may occur in a combination of the data from a road map with the data from a street map, it is possible to obtain a data, which is closer to actual conditions.

In the system according to claim 34 of the present invention, the pedestrian map data generating means searches position after correction of the contour street using convex closure method. It is possible to provide a route smoothly in case of route searching.

In the system according to claim 35 of the present invention, the pedestrian map data generating means searches position after correction of the contour street by sequentially connecting vertexes of a street block where perpendicular lines to the nearest contour street can be drawn without crossing borderline of the street block. It is possible to correct to a condition closer to the actual conditions than the method of claim 34.

In the system according to claim 36 of the present invention, the pedestrian map data generating means searches position after correction of the contour street by sequentially connecting borderlines of the outermost street block, which cross a straight line extending from the center of the pedestrian area. Even in case configuration of a street block is complicated, it is possible to correct the position of a contour street to a condition closer to actual conditions.

In the system according to claim 37 of the present invention, the pedestrian route searching means provides an enlarged view of an intersection along the searched route by overlapping the enlarged view on a map to show the route. Because the route and the enlarged view of intersections are displayed at the same time, the pedestrian can understand which route should be followed without taking wrong advancing direction.

The system according to claim 38 of the present invention is the same as the pedestrian information providing system according to claim 35 or 36, wherein vertexes or borderlines of the street block to find out a position after correction are limited to vertexes or borderlines within a predetermined distance from the contour street, and the distance is changed according to road width of the contour street. It is possible to perform correction more accurately and to obtain street information with less error.

In the system according to claim 39 of the present invention, the pedestrian map data generating means forms as many nodes as equal to number (degree) of links connected to the nodes from each node on a basic road on a road map, each of the formed nodes is connected only with two adjacent links forming different internal angles within the link, and a pedestrian area is generated by following the formed nodes. It is possible to generate a pedestrian route network in quick and easy manner.

In the system according to claim 40 of the present invention, the pedestrian map data generating means performs route searching for all bearings from an arbitrary node on a road map, and a pedestrian area is generated by grouping nodes and links of all roads where each of tips of the route searching passes through until the basic road is reached. With special attention on connecting relation of all-road nodes on a road map, pedestrian area is generated by route searching, and it is possible to generate pedestrian map data even when attribute information of nodes such as degree of basic road is not prepared satisfactorily.

In the system according to claim 41 of the present invention, the pedestrian map data generating means calculates flow rate of pedestrians in each link with the pedestrian area, and in case there is a link where the flow rate exceeds a predetermined value, the link is considered as a street going over a non-pedestrian area, and a non-pedestrian area is generated within the pedestrian area. Even when attribute information on a road map is not prepared satisfactorily, it is possible by this method to recognize a bridge, i.e. a street going over a non-pedestrian area, in a pedestrian map by this method.

In the system according to claim 42 of the present invention, the pedestrian map data generating means generates a pedestrian map data by combining several of the generating methods described in claims 19, 20, 30, 33, 34, 35, 36, 38, 39, 40 and 41. By combining these methods, it is possible to efficiently generate a pedestrian map with less error.

The invention of claim 43 provides a storage unit for storing pedestrian map data, and it is a component element to constitute a pedestrian information providing system together with a pedestrian information processing unit, whereby the storage unit stores a data of an area divided to a nonpedestrian area where pedestrians cannot walk freely and a pedestrian area where pedestrians can walk freely, a data of street where pedestrians can walk within each of the areas, a data of block where pedestrians cannot walk in each of the areas, an index for searching the block or the street from an address or a name, and a table describing the areas belonging to each section on a map. It is possible to provide the user with information such as useful route information or information on adequate pedestrian route suitable for pedestrians and walking conditions, or information such as map data of the vicinity of destination and departure point via the pedestrian information processing unit.

The invention of claim 44 provides a pedestrian information processing unit, which is a component element to constitute a pedestrian information providing system together with a pedestrian map data storage unit, whereby the pedestrian information processing unit comprises an input/output control means for receiving input from the user, a pedestrian map data searching means for acquiring a pedestrian map data suitable for inputting from the storage unit, and a pedestrian route searching means for searching a route for pedestrians using the data acquired, and a pedestrian map data required is acquired from the storage unit according to input instruction from the user and an information to be offered is generated. Based on the information from the pedestrian map data storage unit, it is possible to provide the user with information such as useful route information or information on adequate pedestrian route suitable for pedestrians and walking conditions and also with information such as map data of the vicinity of destination and departure point.

BRIEF DESCRIPTION OF THE DRAWINGS

FIG. 9 represents examples of pedestrian area data;

FIG. 13 is an example of a map-area correspondence table;

FIG. 14 is an example of a town table;

FIG. 19 shows an example of input data in a latitude/longitude corresponding data means;

FIG. 20 shows an example of block data;

FIG. 26 is an example of input data in the attribute determining means;

FIG. 27 represents a user category table;

FIG. 28 represents a weather and time category table;

FIG. 29 represents a table showing priority rank of street attributes determined;

FIG. 31 shows an example of input values of the neural net;

FIG. 32 shows examples of weight constants of input/output of the neural net;

FIG. 33 shows examples of output values of the neural net;

FIG. 36 shows an example of an input data in the route searching between two geographical points;

FIG. 37A, FIG. 37B and FIG. 37C each represents examples of area data used in the route searching between two geographical points;

FIG. 38A, FIG. 38B and FIG. 38C each represents continuation of examples of area data used for the route searching between two geographical points;

FIG. 39A and FIG. 39B each represents examples of block data used in the route searching between two geographical points;

FIG. 40A and FIG. 40B each represents continuation of examples of block data used in the route searching between two geographical points;

FIG. 41A and FIG. 41B each represents continuation of examples of block data used in the route searching between two geographical points;

FIG. 42A and FIG. 42B each represents examples of street data used in the route searching between two geographical points;

FIG. 43A and FIG. 43B each represents continuation of street data used in the route searching between two geographical points;

FIG. 44A and FIG. 44B each represents continuation of examples of street data used in the route searching between two geographical points;

FIG. 45A and FIG. 45B each represents continuation of examples of street data used in the route searching between two geographical points;

FIG. 46A and FIG. 46B each represents continuation of street data used in the route searching between two geographical points;

FIG. 47A and FIG. 47B each represents continuation of examples of street data used in the route searching between two geographical points;

FIG. 48A and FIG. 48B each represents continuation of examples of street data used in the route searching between two geographical points;

FIG. 50 represents an example of input data in the route searching in case one of the two geographical points is under the ground;

FIG. 53 shows an example of input data in the route searching in case one of the two geographical points is under the ground and the other is in a building;

FIG. 55 shows examples of input data in the route searching in case there are two or more destinations;

FIG. 58 shows an example of input data in the route searching in case two or more transportation means are used;

FIG. 59 is a conceptual drawing of a route from departure point to the nearest station in the route searching in case two or more transportation means are used;

FIG. 61 shows an example of input data in the pedestrian time simulation;

FIG. 62 shows examples of output data in the pedestrian time simulation;

FIG. 64 shows examples of input data in the pedestrian scheduling;

FIG. 66 shows an example of input data in the determination of transportation means;

FIG. 67 represents an example of bus schedule used in the determination of transportation means;

FIG. 68 shows an example of output data in the transportation determining means;

FIG. 69 shows an example of output data in the transportation determining means;

FIG. 74 shows an example of road map data;

FIG. 75A–FIG. 75C each represents examples of map data for pedestrians;

FIG. 76 shows other examples of the prepared map data for pedestrians;

FIG. 77 shows examples of blocks for the prepared map data for pedestrians;

FIG. 78 shows examples of streets in the prepared map data for pedestrians;

FIG. 79 shows other examples of streets in the prepared map data for pedestrians;

FIG. 82 shows examples of data of map of numerical values;

FIG. 83 shows examples of road data in an area of map data for pedestrians;

FIG. 84 shows examples of the prepared map data for pedestrians;

FIG. 88 shows examples of data of the results of route searching with priority on contour road;

FIG. 99 represents a map showing a route on a deformed map;

FIG. 100 shows an example of data of output results;

FIG. 101 is a flow chart showing procedure of input/output control means for providing deformed display using moving average method in an eleventh embodiment;

FIG. 119 represents a drawing of a route obtained by broken line approximation;

FIG. 120 is a drawing of a corrected route;

FIG. 121 shows an example of a premise drawing;

FIG. 122 is a drawing of a route obtained by broken line approximation;

FIG. 123 is a drawing of a corrected route;

FIG. 124 shows an example of a premise drawing;

FIG. 125 is a flow chart to show procedure of pedestrian map data generating and editing means for preparing pedestrian map data of a seventh embodiment;

FIG. 126 is a drawing to show contour coordinate and street block in a road map in a pedestrian area before correction;

FIG. 127 is a drawing to show result by adapting convex closure calculation;

FIG. 128 is a drawing to show a corrected pedestrian area;

FIG. 129 is a flow chart showing a second correcting procedure of pedestrian map data;

FIG. 130 is a drawing of the result by adapting the second correcting procedure;

Figure 131:
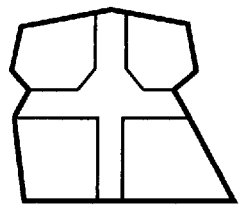
Figure 132:
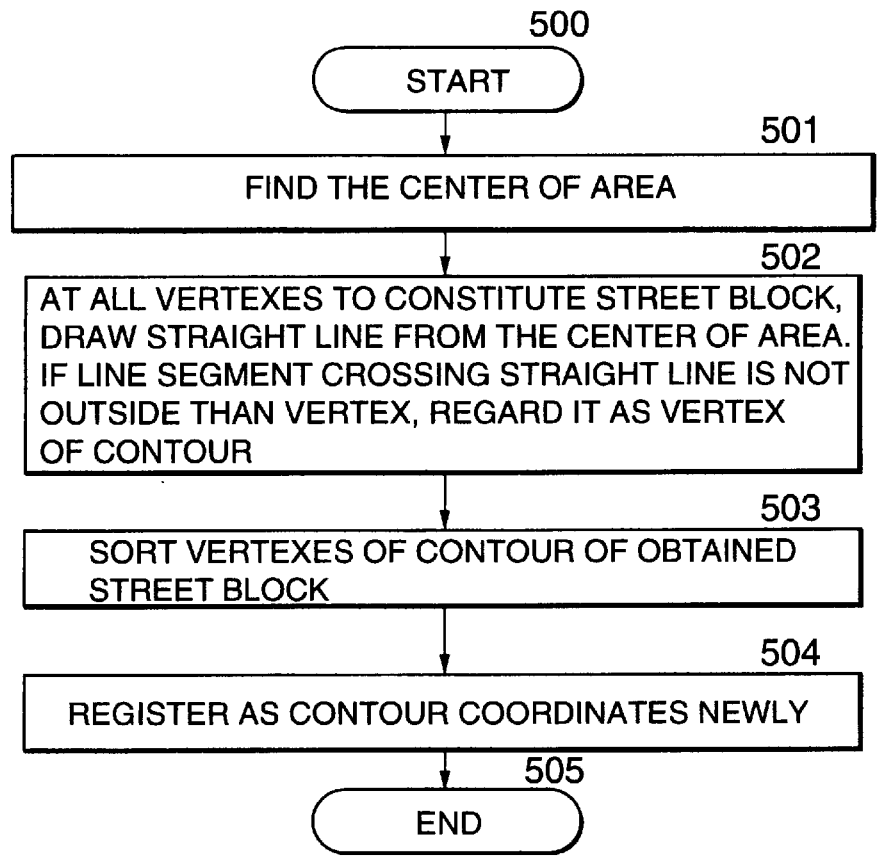
Figure 133:
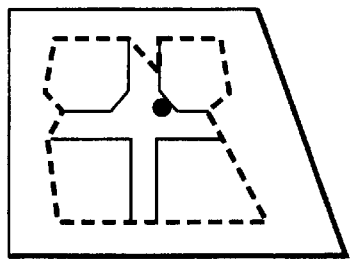
Figure 134:
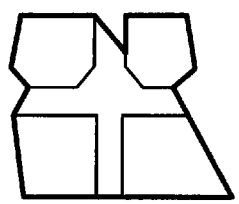
Figure 135:
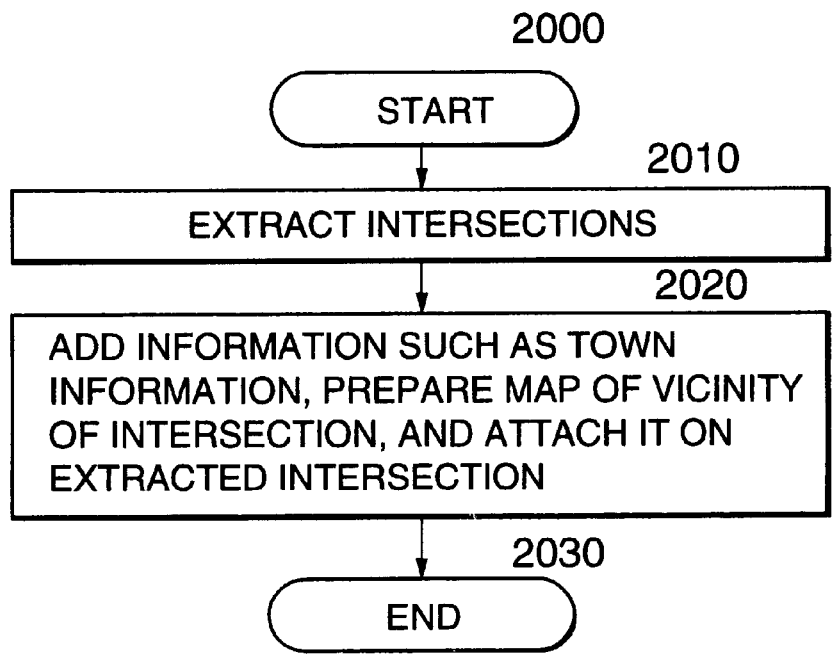
Figure 136:
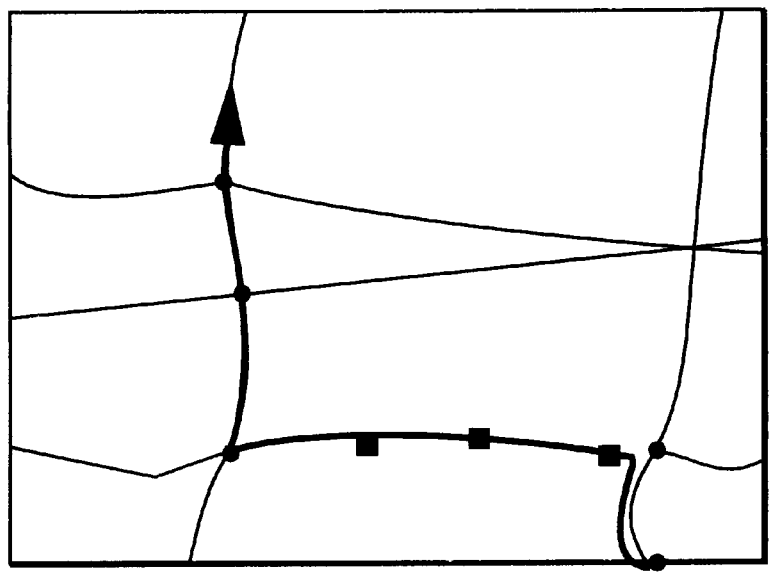
Figure 137:
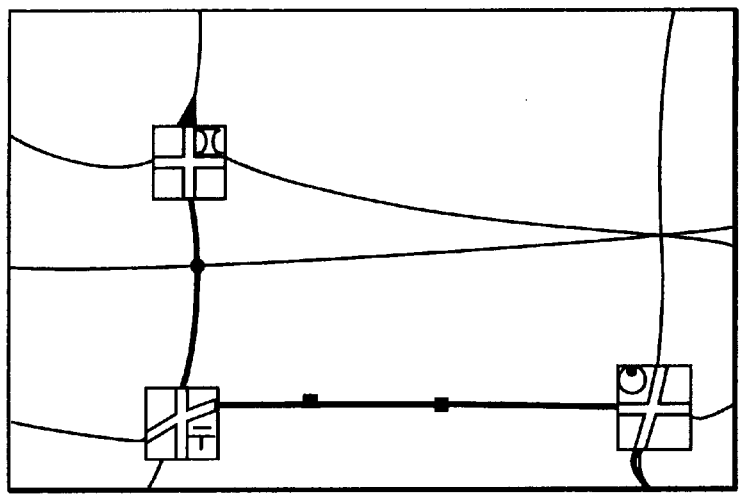
Figure 138:
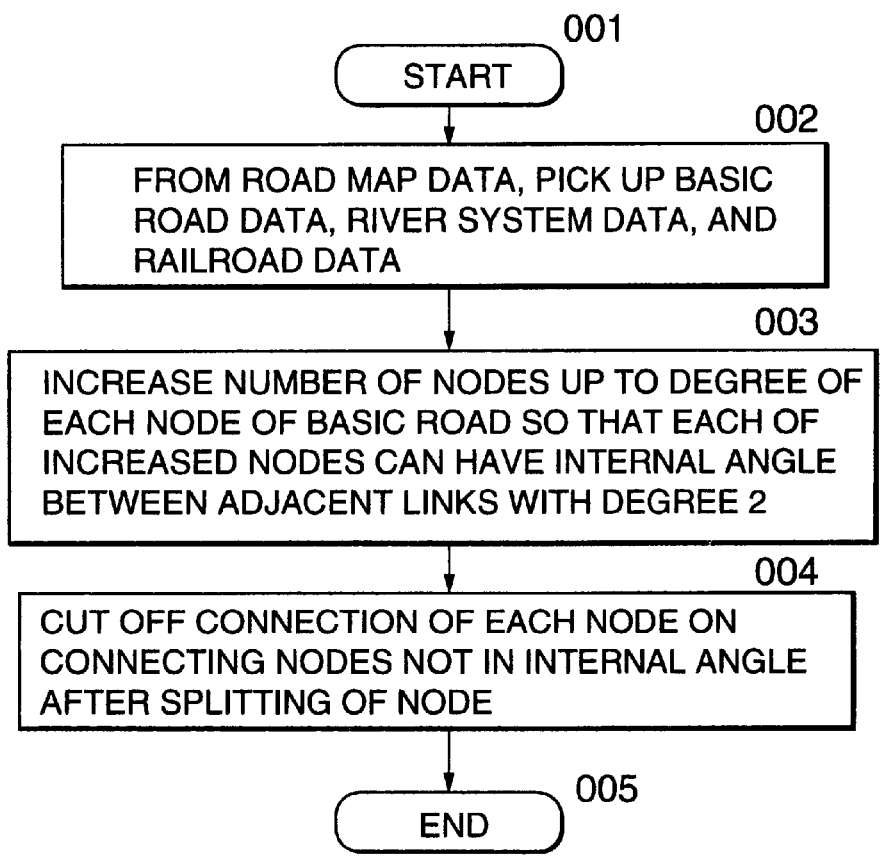
Figure 139A:
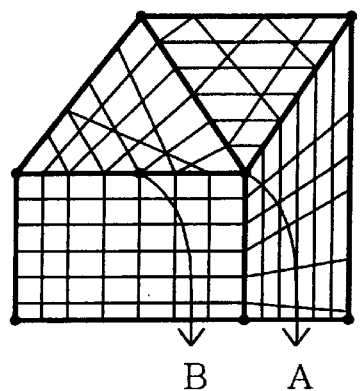
Figure 139B:
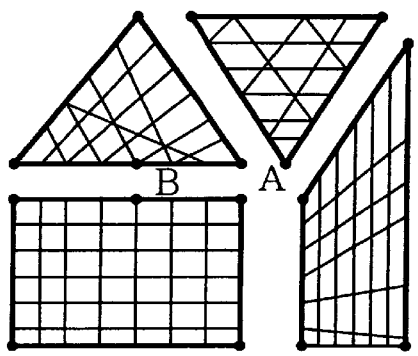
Figure 140B:
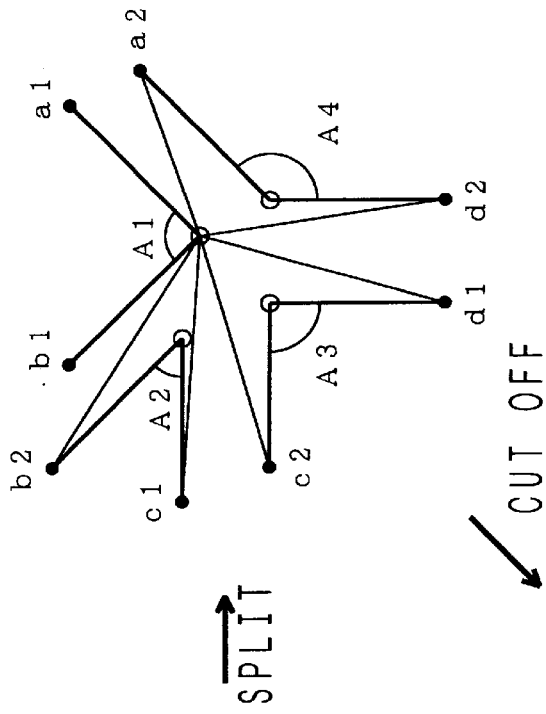
Figure 140A:
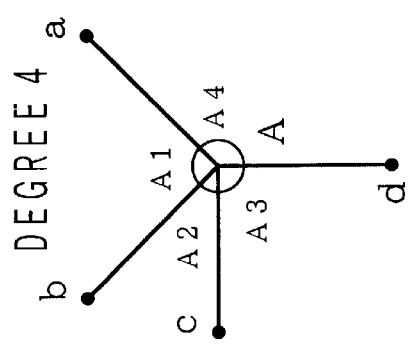
Figure 140C:
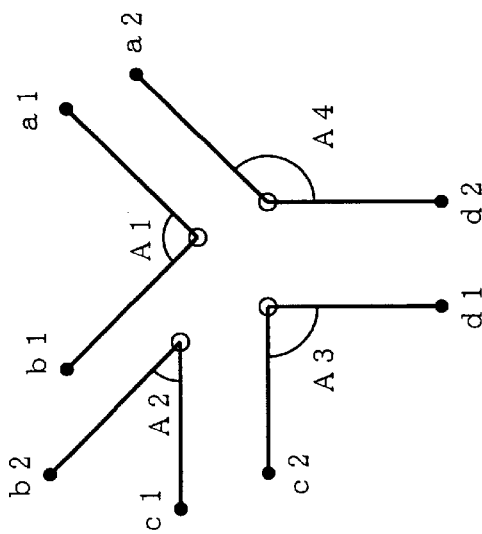
Figure 141:
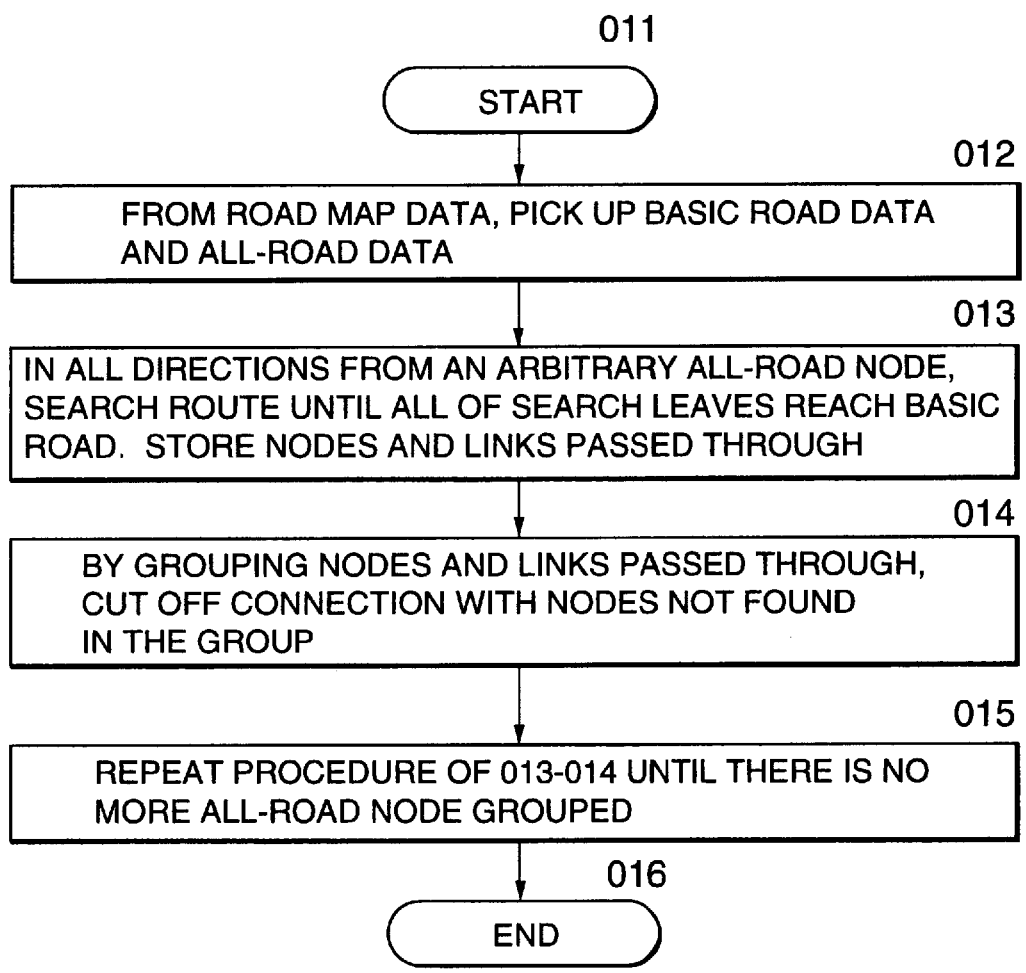
Figure 143:
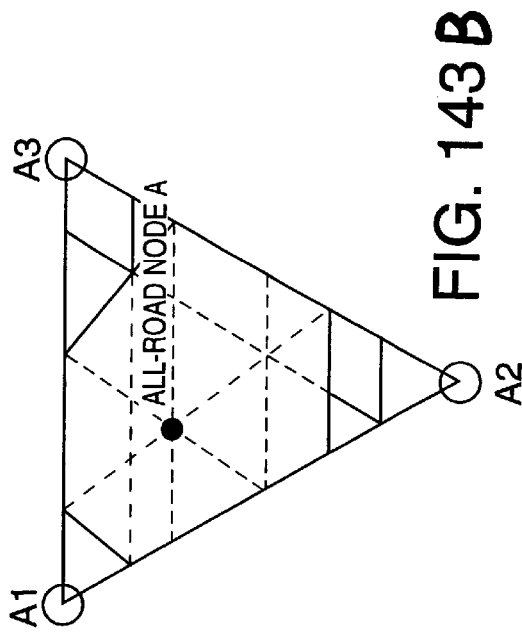
Figure 143:
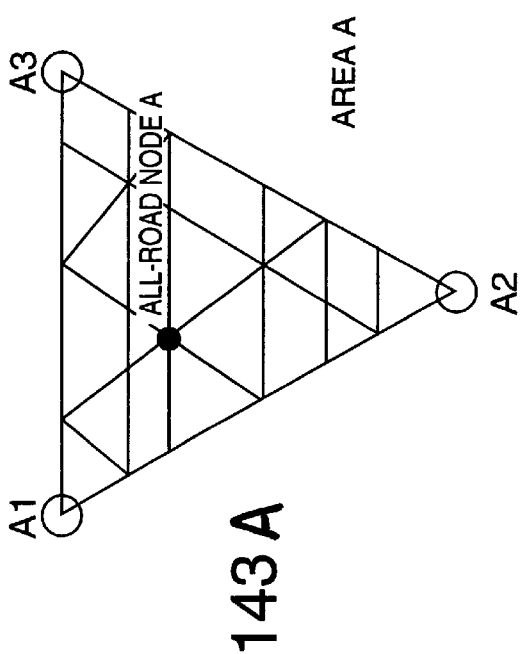
Figure 143:
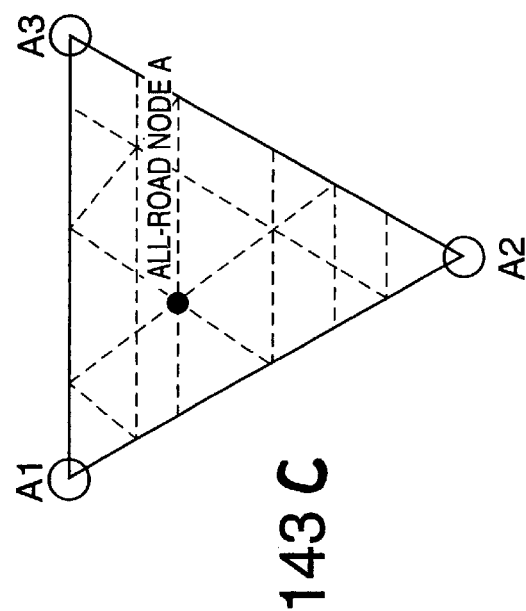
Figure 144:
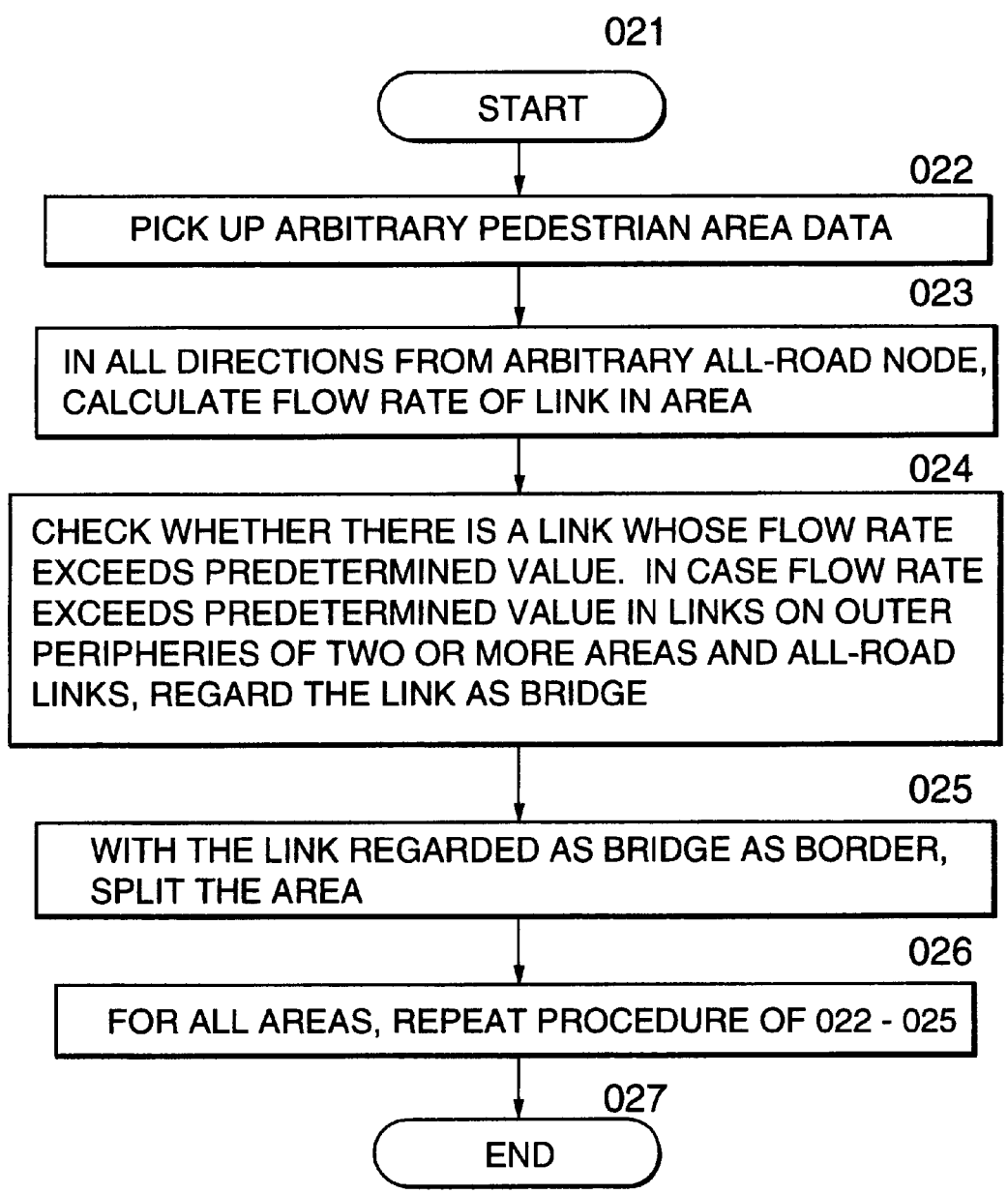
Figure 145:
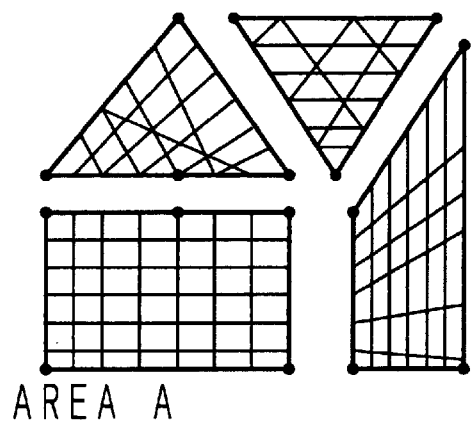
Figure 146:
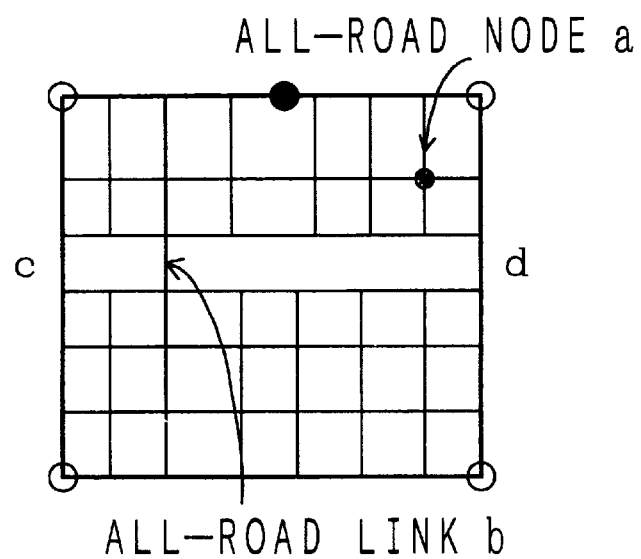
Figure 147:
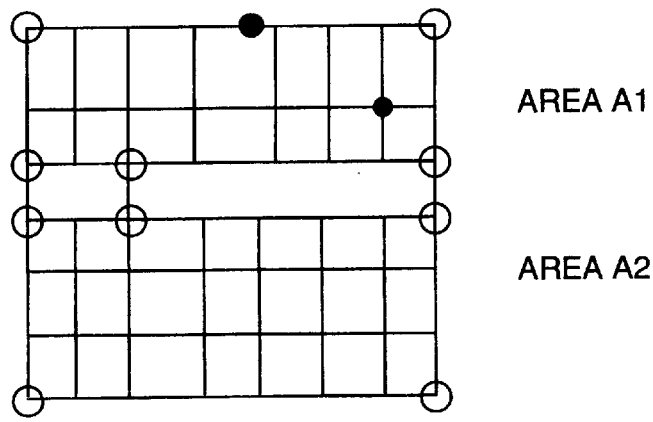
Figure 148:
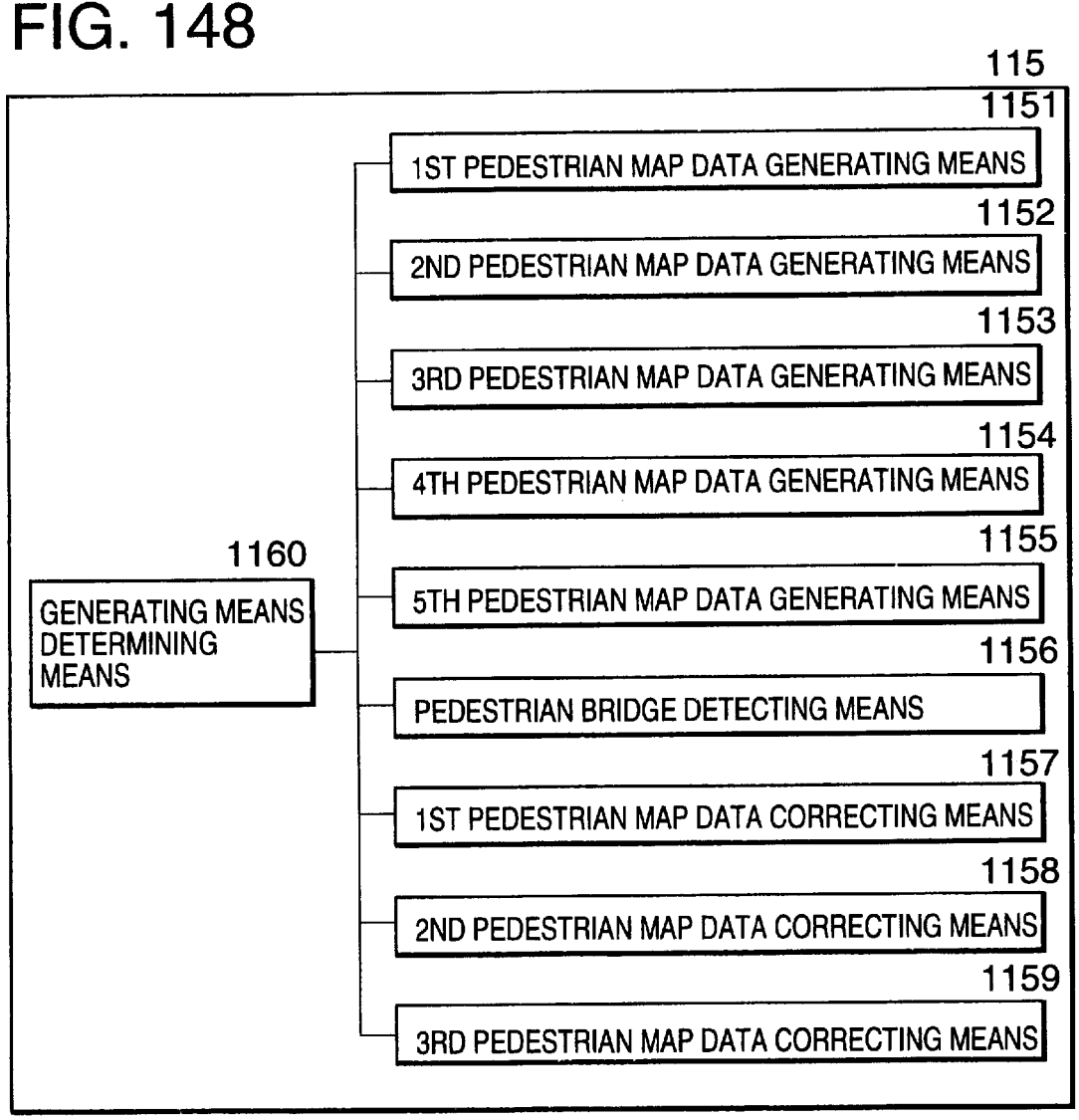

FIG. 131 is a drawing to show a pedestrian area corrected by the second correcting procedure;

FIG. 132 is a flow chart showing a third correcting procedure of the pedestrian map data;

FIG. 133 is a drawing of the result by adapting a third correcting procedure;

FIG. 134 is a drawing to show a pedestrian area corrected by the third correcting procedure;

FIG. 135 is a flow chart to show procedure of input/output control means for performing intersection enlarged display processing in a fourteenth embodiment;

FIG. 136 is a drawing to show the result of route searching;

FIG. 137 is a drawing to show display example of the results of route searching;

FIG. 138 is a flow chart to show operating procedure of the pedestrian map data generating and editing means in the third embodiment;

FIGS. 139A and 139B are conceptual illustrations of a map for pedestrian generated by the pedestrian map data generating and editing means;

FIGS. 140A to 140C represents illustrations a to explain generating operation of the pedestrian map data generating and editing means;

FIG. 141 is a flow chart to show operating procedure of the pedestrian map data generating and editing means in the fourth embodiment;

FIG. 142 represents conceptual drawings for the pedestrian map generated by the pedestrian map data generating and editing means;

FIGS. 143A to 143C represent drawings to explain generating operation of the pedestrian map data generating and editing means;

FIG. 144 is a flow chart to show operating procedure of the pedestrian map data generating and editing means of the fifth embodiment;

FIG. 145 represents a drawing to explain generating operation of the pedestrian map data generating and editing means;

FIG. 146 is a partial enlarged view of the above explanatory drawing;

FIG. 147 is an explanatory drawing to explain a map data generated by the pedestrian map data generating and editing means; and FIG. 148 is a block diagram to show an arrangement of the pedestrian map data generating and editing means of the eighth embodiment.

BEST MODE FOR CARRYING OUT THE INVENTION

In the following, description will be given on embodiments of the present invention referring to the attached drawings.

1st Embodiment

Figure 1:
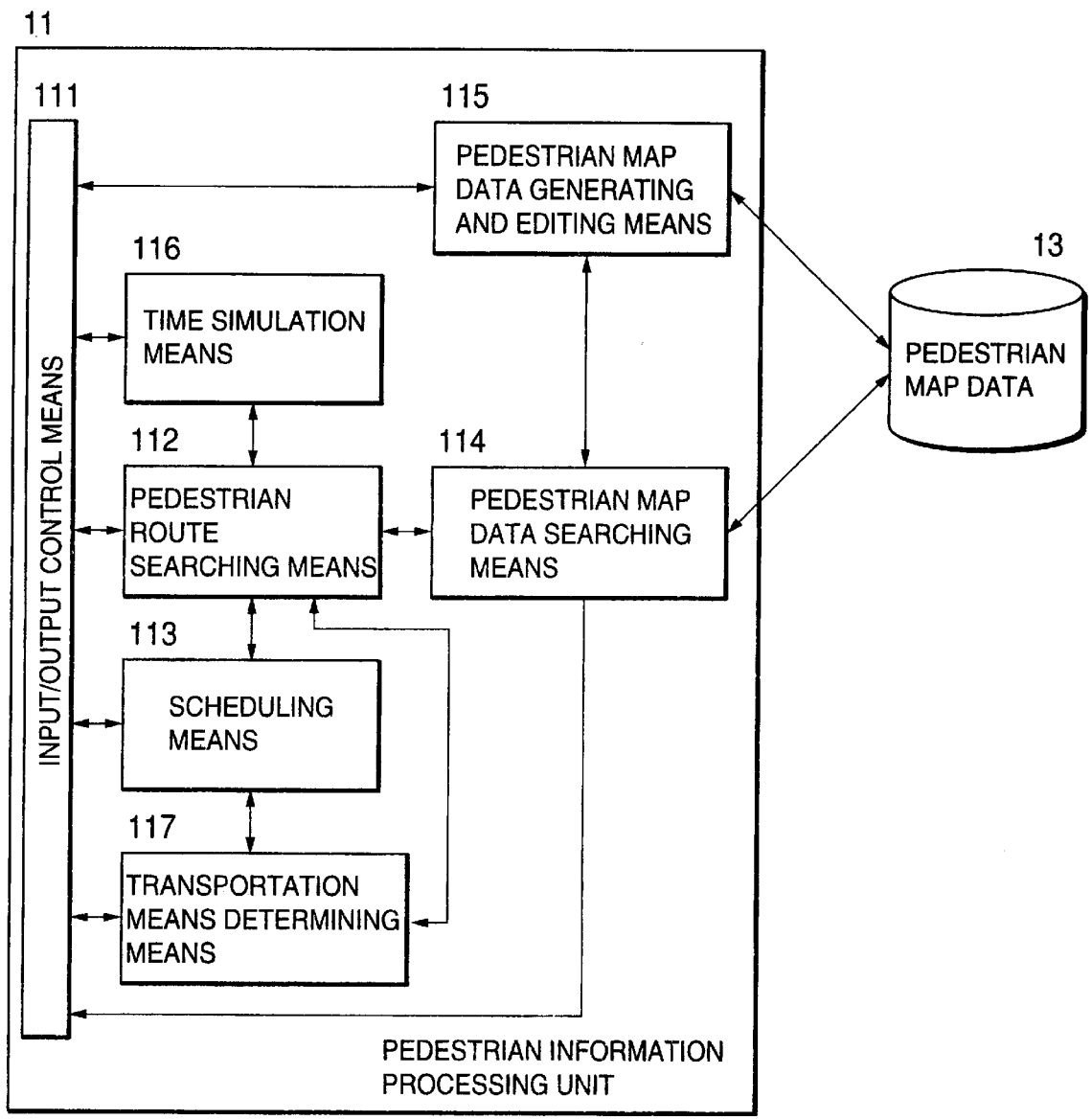
FIG. 1 shows a first embodiment of a pedestrian information providing system according to the present invention.

As shown in FIG. 1, the pedestrian information providing system of the first embodiment of the present invention comprises a storage unit for storing a pedestrian map data 13 specially prepared for pedestrians, and a pedestrian information processing unit 11 for generating and editing the pedestrian map data 13 and for reading the pedestrian map data 13 and for generating information to be offered.

In this system, a user has a portable terminal equipment. There are a storage unit storing the pedestrian map data 13 and the pedestrian information processing unit 11 at the center. When the user requests information from the terminal equipment, the center performs searching of the requested information and generation processing by the pedestrian information processing unit 11 upon receipt of the request, and the result is sent to the terminal equipment.

Also, it may be designed in such manner that the terminal equipment on the user side comprises the pedestrian information processing unit 11, and the pedestrian map data 13 stored in the storage unit at the center is read and processed as necessary, and the results are displayed on a screen of the terminal equipment.

In this case, the portable terminal equipment of the user and the center can give and receive information or signal by wireless communication. As such communication system, cellular system in portable telephone or PHS (personal handyphone system) may be used. As the portable terminal equipment of the user, an equipment comprising CPU (central processing unit), memory, interface, cursor key, etc. further provided with a display unit having graphic display function may be used. Also, by adding a touch panel on the display unit, the desired instruction can be inputted when the user simply touches an arrow or other icons in a map displayed on the display unit.

To make the system of the present invention usable in an area of wide range, a cellular system is used as described above. If it is supposed that PHS is used, the present position of PHS terminal (slave set) is registered at a wireless base station (master set of the cell), and communication with the center can be performed through the wireless base station. When the user is walking and goes out of the registered cell and enters the next cell, the position is registered at the wireless base station of that cell. For the wireless access system, 4-channel multiplex TDMA-TDD (Time Division Multiple Access-Time Division Duplex) can be used.

In the description given below, it is supposed that the terminal equipment on the user side has the function of the pedestrian information processing unit 11, and the function of the pedestrian information processing unit 11 will be explained here.

The pedestrian information processing unit 11 comprises an input/output control means 11 for receiving input from the user, a pedestrian map data generating and editing means 115 for generating and editing the pedestrian map data 13 (In case the pedestrian information processing unit 11 is at the terminal equipment on the user side, the pedestrian map data generating and editing means 115 is arranged on the center side.), a pedestrian map data searching means 114 for searching a map data in the corresponding area from the pedestrian map data 13, a pedestrian route searching means 112 for searching a route for pedestrians using the searched pedestrian map data 13, a scheduling means 113 for setting up a plan to make an inspection tour for a plurality of destinations according to a schedule determined in advance, a time simulation means 116 for simulating a time of arrival at the destination, and a transportation determining means 117 for selecting a transportation means, by which the destination can be reached at an earliest chance.

Figure 2:
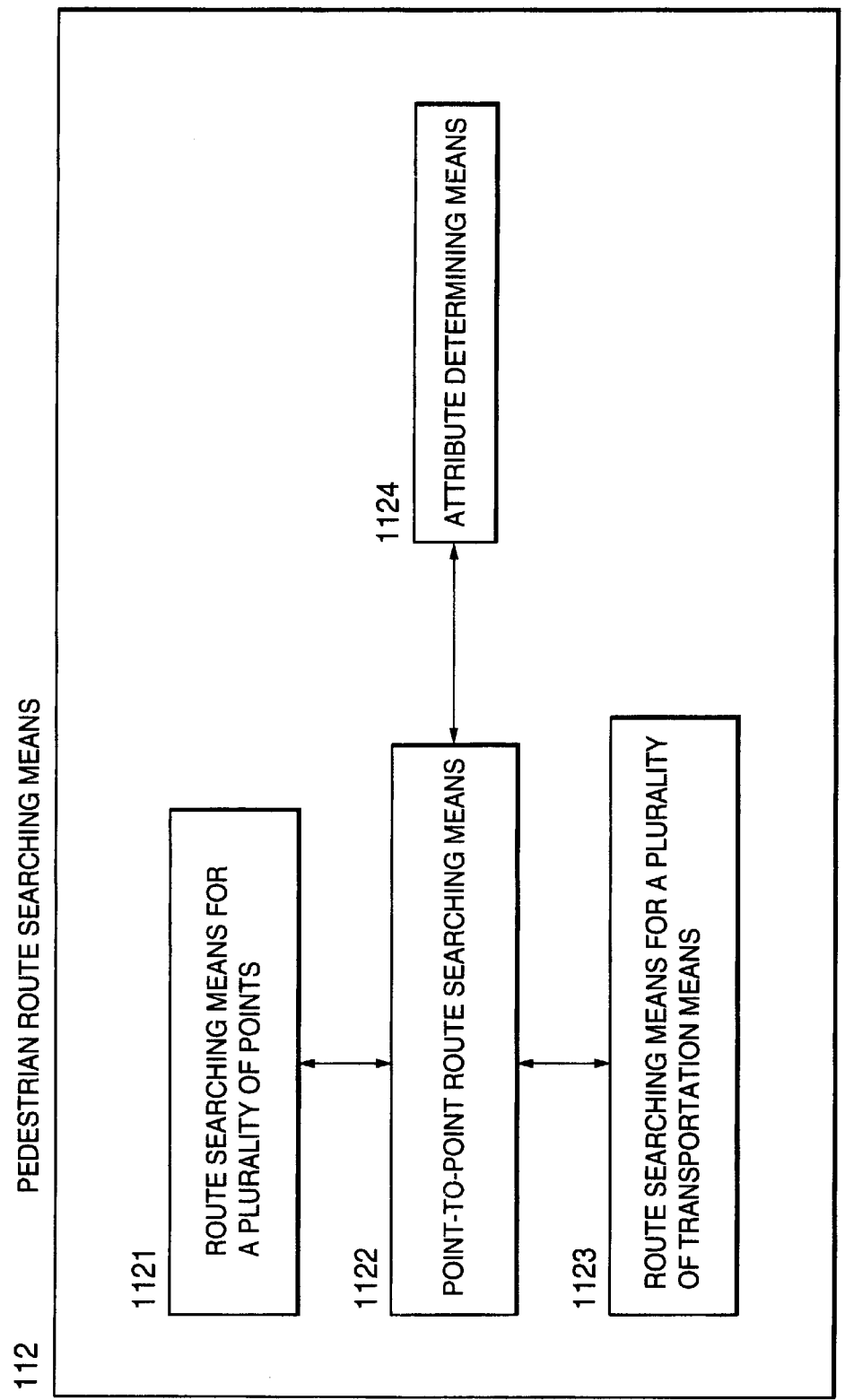
FIG. 2 is a block diagram of a means for searching a route for pedestrians.

As shown in FIG. 2, the pedestrian route searching means 112 comprises a route searching means 1122 for searching a route between two points, i.e. departure point and destination, a route searching means 1121 for searching a route connecting a plurality of geographical points in case there are two or more destinations, a route searching means 1123 for searching a route in case two or more transportation means are used, and an attribute determining means 1124 for determining attributes of a route, which should be considered in selecting a route.

Figures 3, 4:
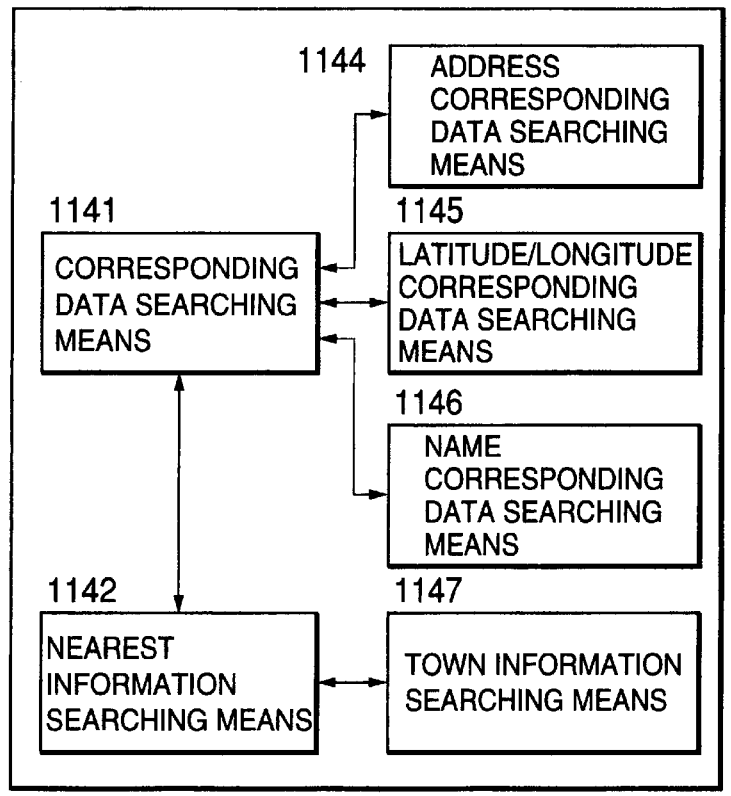
FIG. 3 is a block diagram of a means for searching map data for pedestrians.
FIG. 4 represents a table of block and street relating to a pedestrian area and a non-pedestrian area.

As shown in FIG. 3, the pedestrian map data searching means 114 comprises an address corresponding data searching means for searching a block corresponding to the inputted address, a latitude/longitude corresponding data searching means 1145 for searching a block to correspond to the inputted latitude/longitude, a name corresponding data searching means 1146 for searching a block to correspond to the inputted name, a town information searching means 1147 for searching an object, a corresponding data searching means 1141 for searching by starting the address corresponding data searching means 1144, the latitude/longitude corresponding data searching means 1145 or the name corresponding data searching means 1146 in response to the inputted data, a town information searching means 1147 for searching an object from a town table where town information is recorded, and a nearest information searching means 1142 for searching a desired town information using the two information searching means 1147 while extending the area to be searched to adjacent area.

Next, description will be given on a pedestrian map specially prepared for pedestrians. The area of the pedestrian map as shown by the pedestrian map data 13 is divided to an area (non-pedestrian area) such as road with heavy traffic, expressway, railway, rivers and canals, etc. where pedestrians cannot walk safely, and an area (pedestrian area) bordered and defined by the non-pedestrian area and where pedestrians can walk safely.

Each of the non-pedestrian area and the pedestrian area comprises streets where pedestrian can walk and blocks where pedestrians cannot pass freely. In the non-pedestrian area (e.g. on a road with heavy traffic), footbridge or pedestrians' crossing is considered as a street, and the other portions of the road are considered as blocks. In case of rivers and canals, bridges are considered as streets. In railroad, railroad crossings and subterranean walks are considered as streets. In the pedestrian area, road where pedestrians can walk are considered as streets, and houses, buildings and unoccupied and reserved grounds are considered as blocks.

In the non-pedestrian area, areas where pedestrians cannot walk freely due to steps (with different height) or difference in management are included. In case of the steps, stairways, elevators, escalators, etc. are considered as streets. In the non-pedestrian area where pedestrians cannot walk freely due to difference in management body, wickets or toll gates are considered as streets.

In case a block in the pedestrian area is a large building, there are non-pedestrian area and pedestrian area inside this building. Each floor of this building is a pedestrian area, portions other than floors are non-pedestrian areas, and an elevator connecting the floors is considered as a street in the non-pedestrian area.

Figure 5:
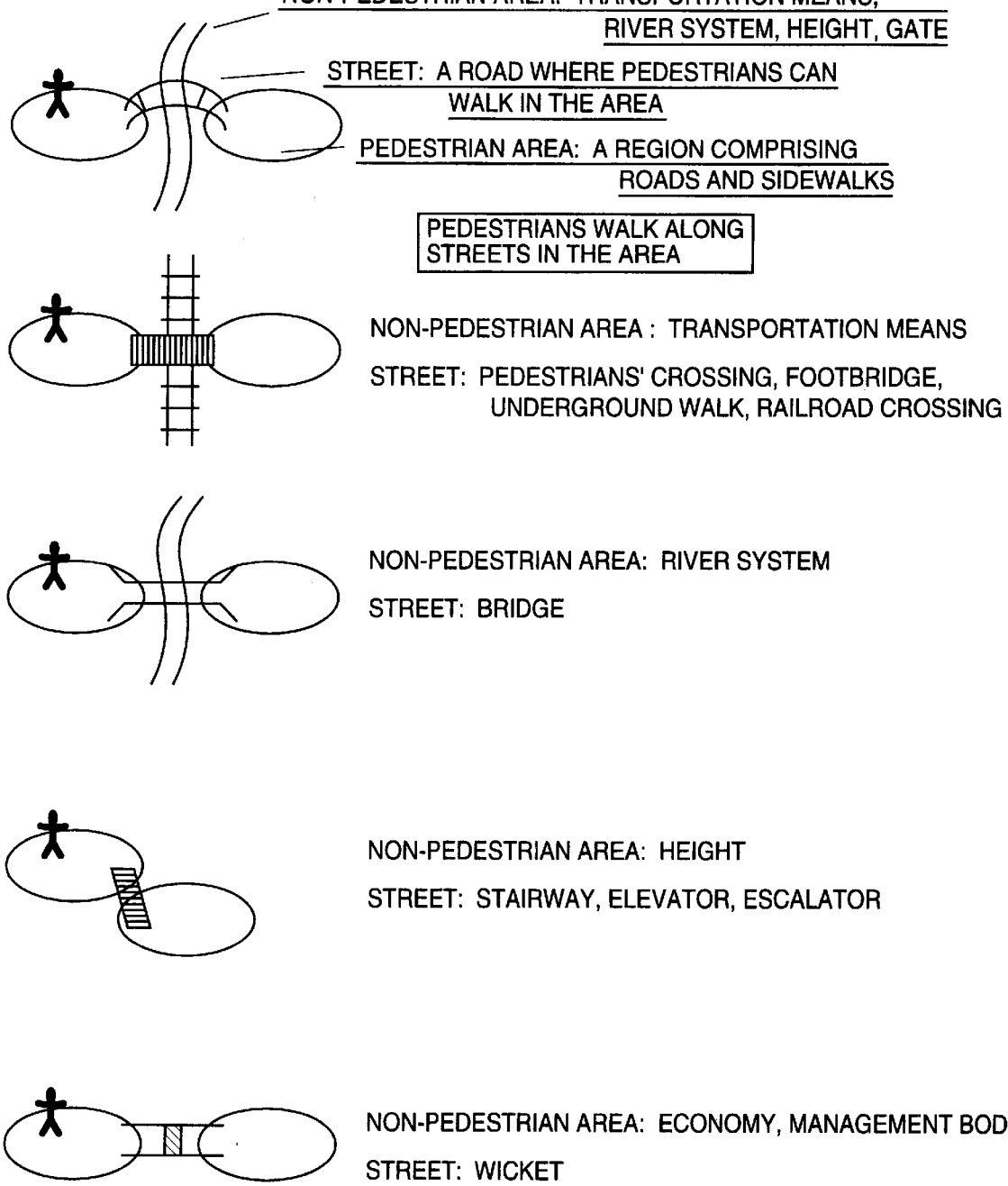
FIG. 5 represents conceptual drawings relating to classification of non-pedestrian area.

FIG. 4 is a correspondence table of blocks and streets in the pedestrian area and the non-pedestrian area. The pedestrian area and the non-pedestrian area are the same in structure while they are different from each other in the contents of objects. FIG. 5 summarizes classification of streets in each of the non-pedestrian area.

Figure 6:
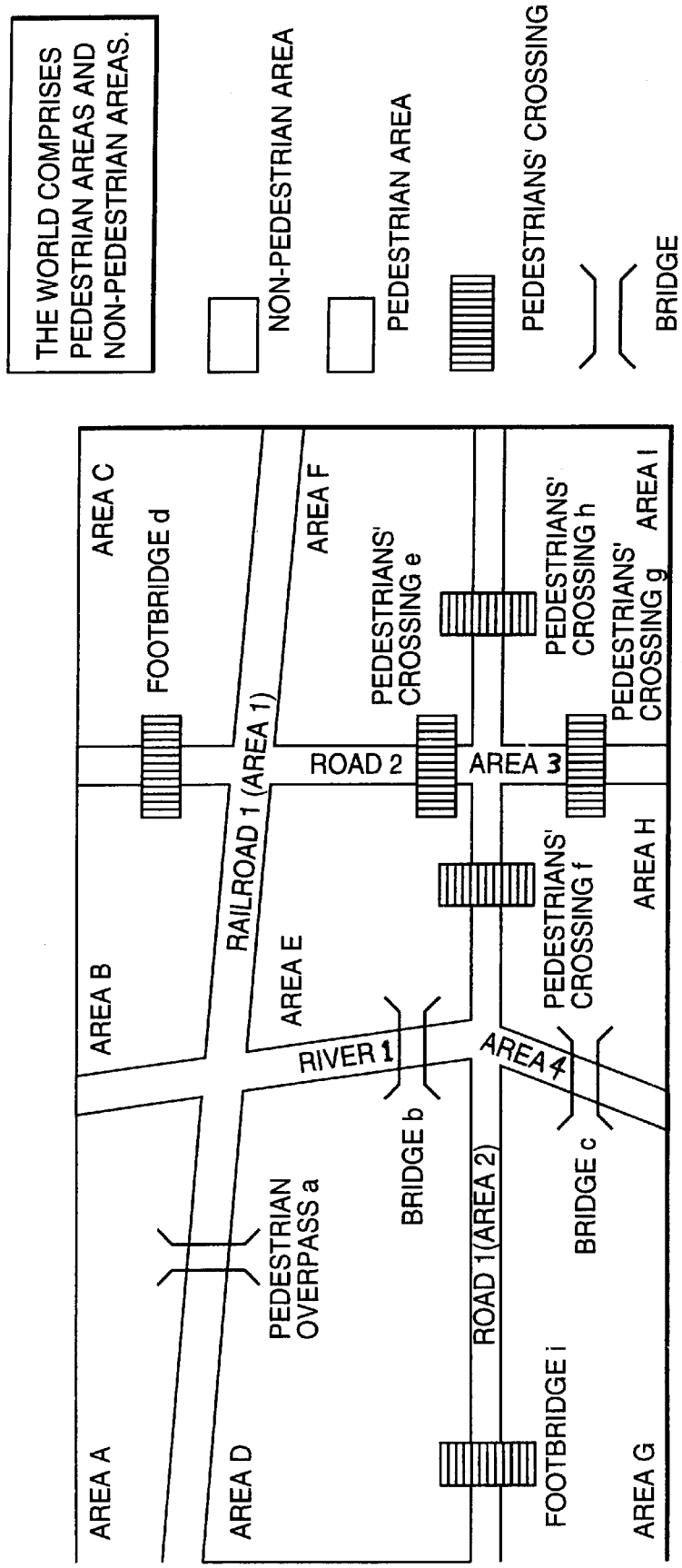
FIG. 6 represents a basic conceptual drawing of a map for pedestrians.

FIG. 6 shows basic arrangement of a pedestrian map. Area 1 (railroad 1), area 2 (road 1), area 3 (road 2), and area 4 (river 1) are non-pedestrian areas, and areas A to I are pedestrian areas. Footbridge, pedestrians' crossing, bridge, and overpass are streets in the non-pedestrian area.

Figure 7A:
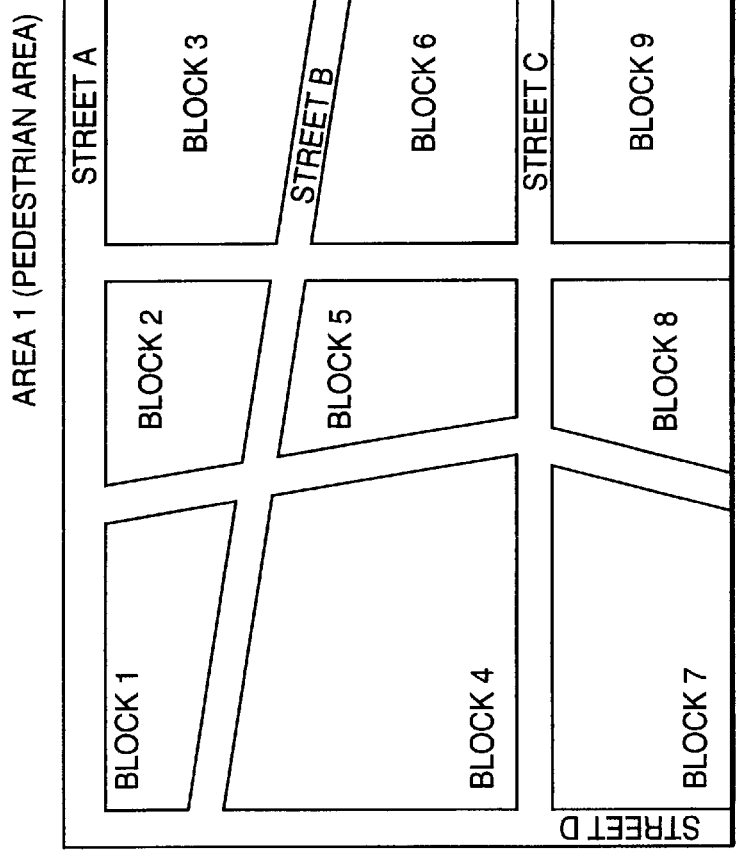
FIG. 7A is a block diagram of a pedestrian area.
Figure 7B:
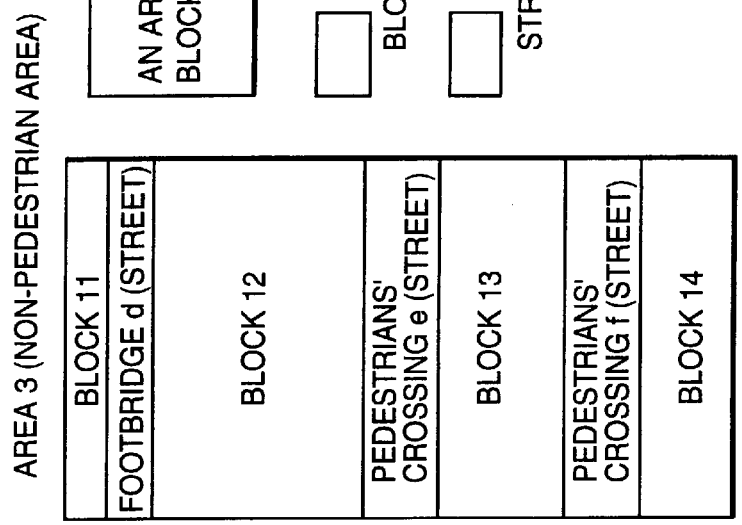
FIG. 7B is a block diagram of a non-pedestrian area.

FIGS. 7A and 7B show an arrangement in an area. FIG. 7A shows details of a pedestrian area I, and FIG. 7B shows details of a non-pedestrian area 3. The pedestrian area I comprises blocks 1 to 9 and 6 streets, and blocks can be classified to blocks having an arrangement of an area such as building, and blocks having no arrangement of an area such as unoccupied ground.

Figure 8:
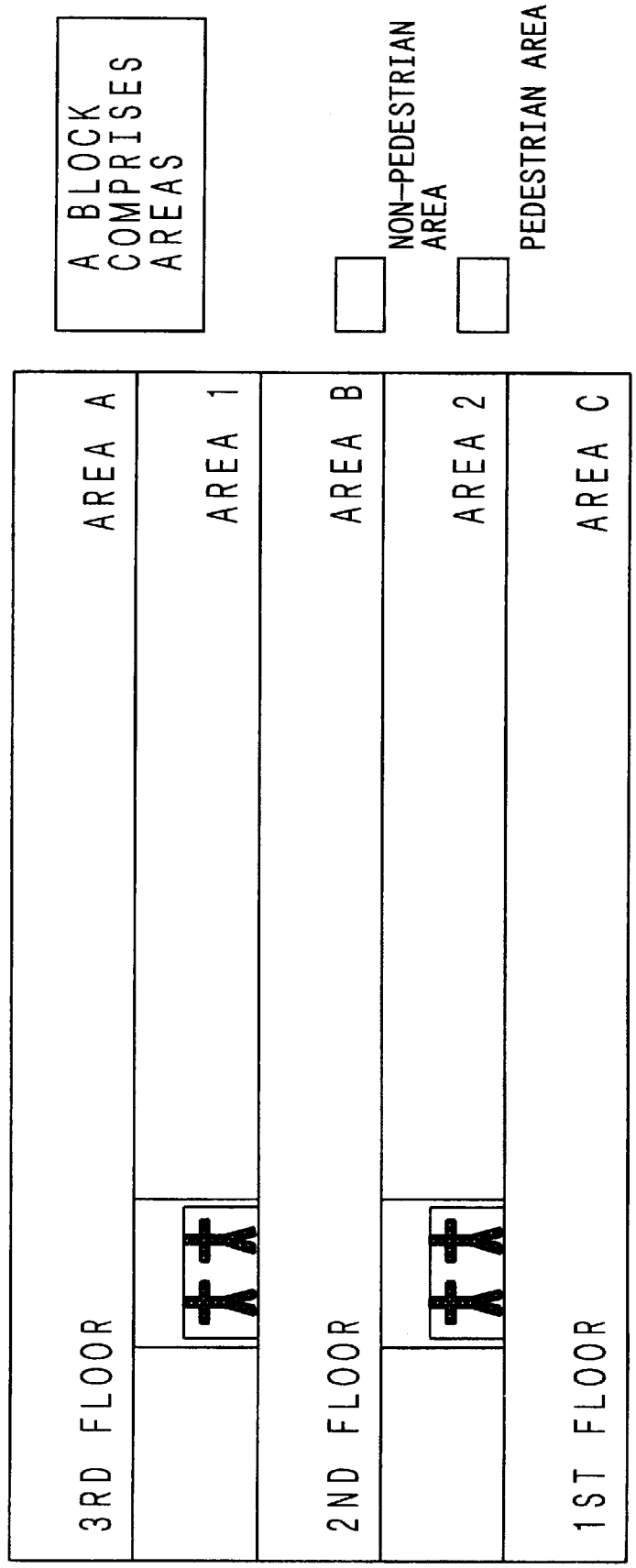
FIG. 8 is a block diagram of a block, which comprises elements of areas.

FIG. 8 shows a block having an arrangement of an area (block 9 of FIG. 7A). In this example, each floor of the building is a pedestrian area, portions other than the floors are non-pedestrian areas, and an elevator connecting the floors is considered as a street in the non-pedestrian area. Thus, an area in the pedestrian map has a hierarchical structure.

In the pedestrian map data 13, area data relating to each area, block data relating to each block, and street data relating to each street are stored. As shown in FIG. 9, the area data include the following data: area attributes describing attributes such as area ID, area name, attributes such as street/floor/river, etc., a slave block describing blocks present in the area, a slave street describing streets present in an area, entrance and exit showing streets entering or outgoing from an area, an adjacent area describing adjacent area, a master block describing blocks present in an area in case the area belongs to a building, a map number, to which the area belongs, an administration region, to which the area belongs, and data such as polygonal information comprising the area.

As shown in FIG. 39A to FIG. 41B, block data include the following data: block ID, block name, master area, to which the block belongs, slave area in case the block includes the area, attributes of blocks to classify blocks such as buildings/parks, etc., connecting street, to which entrance and exit of the block are connected, map number where the block is present, coordinates of the block on map, address, to which the block belongs, polygonal information to form a block, and 3-dimensional data. In FIG. 39A to FIG. 41B, polygonal information and 3-dimensional information are not given.

As shown in FIG. 42A to FIG. 48B, the following data are included in the street data: street name, street ID, classification of street such as sidewalk/stairway/elevator/escalator, master area, to which the street belongs, map, to which the street belongs, address, to which the street belongs, adjacent block connected with the street, coordinates of starting point of the street, street connected to the starting point, coordinates of end point of the street, street connected to the end point, length of the street, etc. Further, the following data are included: attached facilities information such as street covering, street light/roadside trees/mail boxes/telephone poles/public telephones/automatic vending machines/bus stops/manholes/hydrants/fire extinguishers/water pipes/garbage dumps/guide plates for blind, etc., sidewalk road surface information such as walking distance/height difference/road surface condition, etc., and time-related information such as traffic condition/vehicle traffic/traffic congestion information/sunny place information, etc.

In the conventional road data, road is included in link data, and intersection is included in node data, and the data has a structure of ineffective graph. In the pedestrian information providing system of the present invention, it is considered that intersection does not have important information for pedestrians. Thus, the data for starting point and end point are provided to the data of street, which serves as a link, and these are arranged as effective graph. By the arrangement as described above, there is no need for each street to have node data divided, and the amount of data can be reduced.

Figure 10:
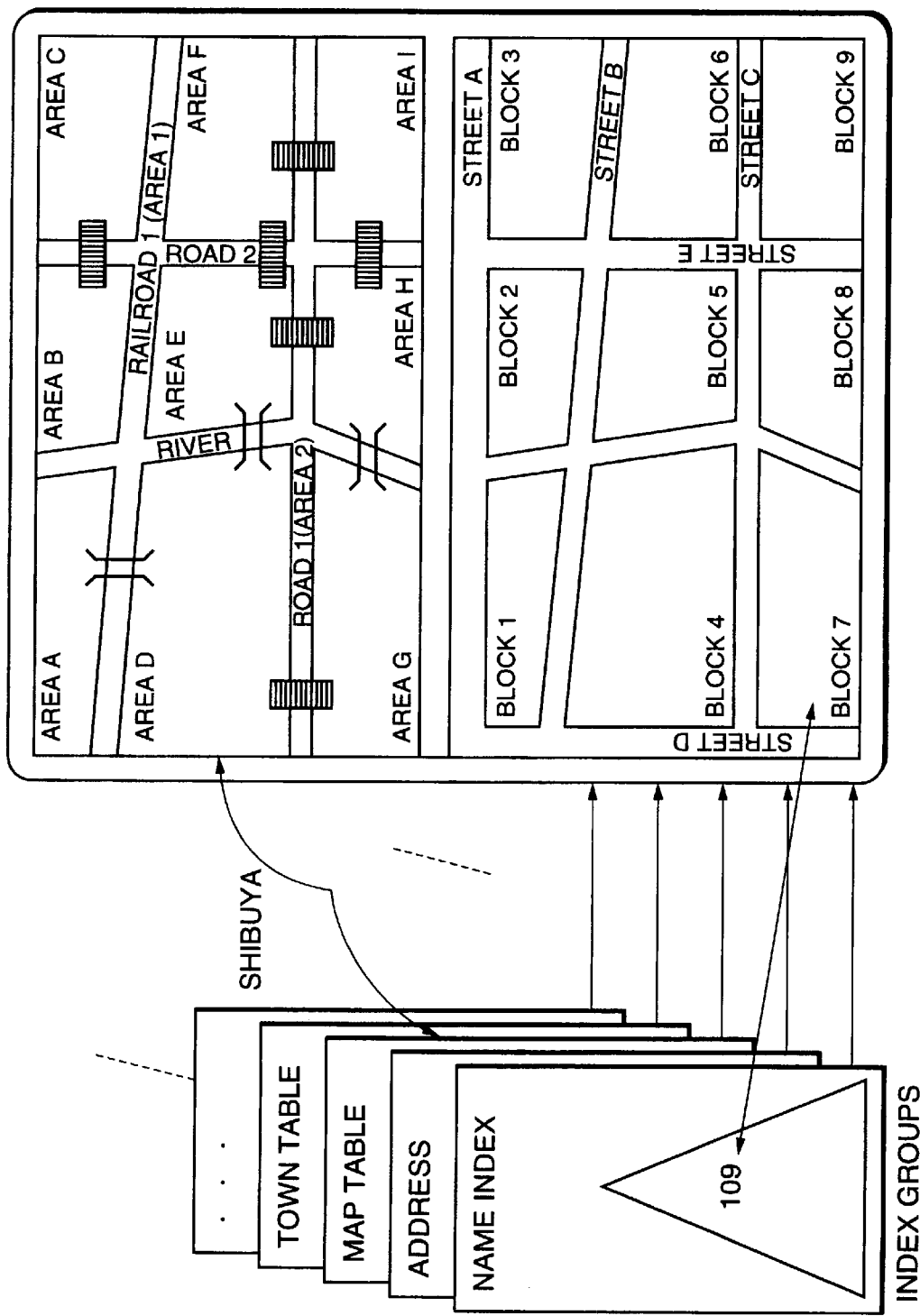
FIG. 10 shows a basic block diagram of a map data for pedestrians and index groups.

As shown in FIG. 10, the following are stored in the storage unit of the pedestrian map data 13 to increase searching efficiency: a name index for searching the corresponding block from the name using a search tree (FIG. 11), an address index for searching block, area or street from the address using a search tree (FIG. 12), a map-area correspondence table describing map number of area including in a map with the number (FIG. 13), and a town table describing town information in each area (FIG. 14). Each of name index and address index has a pointer to the pedestrian map data, which serves as data of a terminal leaf, and it is arranged in such manner that the corresponding map data can be directly referred.

The map-area correspondence table (FIG. 13) is a reference table where map number calculated from latitude and longitude is matched to ID of the area included in the map. The town table (FIG. 14) is a correspondence table, which describes facilities and organizations included in each area (town information) and their block IDs classified for each area.

In the storage unit of the pedestrian map data 13, transportation means data describing lines and schedules of each transportation means are also stored.

Figure 15:
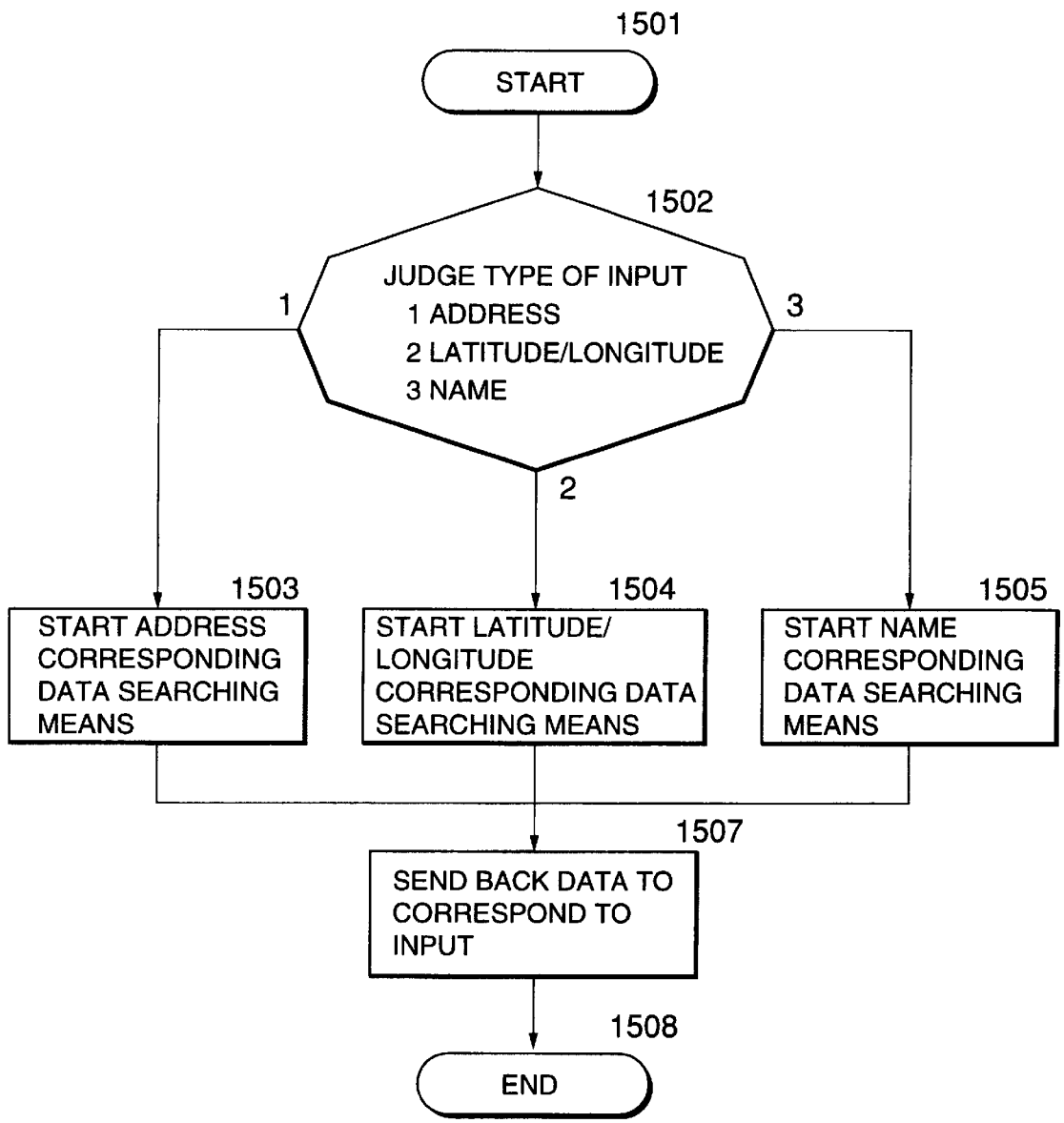
FIG. 15 is a flow chart of a corresponding data searching means.

Next, description will be given on operation in the pedestrian map data searching means 114 of the pedestrian information processing unit 11. As shown in FIG. 15, the corresponding data searching means 1141 of the pedestrian map data searching means 114 performs the following steps:

Step 1502: The type of the inputted data inputted from the input/output control means 111 is judged. If address is inputted;

Step 1503: The address corresponding data searching means 1144 is started to deliver the inputted address for searching.

In case latitude and longitude are inputted in Step 1502;

Step 1504: The latitude/longitude corresponding data searching means 1145 is started to deliver the inputted latitude and longitude for searching.

In case the name is inputted in Step 1502;

Step 1505: The name corresponding data searching means 1146 is started to deliver the inputted name for searching.

Step 1507: The data searched by each searching means are outputted to the input/output control means 11 or the pedestrian route searching means 112.

Figures 16, 17:
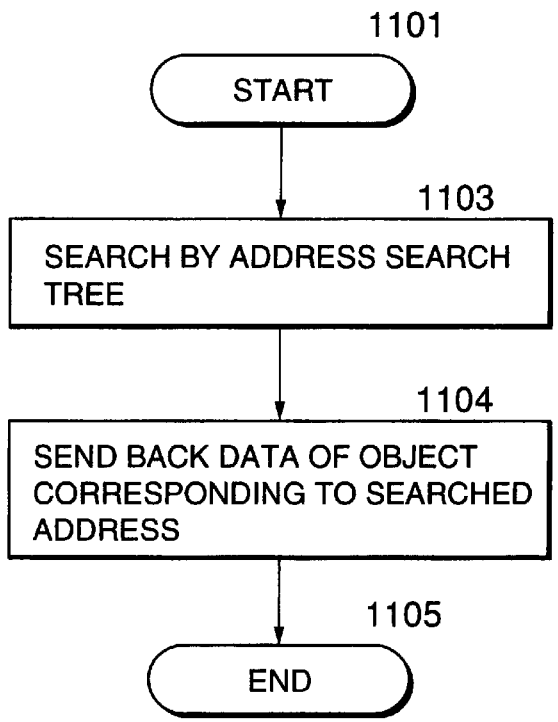
FIG. 16 is a flow chart of a means for searching address corresponding data.
FIG. 17 shows an example of input data in the address corresponding data means.

As shown FIG. 16, the address corresponding data searching means 114 as started performs the following steps:

Step 1103: The map data corresponding to the inputted address according to the address search tree of the address index (FIG. 12) is searched.

Step 1104: The data of searching result is sent back to the corresponding data searching means 1141.

Figure 12:
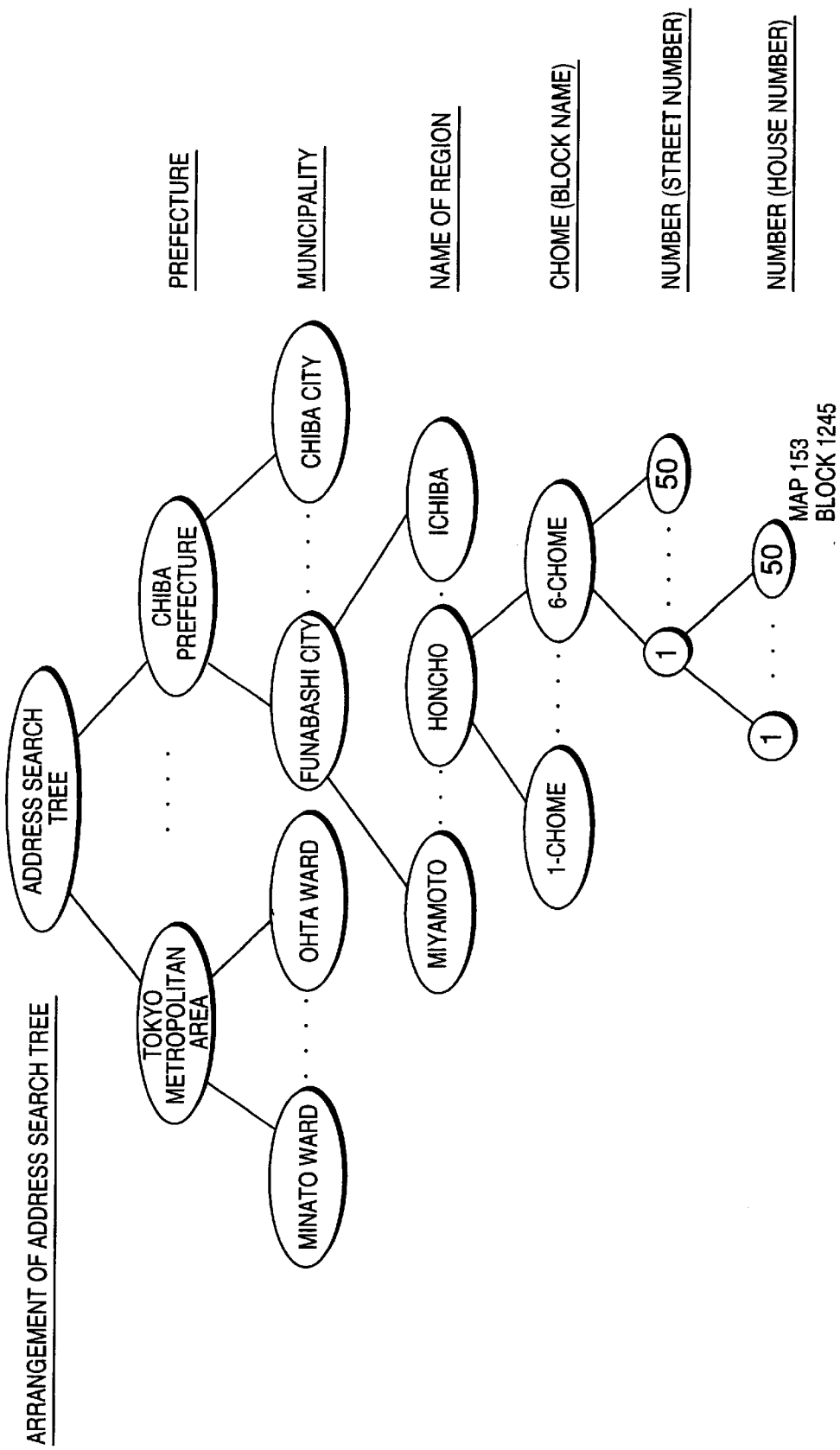
FIG. 12 represents an example of an address search tree.

As shown in FIG. 12, the address search tree comprises the following layers in this order: prefecture/municipalities/region name/street number/house number. The terminal leaf has a pointer to the component element of the pedestrian map data. If it is supposed that address data as shown in FIG. 17 is inputted, the address corresponding data searching means 1144 searches on the address search tree downward from the top as: Chiba Prefecture→Funabashi City→Honcho→6-chome→1→No. 50. Then, the map number 153 described on the leaf and block ID 1245 are outputted as the searching results.

Figure 18:
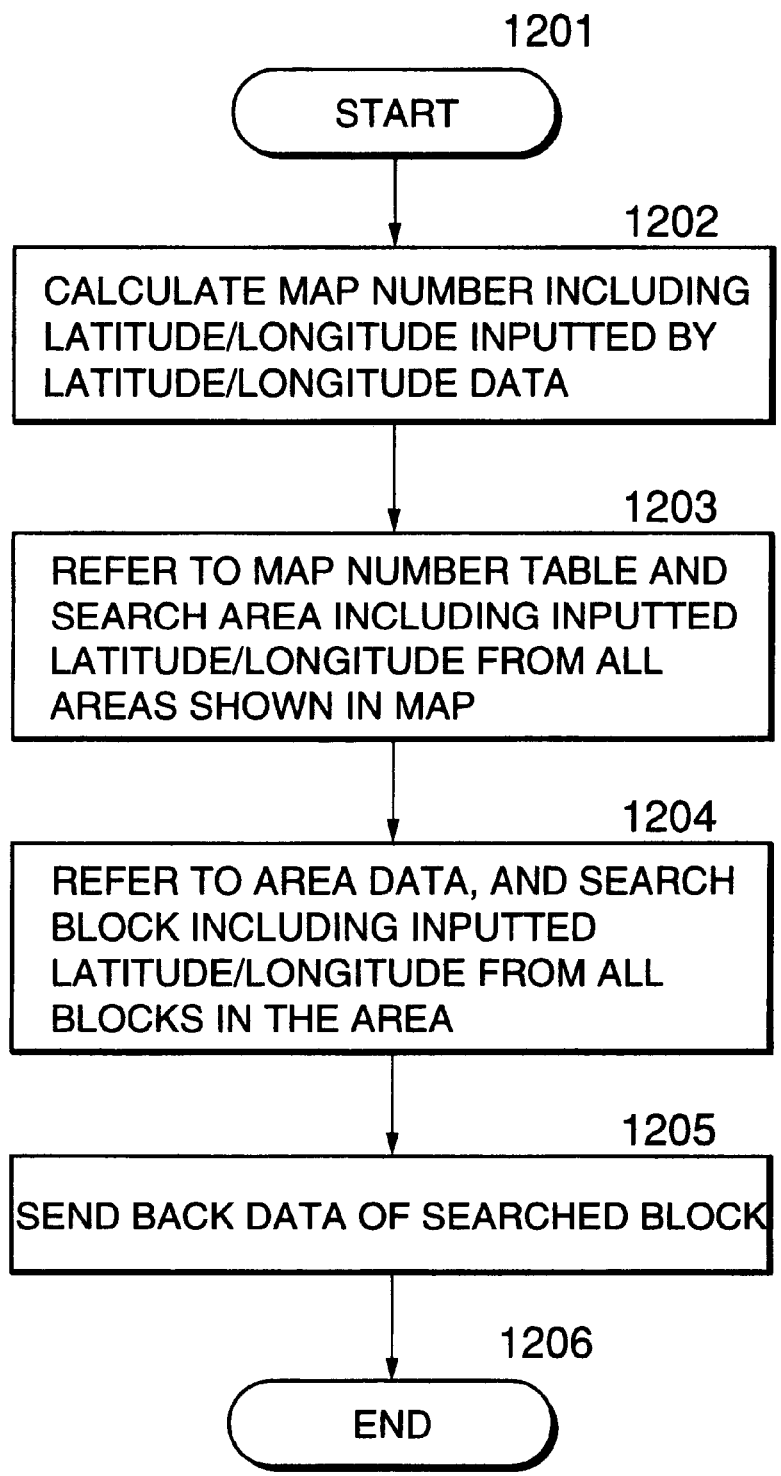
FIG. 18 is a flow chart of a means for searching latitude/longitude corresponding data.

When started, the latitude/longitude corresponding data searching means 1145 performs the following steps:

As shown in FIG. 18;

Step 1202: Map number including the inputted latitude and longitude is calculated.

Step 1203: The map-area correspondence table (FIG. 13) is referred to search an area including the inputted latitude and longitude using vertical line method from all areas included in the map. The vertical line method is a well-known method to check whether or not an arbitrary point is included in a predetermined region. In case a straight line starting from an arbitrary line crosses outer peripheral line of the region by odd number of times, that point is considered to be within the region. If it crosses by even number of times, the point is considered to be out of the region.

Step 1204: Area data in the searched area (FIG. 9) is referred to search a block including the inputted latitude and longitude by vertical line method from all blocks included in the area.

Steps 1205: Block data of the searched block is sent back to the corresponding data searching means 1141.

For example, when the data of FIG. 19 are inputted, the corresponding map number 5637-24-23 is calculated from the inputted latitude and longitude, and referring to the correspondence table of FIG. 13, area 2234 including the inputted latitude and longitude is searched from all areas included in the map with the map number 5637-24-23. Next, the area data of the area 2234 is referred, and a block including the inputted latitude and longitude is searched by vertical line method from all blocks included in the area. The data of the searched block b1248 (FIG. 20) is sent back to the corresponding data searching means 1141.

Figures 21, 22:
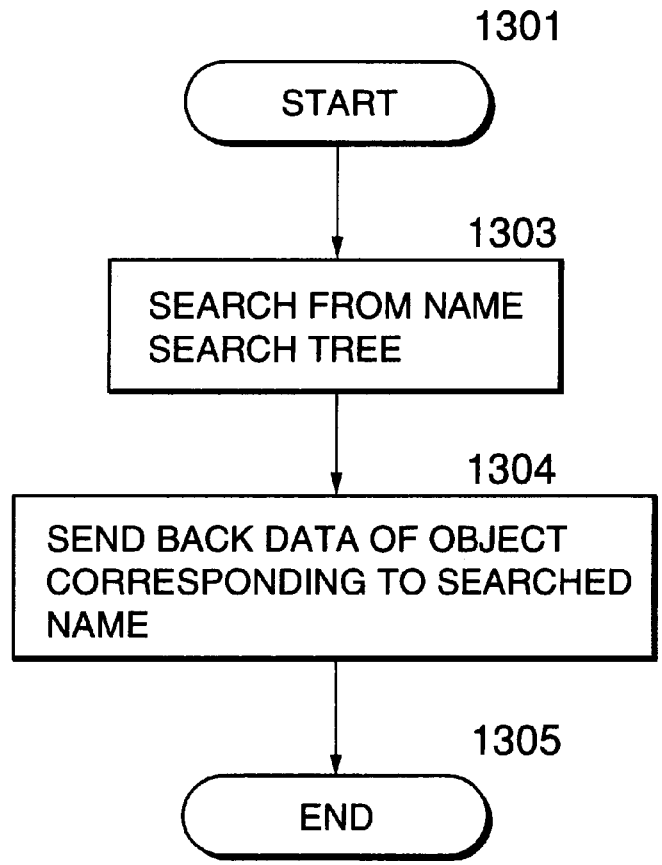
FIG. 21 is a flow chart of a means for searching name corresponding data.
FIG. 22 shows an example of input data in the name corresponding data means.

Also, as shown in FIG. 21, the name corresponding data searching means 1146 as started performs the following steps:

Step 1303: The map data corresponding to the inputted name is searched using the name search tree of the name index (FIG. 11).

Step 1304: The data of the searching results are sent back to the corresponding data searching means 1141.

Figure 11:
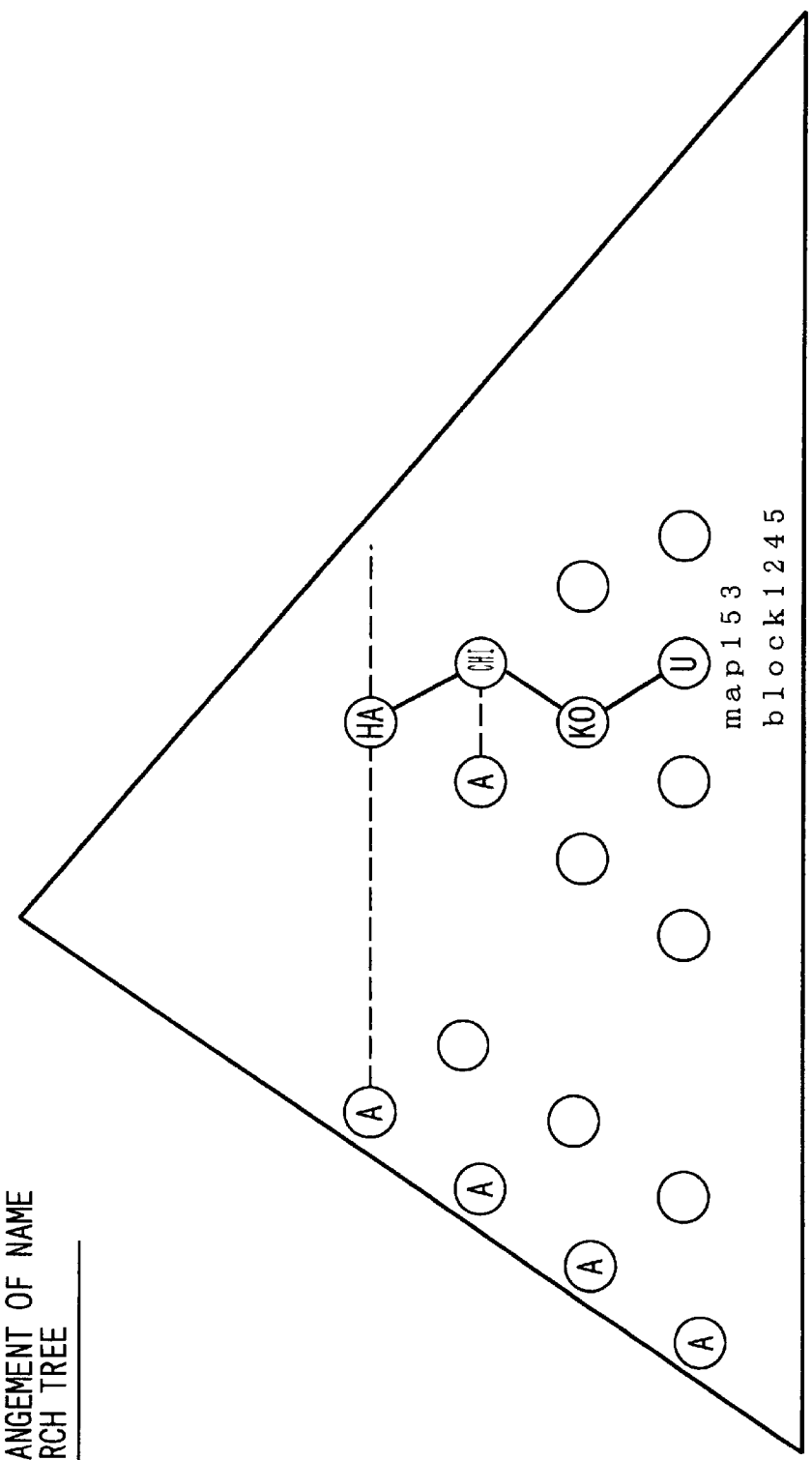
FIG. 11 represents an example of name search tree.

As shown in FIG. 11, the name search tree has a tree structure similar to that of the address search tree, and each layer comprises a character from Japanese syllabary. The terminal leaf has a pointer to component element of the pedestrian map data as in case of the address search tree. For example, when a name data "Hachikou" is inputted as shown in FIG. 22, the name corresponding data searching means 1146 searches the name search tree of FIG. 11 downward from the top as "ha", "chi" "ko", and "u", and map 153 and block 1245 as described on the leaf are obtained. The block data of the block b1245 is sent back to the corresponding data searching means 1141.

Figures 23, 24:
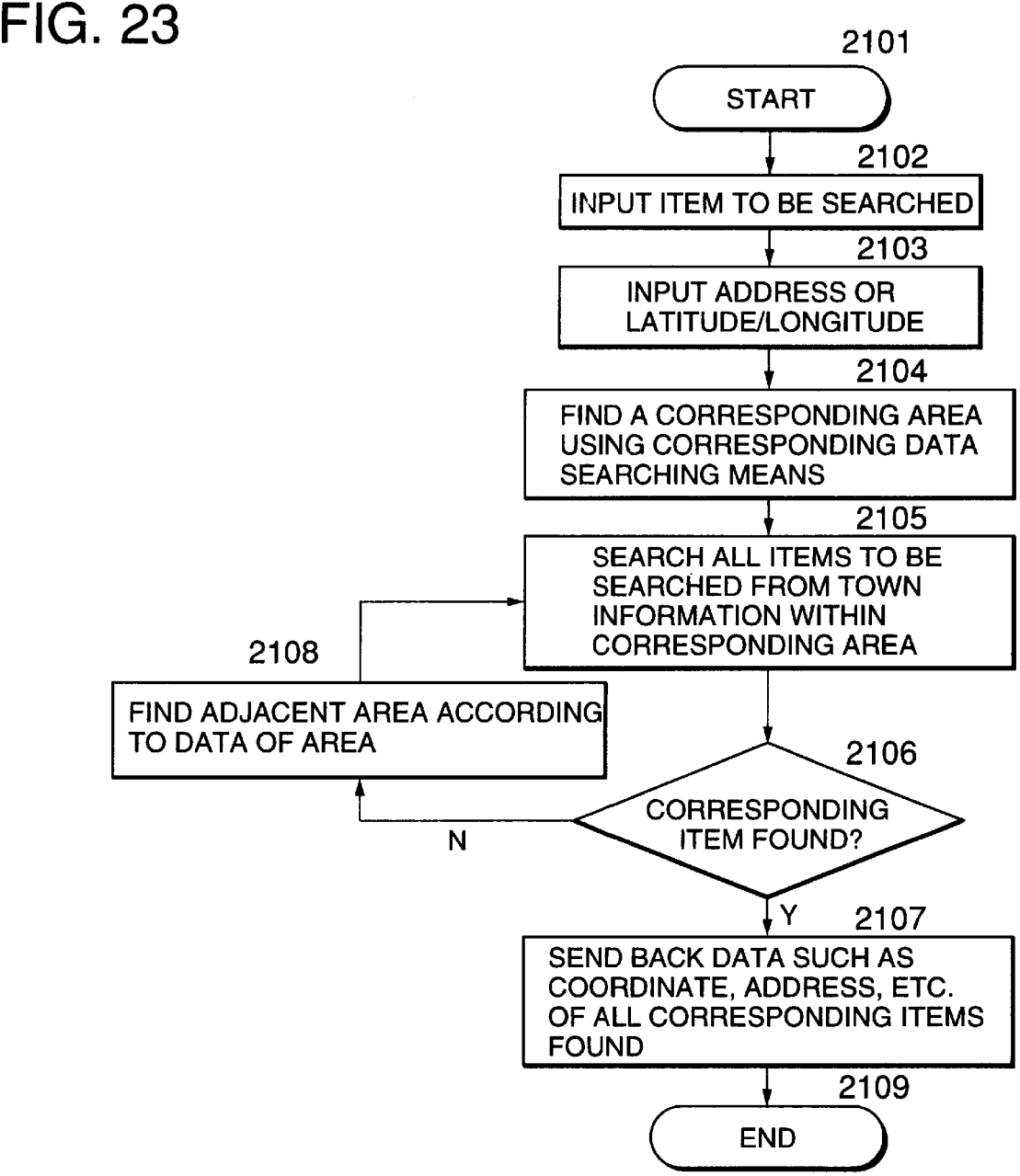
FIG. 23 is a flow chart of a means for searching the nearest data.
FIG. 24 shows an example of input data in a means for searching the nearest data.

The nearest information searching means 1142 of the pedestrian map data searching means 114 carries out the searching according to the procedure shown in FIG. 23 when an object to be searched is inputted from the input/output control means 111.

Step 2102: The object to be searched is inputted.

Step 2103: Address or latitude and longitude are inputted.

Step 2104: An area corresponding to the address or the latitude and the longitude are searched using the corresponding data searching means 1141. Based on the type of inputting, the corresponding data searching means 1141 searches the corresponding area by starting the address corresponding data searching means 1144 or the latitude/longitude corresponding data searching means 1145. The area data found in the result of the searching is sent to the nearest information searching means 1142.

Step 2105: The nearest information searching means 1142 searches the object to be searched from a town table of the searched area using the town information searching means 1147.

Step 2106: If the corresponding object is not found;

Step 2108: The data of adjacent area is found from the area data.

Step 2105: The object to be searched is searched from the town table of the adjacent area.

The procedure of Steps 2105, 2106 and 2108 is repeated, and when the corresponding object is found;

Step 2107: Data such as coordinates, address, etc. of all corresponding objects found are sent back to the requester of the searching.

For example, when a user wants to find out the nearest post office and inputs data to search the post office by specifying latitude and longitude of the present position, the latitude/longitude corresponding data searching means 1145 is started. An area 35a shown in FIG. 9 is searched, and the area data is sent to the nearest information searching means 1142.

The nearest information searching means 1142 searches the post office from the town table shown in FIG. 14 with "town-34" in the town information of the area 35a using the town information searching means 1147. Because data content of the corresponding object, i.e. post office, is null, similar searching is carried out for all adjacent areas of the area 35a and judges whether the corresponding object is present or not. The post office is found in the area 36a in this searching, and the data of the block 53, i.e. the corresponding object, is sent back.

By registering not only normal town information but also attribute on street in the town table, it is possible to carry out searching for wider range. For example, if positions of mailboxes are registered as attributes on street, the nearest mailbox can be searched.

Figure 25:
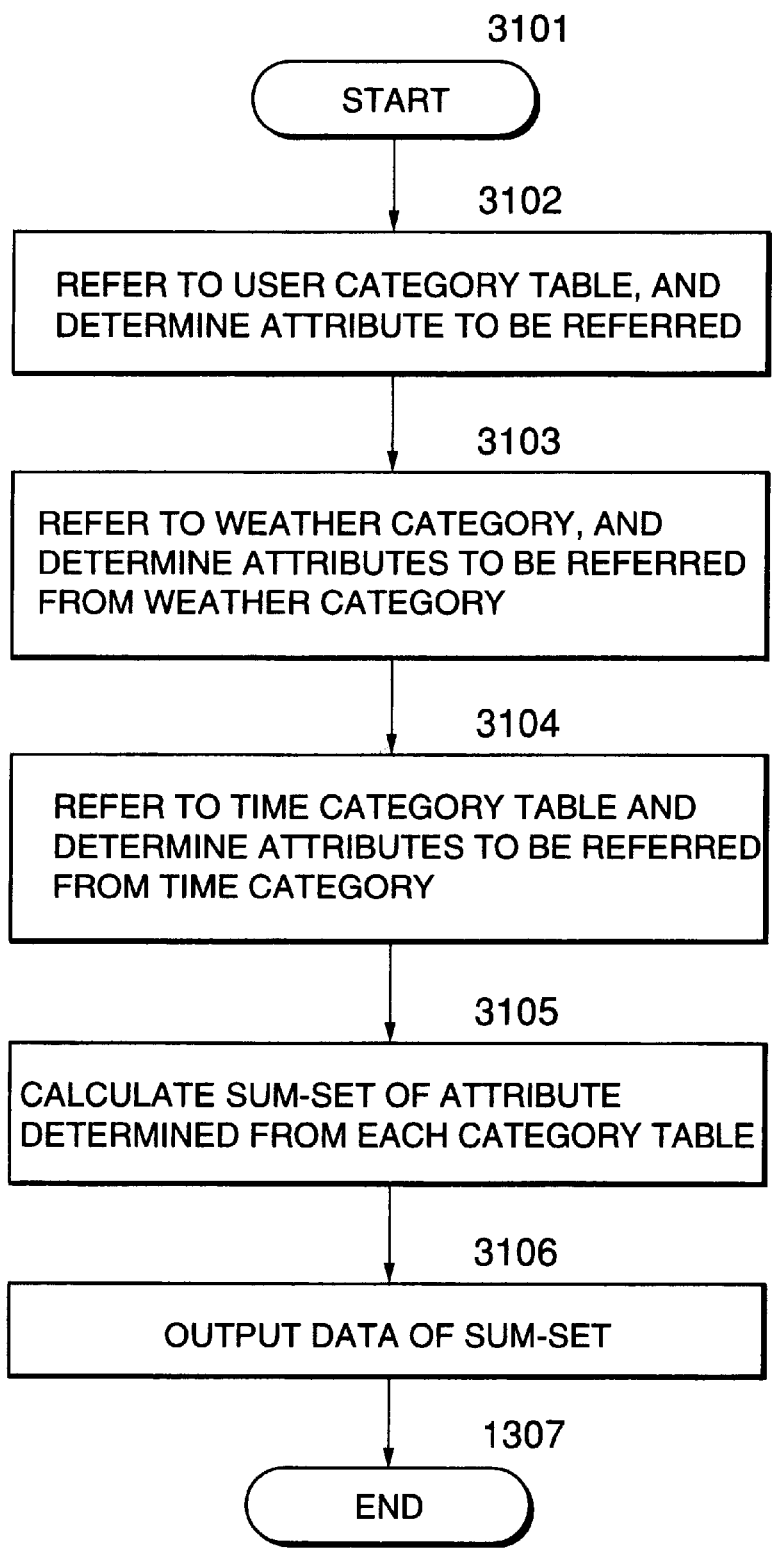
FIG. 25 is a flow chart in an attribute determining means.

Next, description will be given on operation in the pedestrian route searching means 112 of the pedestrian information processing unit 11. The attribute determining means 1124 of the pedestrian route searching means 112 determines attributes to be considered in selecting a route according to the procedure shown in FIG. 25. If data such as user category, departure point, destination, time, weather, and index in selecting a route (whether to select a route requiring the shortest time or a route with the shortest distance) are inputted from the input/output control means 111 as shown in FIG. 26, the attribute determining means 1124 as started carries out the following steps:

Step 3102: From a user category table (FIG. 27), attributes corresponding to the inputted user category are read. In the user category table, attributes corresponding to each user are described sequentially from the attribute with the highest priority. For "women" in the inputted user category, data such as presence or absence of street light, presence or absence of shops open till late at night, vehicular traffic density, crowdedness of pedestrians, presence or absence of police box are determined as attributes.

Step 3103: Next, attributes to correspond to the inputted weather are read from a weather category table (FIG. 28). In case the weather is "rain", the data such as presence or absence of underground passage, presence or absence of covering, presence or absence of roadside ditch, vehicular traffic density, or crowdedness of pedestrians are determined as attributes.

Step 3104: Next, attributes to correspond to the inputted time are read from a time category table (FIG. 28). From the inputted time "16:35", the data such as presence or absence of street light, crowdedness of pedestrians, and vehicular traffic density are determined as attributes by referring to "evening" category of the time category table.

Step 3105: Sum-set of attributes determined from each category table is calculated. At the same time, sum of priorities of the categories is obtained.

Step 3106: By this sum, priority rank of attribute of the sum-set is determined, and a predetermined number of attribute data with high priority rank are outputted as shown in FIG. 29.

Figure 30:
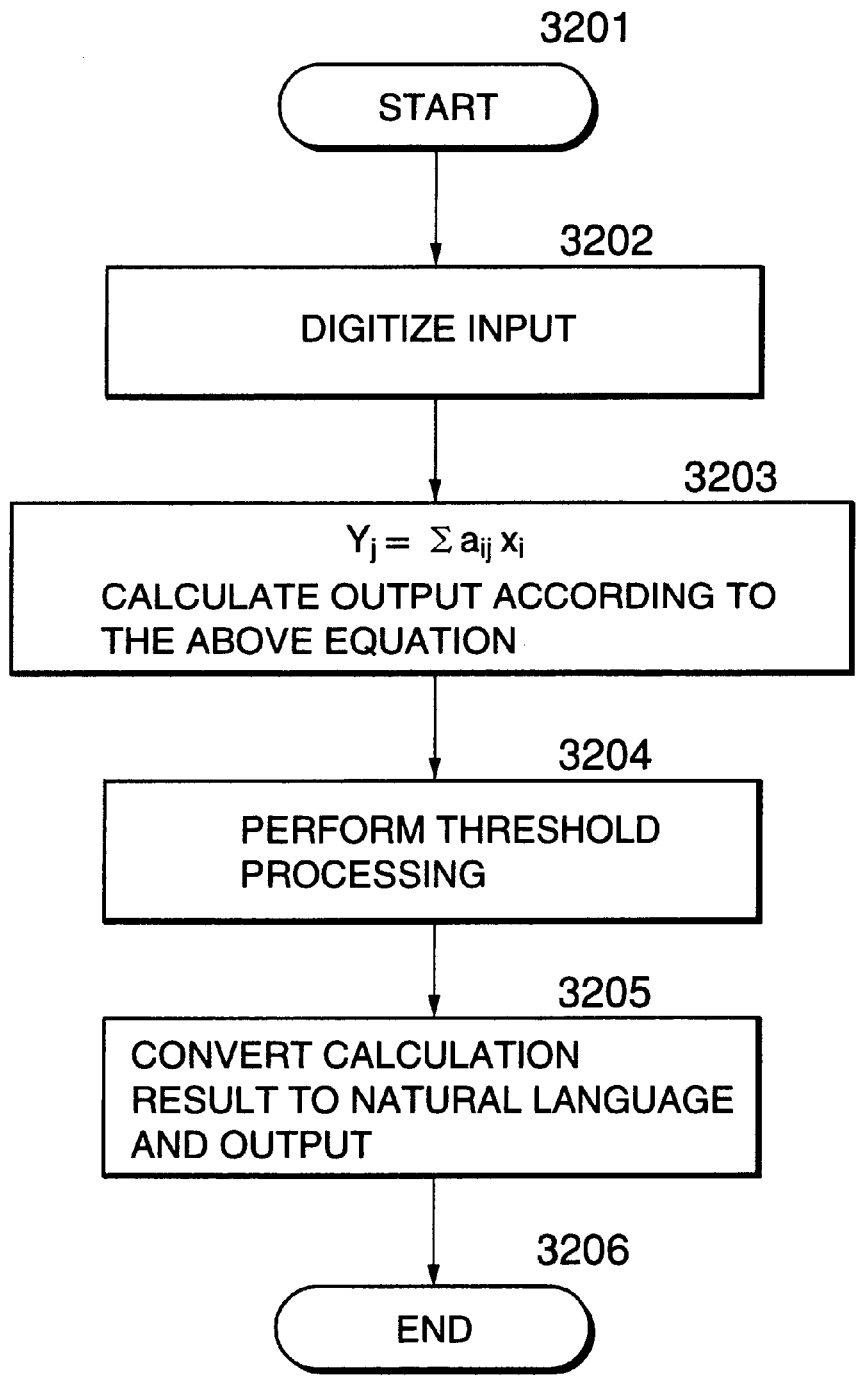
FIG. 30 is a flow chart of the attribute determining means using a neural net.

The attribute determining means 1124 can determine attributes using a neural net. FIG. 30 shows a flow chart of the attribute determining means using a neural net. By the attribute searching means 1124 thus started;

Step 3202: The value Xi of the input item is digitized according to the inputted data as shown in FIG. 31.

Step 3203: From a table of weight constant "a ij" of input/output shown in FIG. 32, value Yj' of attribute of output item is calculated. In FIG. 32, numerals 1, 2, 3 . . . in longitudinal direction indicate input items of FIG. 31, and the numerals 1, 2, 3 . . . in lateral direction indicate attributes of output items. The value "a ij" of intersection of the input item "i" and the output item "j" indicates weight constant of the output item "j" to the input item "i". The value Yj' of attribute of the output item is calculated by: $\Sigma X_i \cdot a_{ij}$ ($\Sigma$ means addition for "i").

Step 3204: As shown in FIG. 33, the output Yj' is compared with threshold (0.5). Output value Yj of attribute exceeding the threshold is set to 1, and priority rank of attributes is assigned in the descending order of the value Yj'.

Step 3205: The result of calculation is outputted by changing to natural language.

Figure 34:
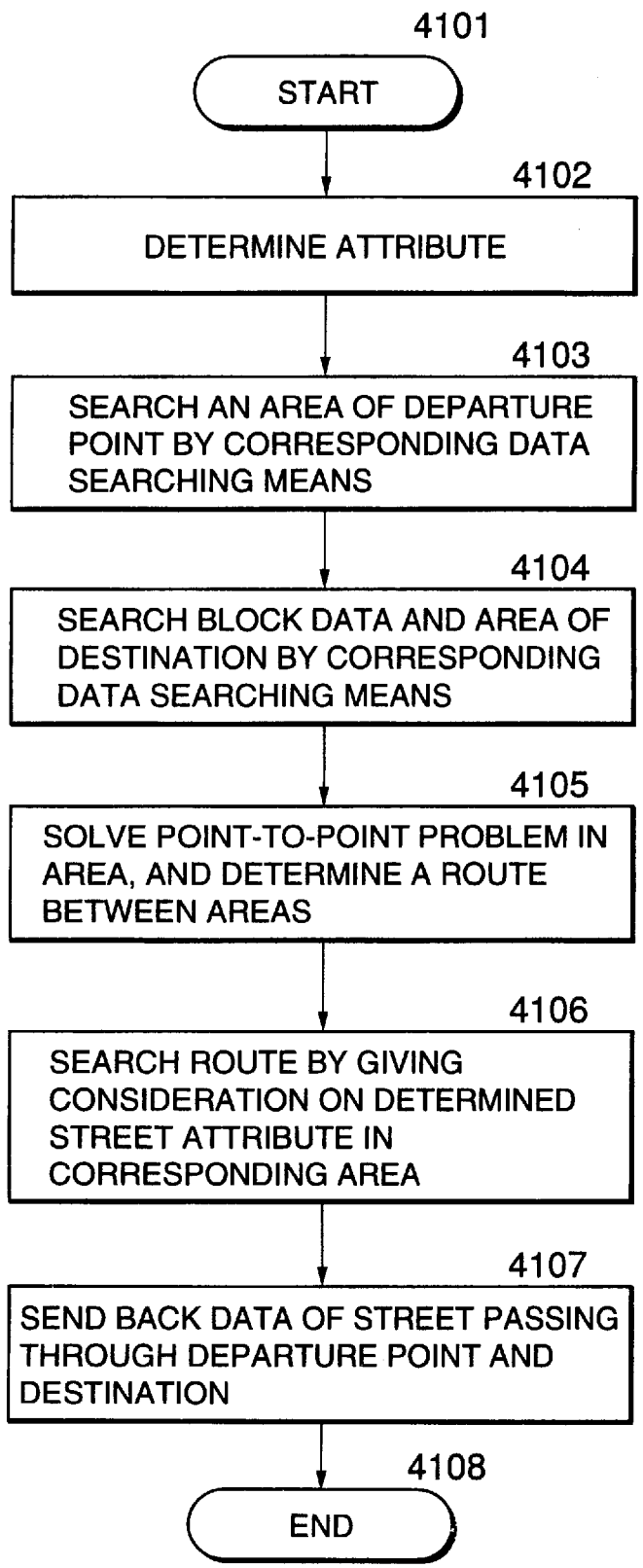
FIG. 34 is a flow chart in a means for searching a route between two geographical points.

Also, the point-to-point route searching means 1122 of the pedestrian route searching means 112 executes route searching according to the procedure shown in FIG. 34. Explanation is given now on the case where a route is searched in a region shown in FIG. 35 as an example. In this figure, each region enclosed by curve indicates an area. Larger numeral indicates area number, and smaller numeral indicates street number. Straight line indicates a street.

In this example, the data shown in FIG. 36 are inputted, and a route from JR Roppongi Station to the destination, i.e. "Roppongi Murasaki", is searched.

It is now supposed that area data of FIG. 37A to FIG. 38C, block data of FIG. 39A to FIG. 41B, and street data of FIG. 42A to FIG. 48B are stored in the pedestrian map data 13. In actual conditions, the street data has many attributes as shown in (1) of FIG. 42A and FIG. 42B. Here, explanation is given on functions, and detailed attributes are not described for the street data (2) to (15). Also, polygonal information is not given in the area data, and polygonal information and 3-dimensional information are not given in the block data.

When the point-to-point route searching means 112 is started;

Step 4102: The attributes of the street to be searched are determined according to the input by the attribute determining means 1124. In this example, from the user category, i.e. a 72-year-old woman, attributes of the street to be searched are determined as: street light, shops open till late at night, vehicular traffic density, crowdedness of pedestrians, police boxes, and avoidance of parks and parking area, and the attributes are determined as: handrails, pavements, slopes, stairways, bicycles, and road width.

Step 4103: The corresponding data searching means 1141 is started to search an area, to which the departure point belongs, and 420b block and 35a area are found.

Step 4104: The corresponding data searching means 1142 is started to search an area, to which the destination belongs, and 443b block and 37a area are found.

Step 4105: The point-to-point problem between 35a area and 37a area is solved by Dijkstra method known as a solution of the problem of optimal route, and it is determined to pass through 11826st and 11835st.

Step 4106: From the streets satisfying the attributes as desired by the user in the streets within the area, a combination of streets, which constitute the shortest route, is obtained, and it is determined to pass through 11723st, 11727st, 11826st, 11733st, 11734st, 11835st, and 11747st.

Step 4107: Data of departure point, destination and the street to pass through are sent back.

Figure 49:
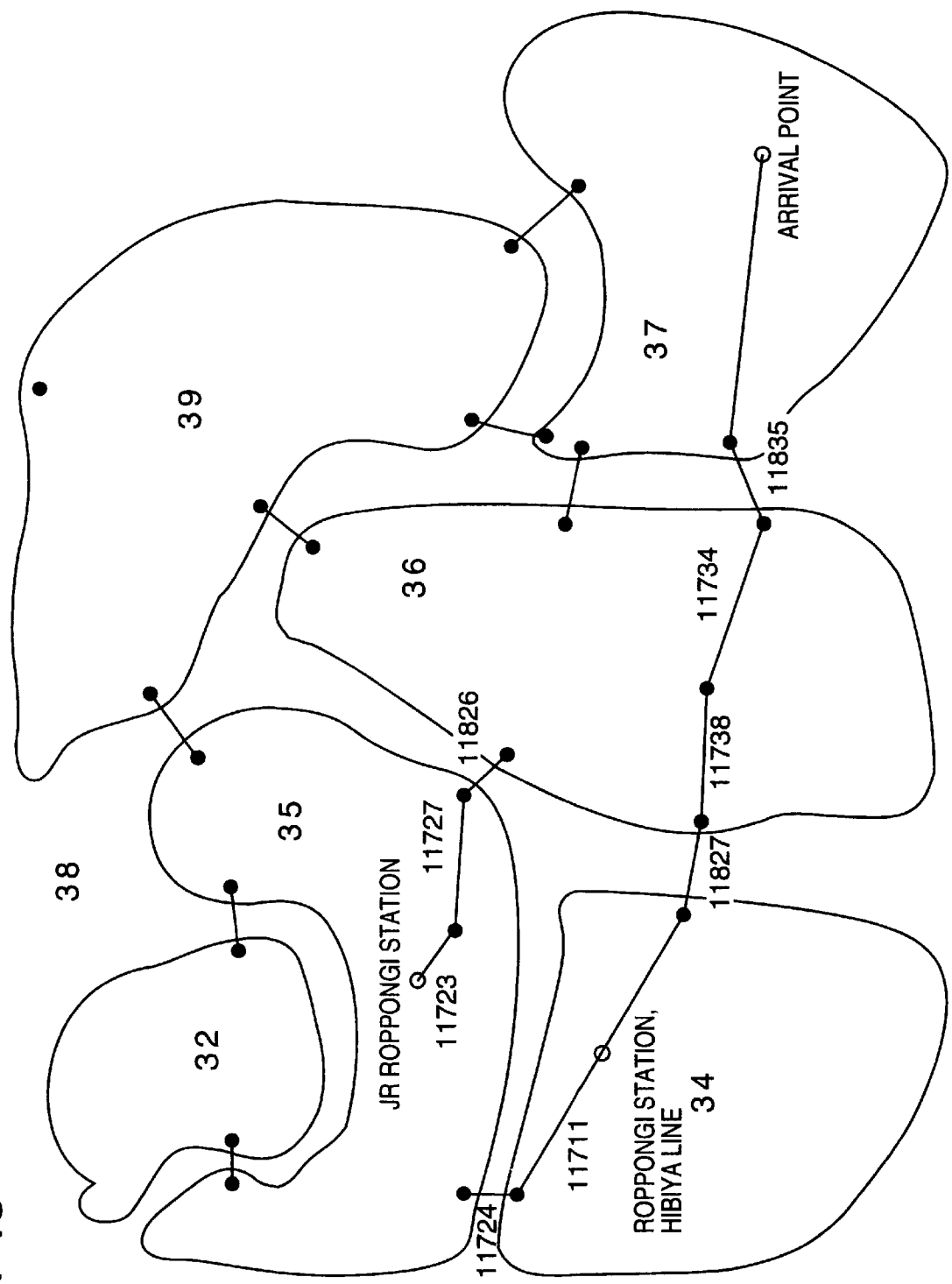
FIG. 49 is a conceptual drawing in the route searching in case one of the two geographical points is under the ground.

FIG. 49 is a schematical drawing to show the case where the departure point is under the ground. In this case, also, route searching can be performed by the procedure as described above. The data shown in FIG. 50 are inputted, and a route from Roppongi Station of Hibiya Line of the subway to the destination "Roppongi Murasaki" is searched.

The route searching means 112 between two points is started, and attributes of the street to be searched are determined as described above according to the input.

The corresponding data searching means 1142 is started to search an area, to which the departure point belongs, and 260b block and 34a area are found. Then, an area, to which the destination belongs, is searched, and 483b block and 37a area are found.

Next, the point-to-point problem between 34a area and 37a area is solved, and it is determined to pass through 11827st and 11835st. Then, from the streets satisfying the attributes as desired by the user among the streets in the area, a combination of the streets which constitute the shortest route is obtained. It is determined to pass through 11711st, 11827st, 11738st, 11734st, 11835st and 11747st, and the data of departure point, destination and streets to pass through are sent back.

Figure 51:
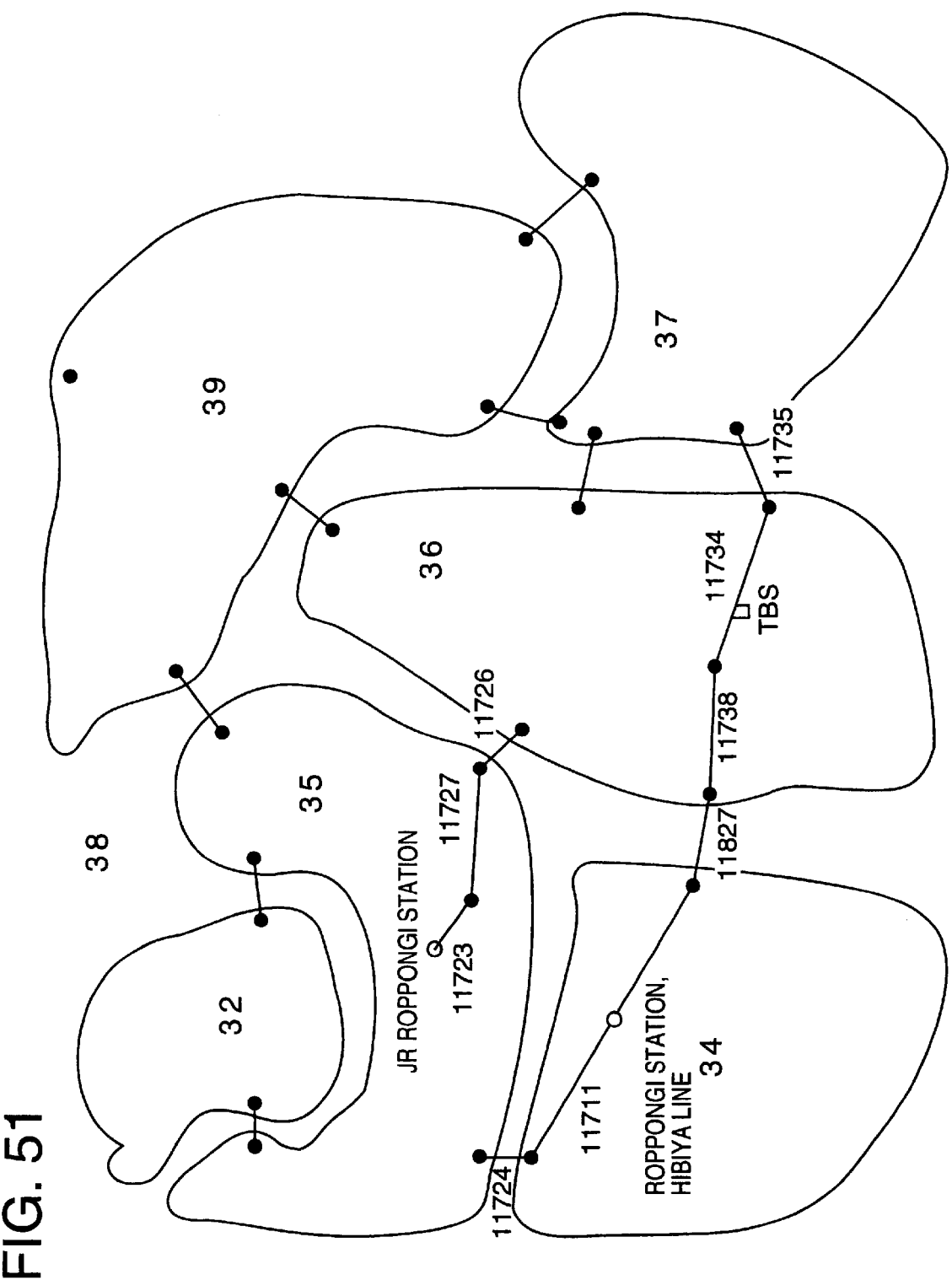
FIG. 51 is a conceptual drawing in the route searching in case one of the two geographical points is under the ground and the other is in a building.
Figure 52:
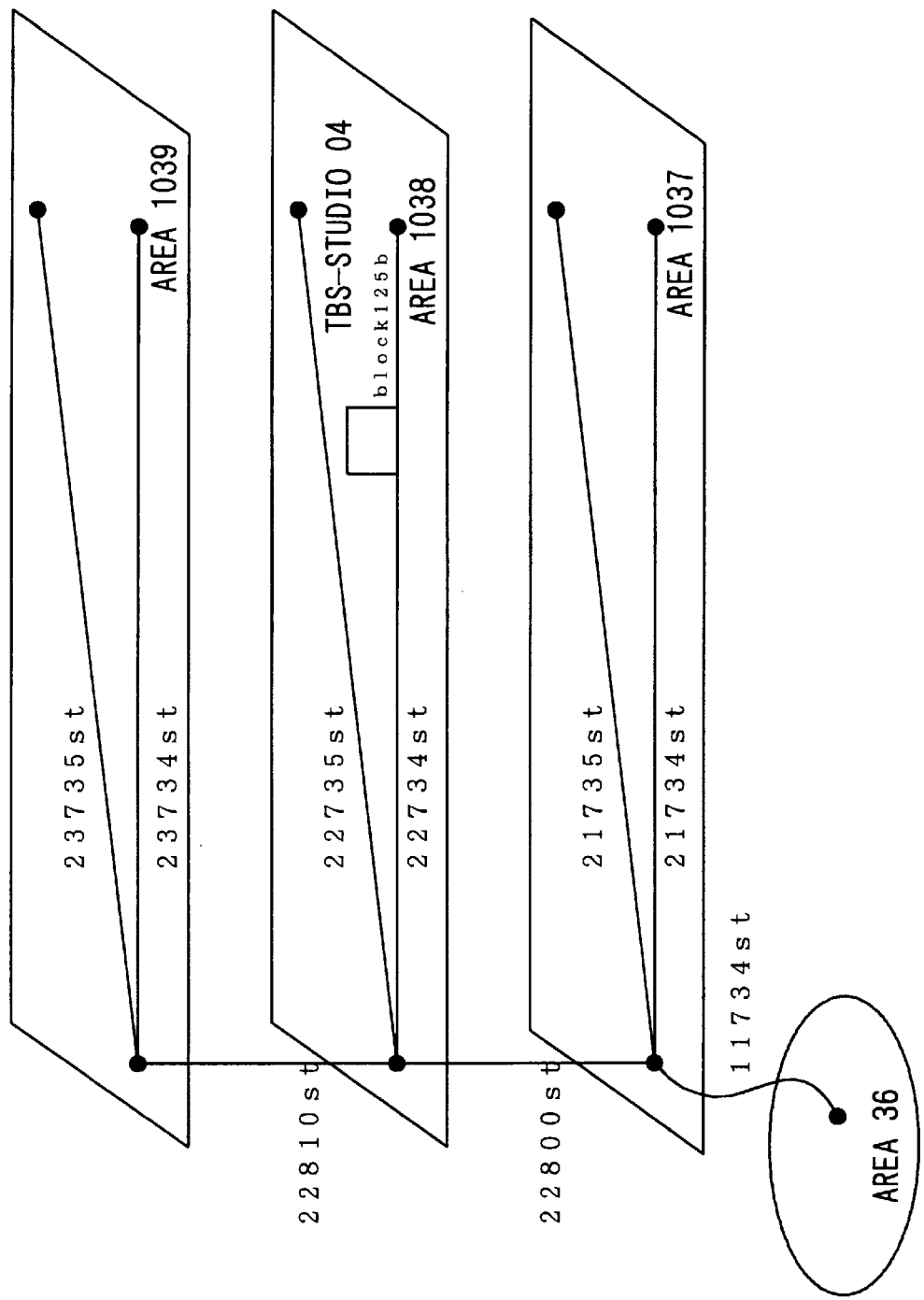
FIG. 52 is a conceptual drawing in the route searching in case one of the two geographical points is in a building.

FIG. 51 and FIG. 52 each represents a schematical drawing to show the case where the departure point is under the ground and the destination is in a building. In this case, also, route searching can be carried out by the procedure as described above. It is now supposed that the data shown in FIG. 53 are inputted, and a route from "Roppongi Station of Hibiya Line" of the subway to the destination "TBS Studio 04" is searched.

The point-to-point route searching means 112 is started, and attributes of the street to be searched are determined according to the input as described above.

The corresponding data searching means 1142 is started to search an area, to which the departure point belongs, and 260b block and 34a area are found. Next, an area, to which the destination belongs, is searched, and 125b block and 1038a area are found.

Next, the point-to-point problem between 34a area and 1038a area is solved, and it is determined to pass through 11827st and 22800st. Then, from the streets satisfying the attributes desired by the user among the streets in the area, a combination of streets which constitute the shortest route is obtained. It is determined to pass through 11711st, 11827st, 11738st, 11734st, 22800st, and 22734st, and the data of departure point, destination and the streets to pass through are sent back.

Figure 54:
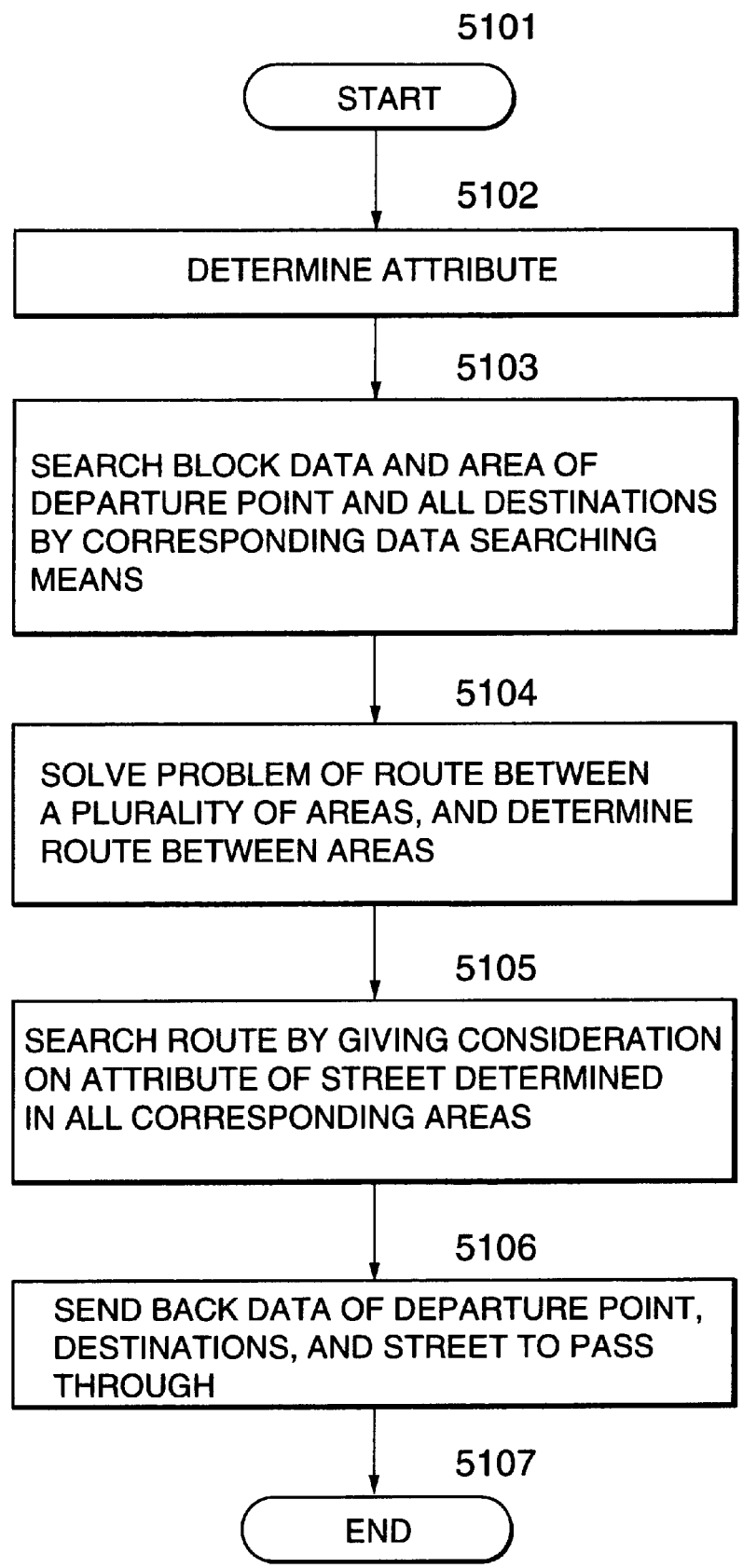
FIG. 54 is a flow chart in the route searching means in case there are two or more destinations.
Figure 56:
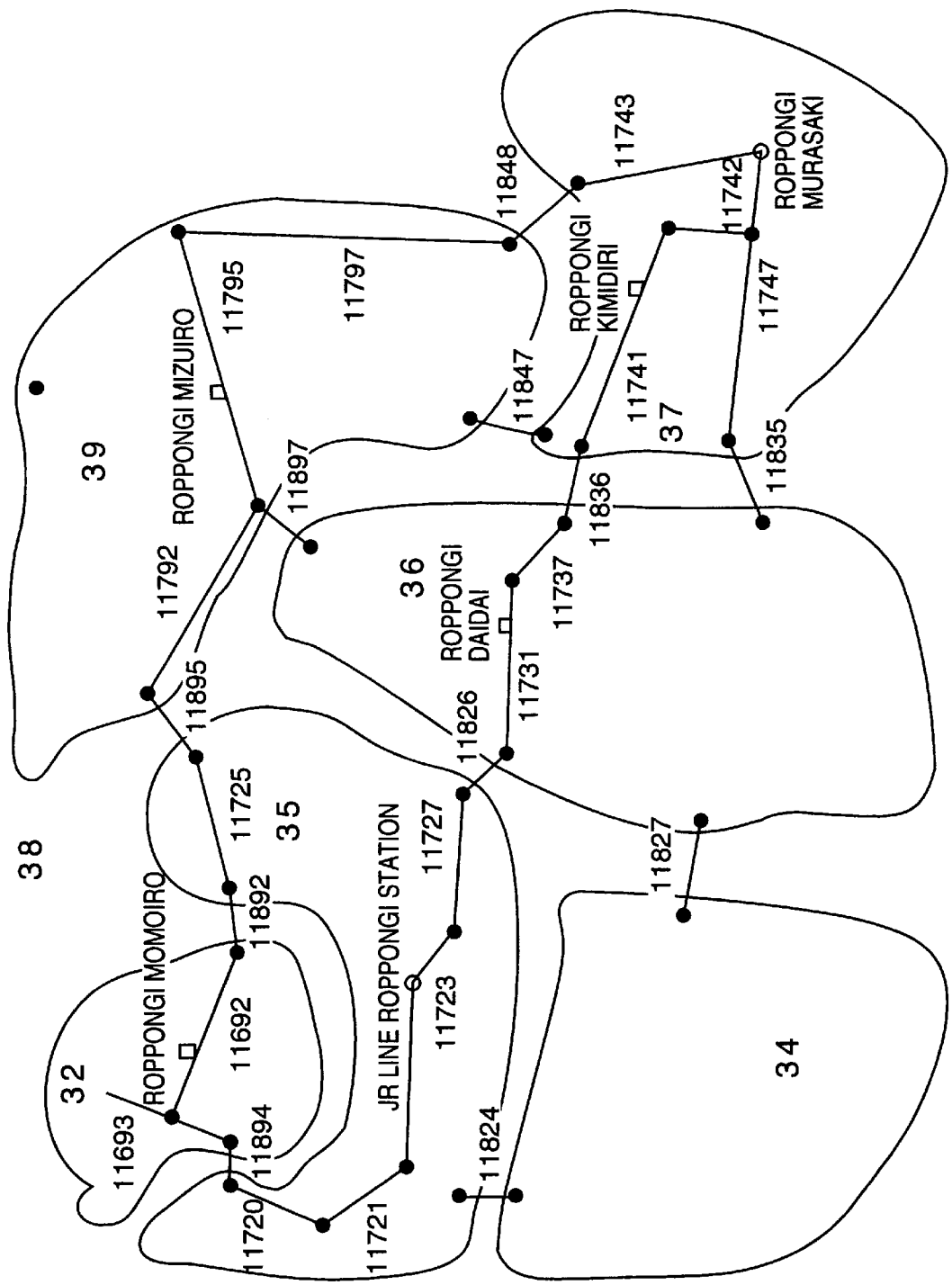
FIG. 56 is a conceptual drawing in the route searching in case there are two or more destinations.

The route searching means 1121 between a plurality of geographical points of the pedestrian route searching means 112 executes route searching according to the procedure of FIG. 54 in case there are two or more destinations. Explanation is now given on the case where the data shown in FIG. 55 are inputted, and a route is searched from departure point of "JR Roppongi Station" to pass through "Roppongi Murasaki", "Roppongi Kimidori", "Roppongi Daidai", "Roppongi Mizuiro", and "Roppongi Momoiro". FIG. 56 represents a schematical drawing to show this example.

The route searching means 1121 between a plurality of geographical points as started performs the following steps:

Step 5102: Attributes of the street to be searched are determined by the attribute determining means 1124. In this example, from the user category defining that the user is a 72-years-old woman, the attributes of the streets to be searched are determined as: street light, shops open till late at night, vehicular traffic density, crowdedness of pedestrians, police boxes, avoidance of parks and parking areas, handrails pavements, slopes, stairways, bicycles, and road width.

Step 5103: The corresponding data searching means 1142 is started to search an area, to which departure point and all of the destinations belong, and the following blocks and areas are found: 420b block and 35a area, 443b block and 37a area, 444b block and 37a area, 431b block and 36a area, 491b block and 39a area, and 391b block and 32a area.

Step 5104: Route searching problem between 35a area, 37a area, 36a area, 39a area and 32a area is solved, and it is determined to pass through 11826st, 11836st, 11848st, 11895st, 11892st, and 11894st.

Step 5105: From the streets satisfying the attributes desired by the user among the streets in the area, a combination of the streets constituting a go-round route is searched, and it is determined to pass through 11723st, 11727st, 11826st, 11731st, 11737st, 11836st, 11741st, 11742st, 11747st, 11743st, 11848st, 11797st, 11795st, 11792st, 11895st, and 11725st, 11892st, 11692st, 11693st, 11894st, 11720st, 11721st, and 11722st in this order.

Step 5106: The data of departure point, destination and all streets to pass through are sent back.

It is evident that distance and time are interchangeable with each other as indices in the route searching.

Figure 35:
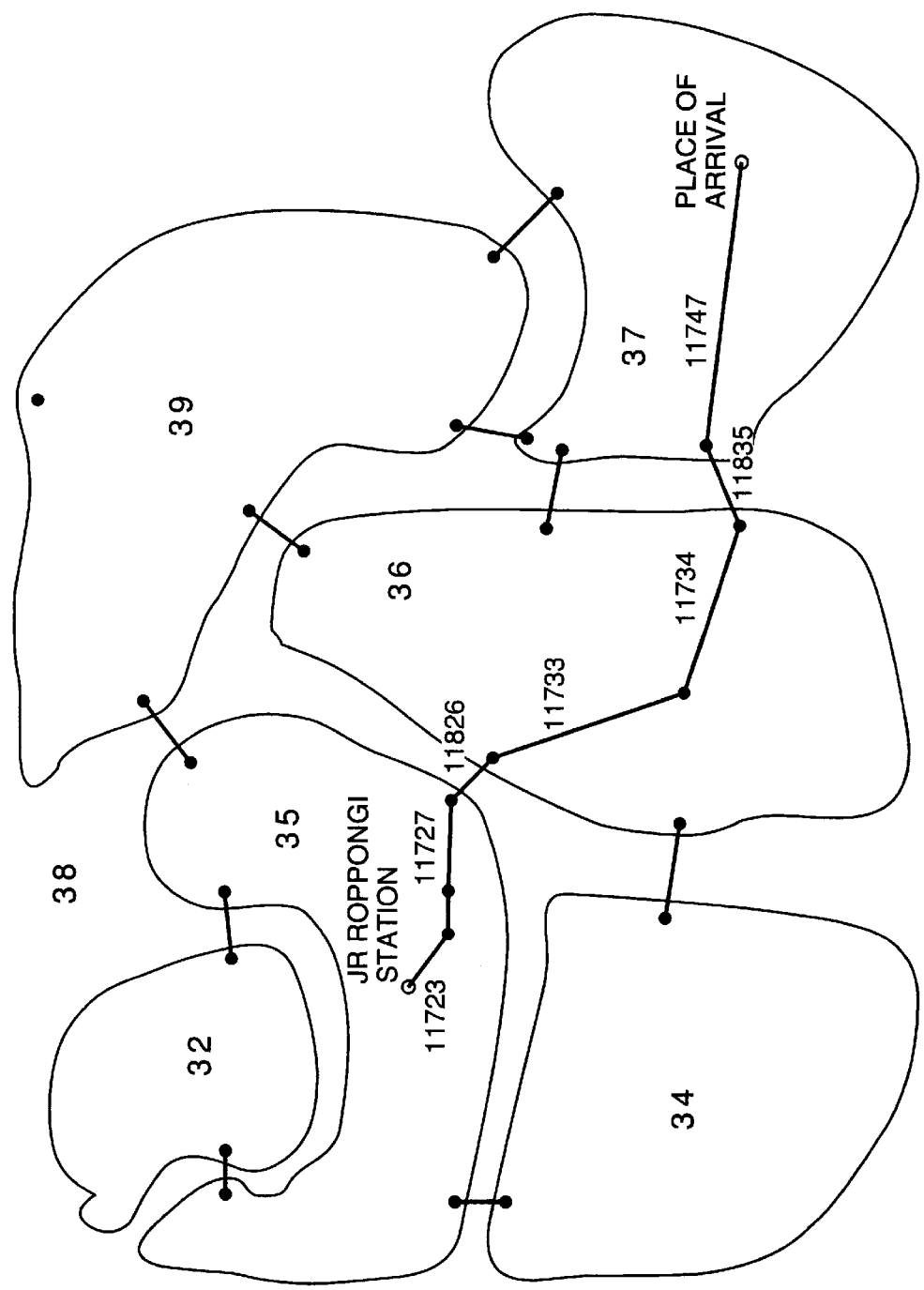
FIG. 35 is a conceptual drawing in the route searching between two geographical points.
Figure 57:
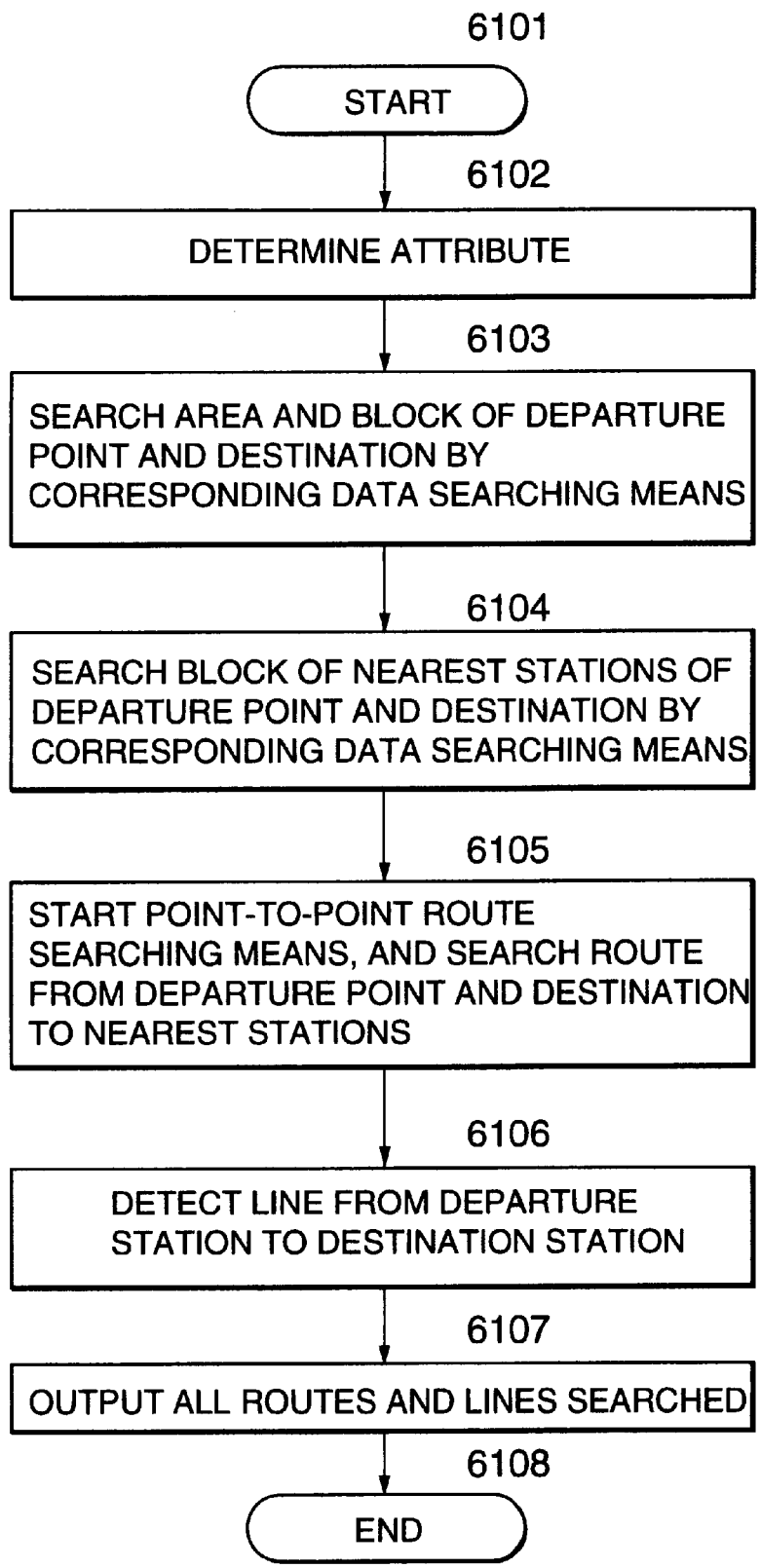
FIG. 57 is a flow chart in the route searching means in case two or more transportation means are used.

The route searching means 1123 of a plurality of transportation means executes selection of route using a plurality of transportation means by the procedure shown in FIG. 57. Explanation is given now on the case where the data shown in FIG. 58 are inputted, and a route is searched from "Shinagawa Murasaki" (with Aomono Yokocho Station of Keihin Express as the nearest station) to "Roppongi Murasaki" (with JR Roppongi Station as the nearest station). FIG. 59 shows a schematical drawing from the departure point "Shinagawa Murasaki" to the nearest station "Aomono Yokocho Station". FIG. 35 shows a schematical drawing from JR Roppongi Station to the destination "Roppongi Murasaki".

The route searching means 1123 of a plurality of transportation means as started performs the following steps:

Step 6102: Attributes of the streets to be searched are determined by the attribute determining means 1124.

Step 6103: The corresponding data searching means 1141 is started to search an area, to which departure point and destination belong, and 250b block and 25a area, and 483b block and 37a area are found.

Step 6104: The nearest information searching means 1142 is started to search stations, which are the nearest to the destination and the departure point respectively, and 270b block and 27a area, i.e. data for Aomono Yokocho Station of Keihin Express, and 470b block and 35a area, i.e. JR Roppongi Station, are found.

Step 6105: The point-to-point route searching means 1122 is started, and an optimal route of 250b block and 270b block is obtained. Further, an optimal route for 483b block and 470b block is obtained, and street data 11723st, 11727st, 11826st, 11733st, 11734st, 11835st, 11747st and 12423st, 12427st, 12426st, 12433st, 12434st, 12435st, and 12447st are obtained.

Step 6106: From the schedule of trains, a route of trains from Aomono Yokocho Station of Keihin Express to JR Roppongi Station is obtained.

Step 6107: The data of departure point, destination and the streets to pass through and the data of train schedule are sent back.

Figure 60:
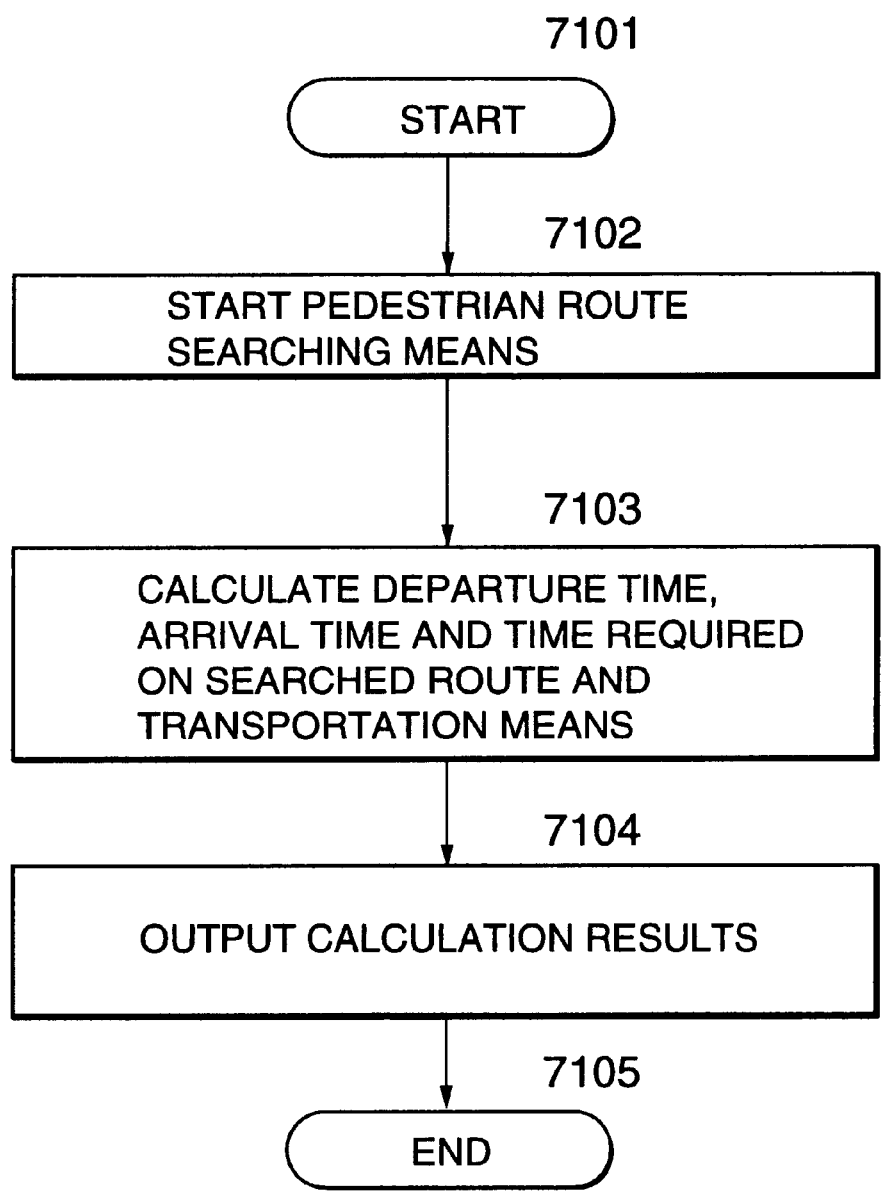
FIG. 60 is a flow chart for a pedestrian time simulation means.

The time simulation means 116 simulates the time until the destination is reached by the procedure shown in FIG. 60.

The time simulation means 116 as started performs the following procedure:

Step 7102: Route searching is performed to correspond to the input (FIG. 61).

Step 7103: The obtained data are sequentially identified from the departure point. If it is a street data, the time required, the time of arrival, and the time of departure on each street are calculated from length of route and walking speed. If it is the schedule data, the time of departure at departure station, the time of arrival at the arrival station, and the time required are calculated by referring to the time table.

Step 7104: The calculated result is outputted in the data with the form as shown in FIG. 62.

In this example, the time of arrival is obtained by calculating from the departure time, while it is possible to obtain departure time by calculating from the time of arrival.

Figure 63:
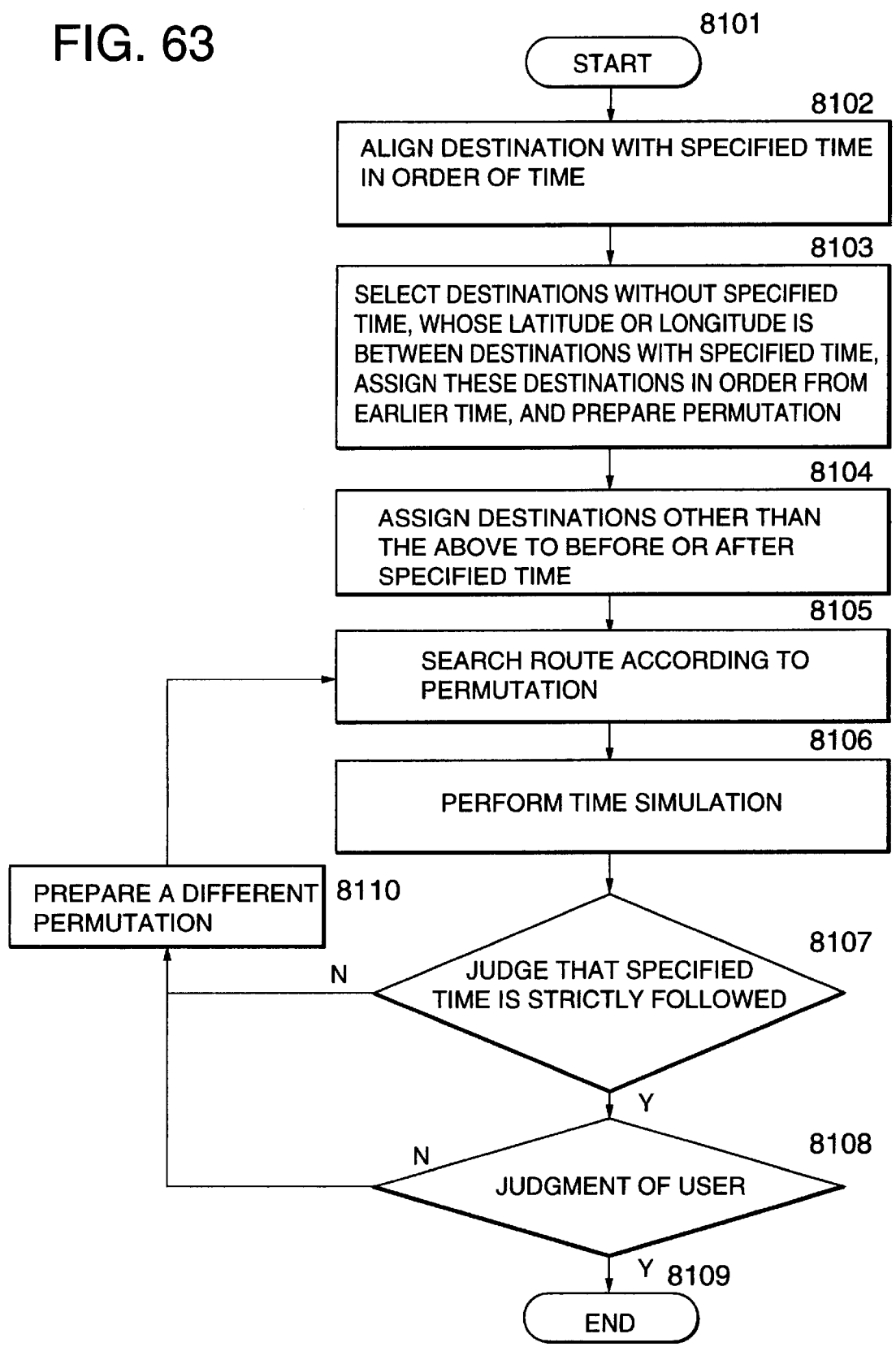
FIG. 63 is a flow chart in a pedestrian scheduling means.

The scheduling means 113 sets up a schedule to go round a plurality of destinations by the procedure shown in FIG. 63.

The scheduling means 113 as started performs the following steps:

Step 8102: From the input data (FIG. 64), destinations (B, C, and E) with specified time are aligned in the order of the time (B, E, and C).

Step 8102: Destinations are searched between B and E and between E and C. If it is supposed that there is D between B and E, and there is F between E and C, permutation (B, D, E, F, C) is prepared.

Step 8104: The destination A without specified time other than the above is assigned before the time specifying or after time specifying, and a permutation (A, B, D, E, F, and C) are made up.

Step 8105: Route searching is performed according to the prepared permutation.

Step 8106: On the obtained route, time of arrival at each destination is simulated by starting the time simulation means 116.

Step 8107: On the geographical points B, C, and E with specified time, it is judged whether the specified time is followed or not.

Step 8110: If not followed, another permutation (B, D, E, F, C, A) is prepared, and Steps 8105 to 8107 are repeated.

Step 8108: Even when it is followed, if the user judges the result and does not accept it;

Step 8110: Again, a different permutation is prepared, and Steps 8105 to 8107 are repeated. In Step 8108, if the result is satisfactory, the procedure is completed.

If minimum value of the time to go through the route by Step 8108 is judged by computer, it is evident that it will be as given on a flow chart to obtain the shortest time.

Figure 65:
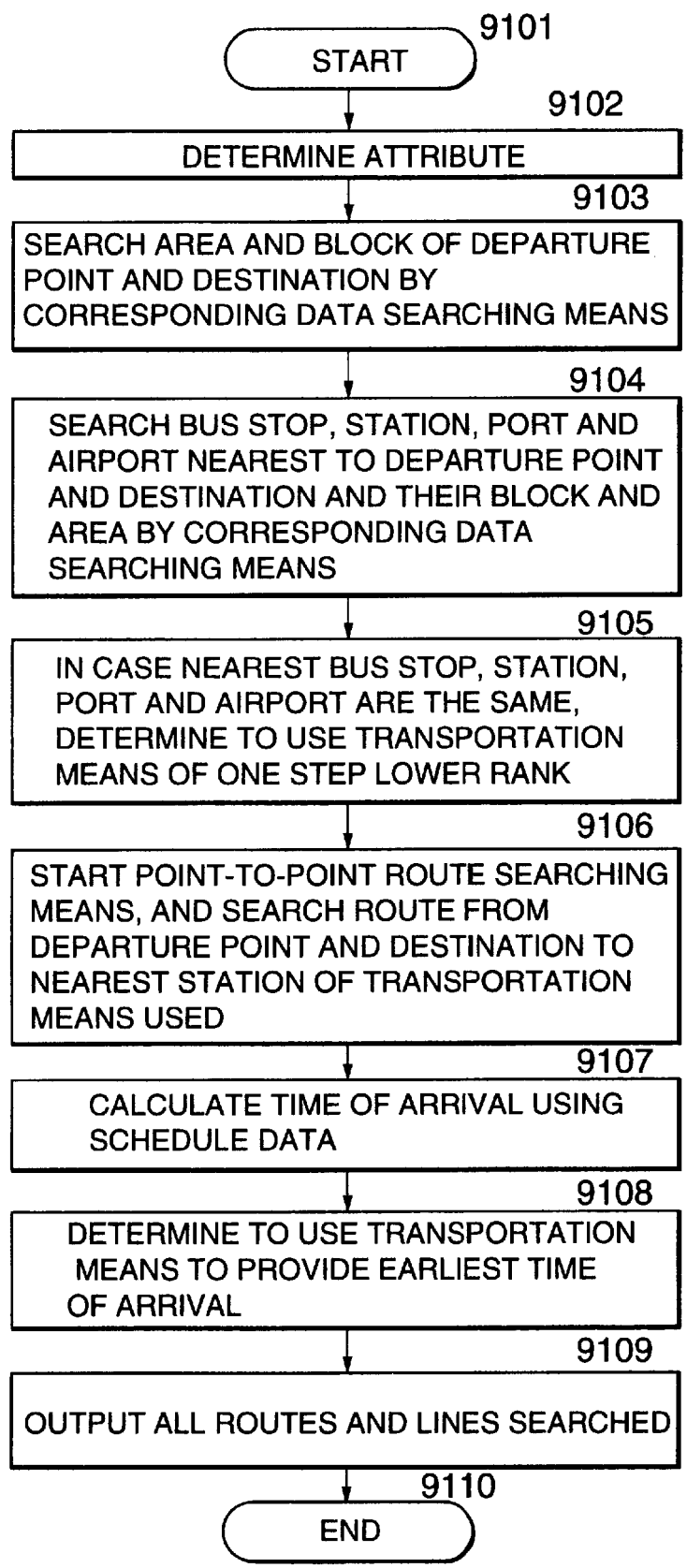
FIG. 65 is a flow chart in a transportation determining means.

By the procedure shown in FIG. 65, the transportation determining means 117 selects a transportation means, which can ensure the earliest time of arrival. Description is now given on the case where the data shown in FIG. 66 are inputted and it is searched by multi-mode a route departing from "Shinagawa Murasaki" at 12:00 and reaches "Roppongi Murasaki" at the earliest time (FIG. 35 and FIG. 59).

The transportation determining means 117 as started performs the following steps:

Step 9102: Attributes of the streets to be searched are determined according to the input using the attribute determining means 1124.

Step 9103: The corresponding data searching means 1141 is started, and area and blocks, to which departure point and destination belong, are searched, and 250b block and 25a area as well as 443b block and 37a area are found.

Step 9104: The nearest information searching means 1142 is started to search blocks and areas of bus stops, stations, ports, and airports nearest to the destination and the departure point. In the searching of the nearest bus stop, 12434st is obtained as the street, to which the nearest bus stop of the departure point belongs, and 11733st is obtained as the street, to which the nearest bus top of the destination belongs. In the searching of the nearest station, 240b block and 27a area are obtained as the data of Aomono Yokocho Station of Keihin Express, which is the nearest station of the departure point, and 420b block and 35a area are obtained as the data of JR Roppongi Station, which is the nearest station of the destination. In the searching of the nearest port, 4001a area and 432b block are obtained as the data of the nearest port of the departure point and the destination. In the searching of the nearest airport, 5002a area and 534b block are obtained as the data of the nearest airport of the departure point and the destination.

Step 9105: In case where the nearest bus stop, station, port or airport of the departure point and the destination are the same, it is determined to use a transportation means by excluding these. In this example, the nearest port and the nearest airport of the departure point and the destination are the same, and it is determined to use bus or train as transportation means.

Step 9106: The point-to-point route searching means 1122 is started to search a route from departure point and destination to the nearest station of the transportation means used. For the railroad station, the shortest route of 250b block and 240b block and the shortest route of 443b block and 420b block are obtained, and the street data of 11723st, 11727st, 11826st, 11733st, 11734st, 11835st, 11747st, and 12423st, 12427st, 12426st, 12433st, 12434st, 12435st, and 12447st are obtained. Also, for the bus stop, the shortest route of 250b block and 12434st and the shortest route of 443b block and 11733st are obtained, and the street data of 11733st, 11734st, 11835st, 11747st, and 12423st, 12427st, 12426st, 12433st, and 12434st are obtained.

Step 9107: Using schedule data, the time of arrival is calculated. With regard to bus, the time of arrival is calculated according to the bus schedule shown in FIG. 67. With regard to railroad, the time of arrival is calculated from the data of train schedule. Changing the modes of the transportation means used, the time of arrival at the destination is calculated as shown in FIG. 68, FIG. 69, and FIG. 62.

Step 9108: The data of the time of arrival are compared with each other, and the transportation means with the earliest time of arrival is adopted. In case the time of arrival is the same, the transportation means with lower cost is selected, and the result of FIG. 69 is adopted.

Step 9109: All of the routes and the lines adopted in Step 9108 (FIG. 69) are outputted.

Next, description will be given on how the pedestrian map data 13 are generated. The pedestrian map data 13 can be prepared using road map and street map as currently available.

Figure 70:
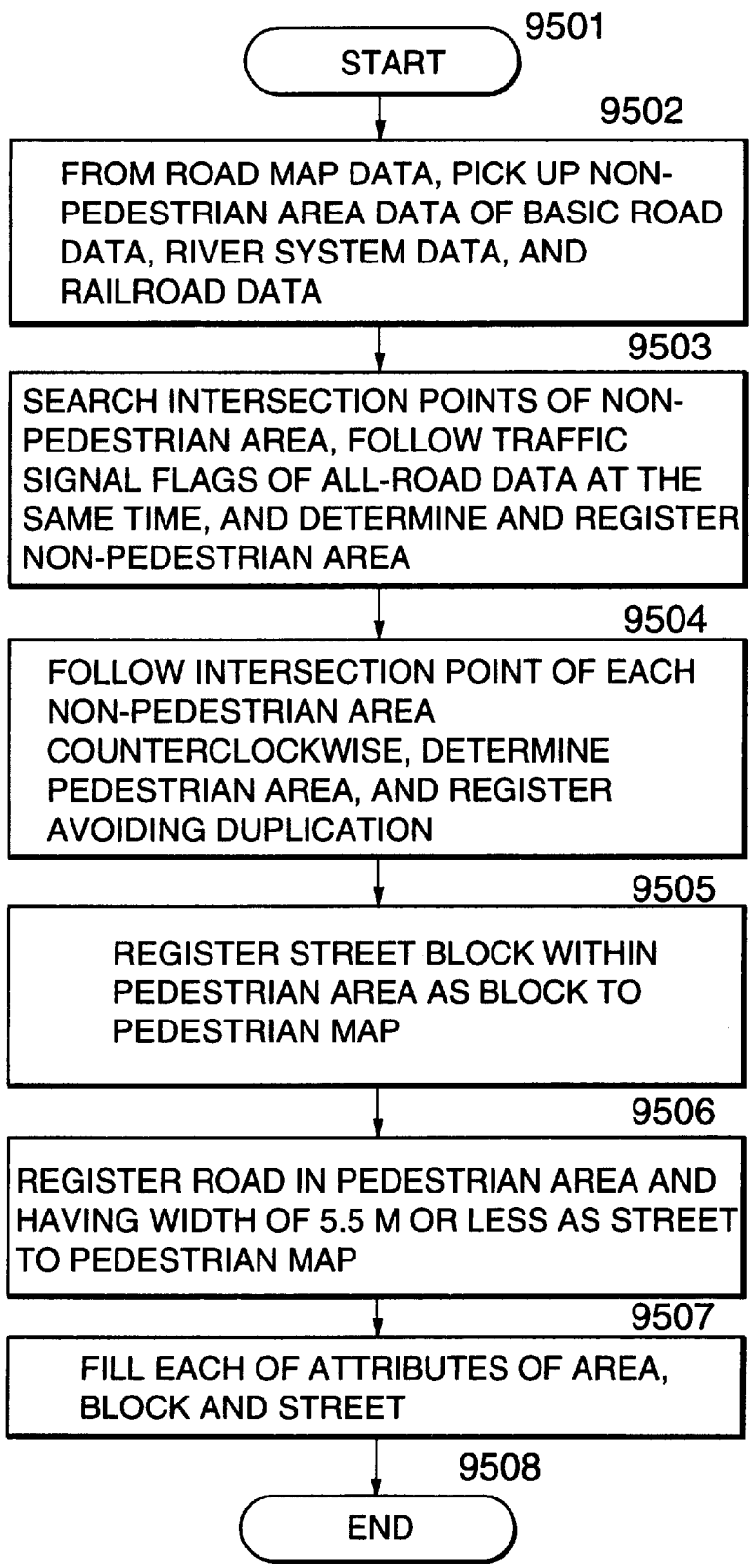
FIG. 70 is a flow chart of a pedestrian map data generating means for generating map data for pedestrians from a road map data.

The pedestrian map data generating and editing means 115 of the pedestrian information processing unit 11 generates the pedestrian map data from the road map by the procedure shown in FIG. 70.

Figure 71:
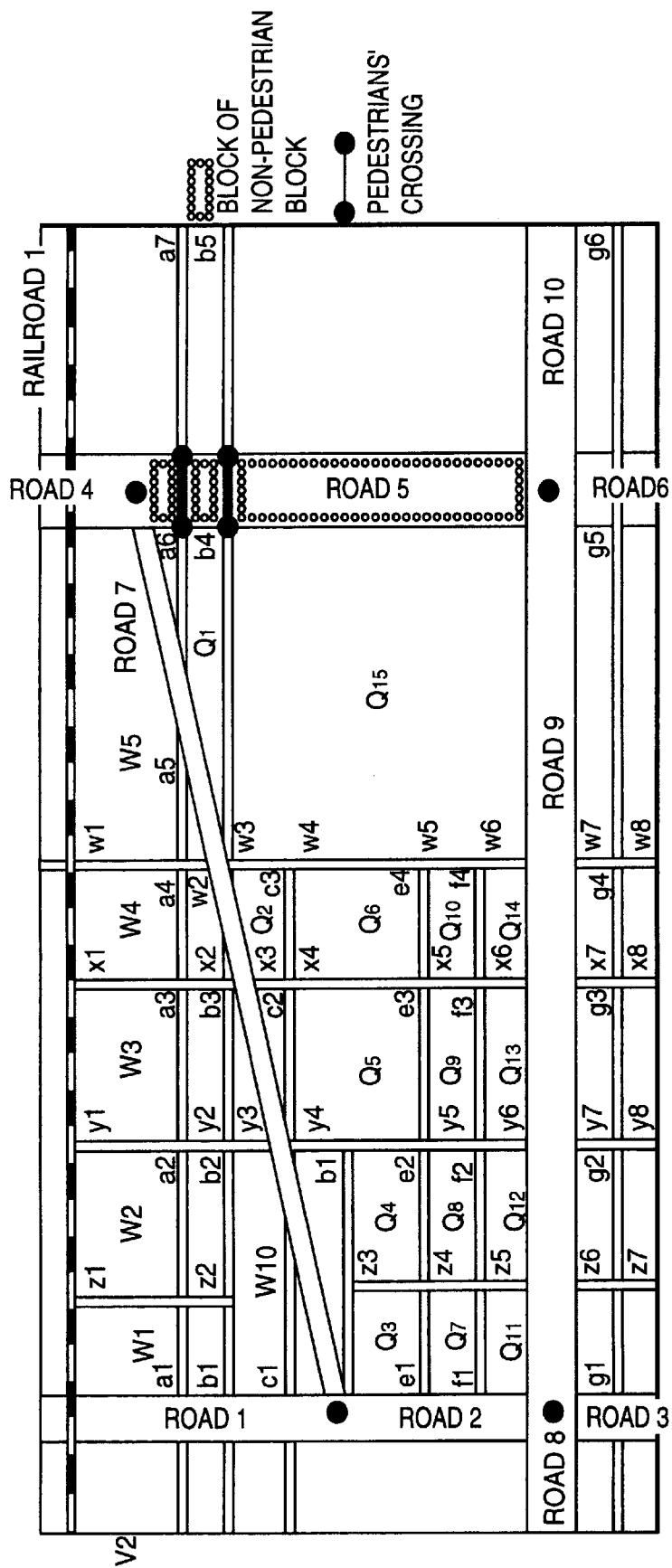
FIG. 71 is a schematical drawing of a first step to generate map data for pedestrians from a road map data.

The pedestrian map data generating and editing means 115 as started performs the following steps:

Step 9502: As shown in FIG. 71, basic road data (FIG. 74), data of river system, and data of railroad, which are non-pedestrian area data, are picked up from the road map data.

Figure 72:
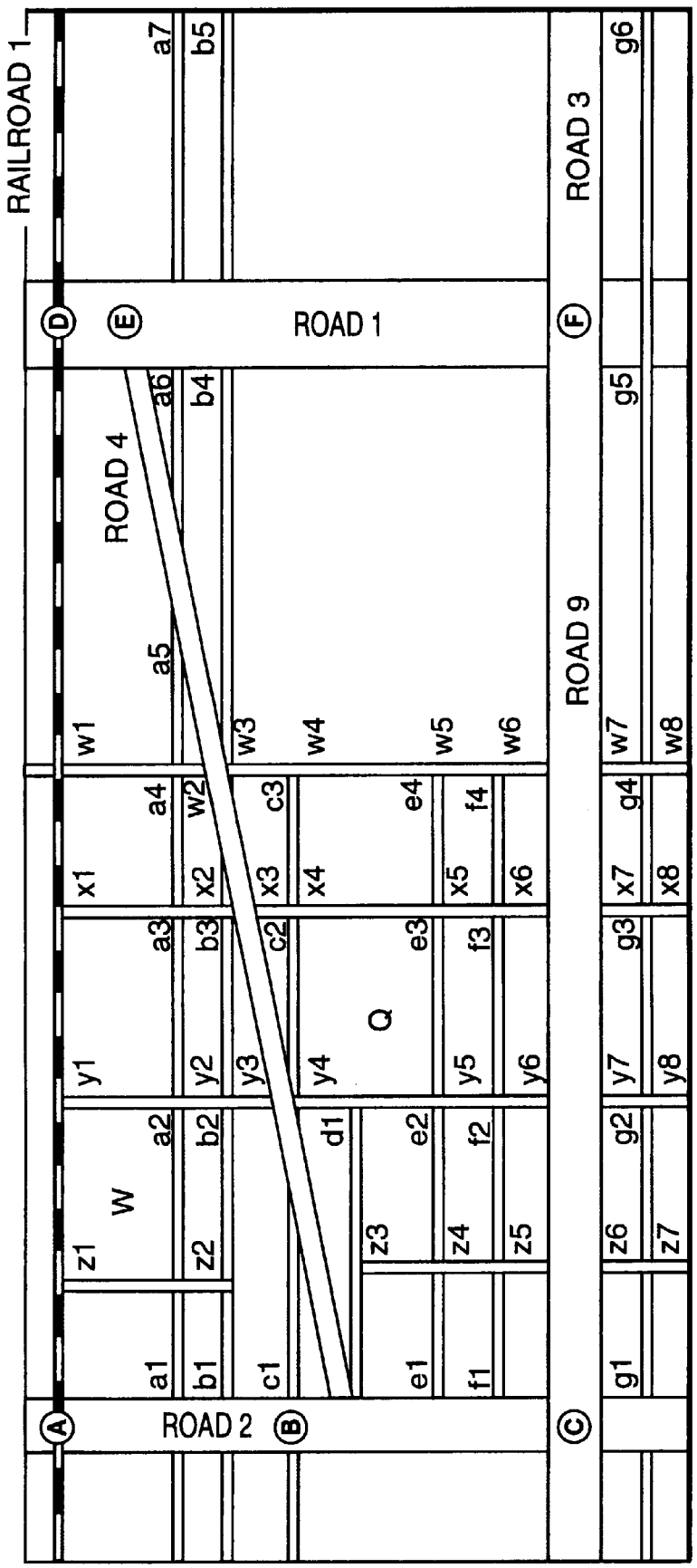
FIG. 72 is a schematical drawing of a second step to generate a map data for pedestrians from a road map data.

Step 9503: Intersections in the non-pedestrian area, i.e. points of intersection A/B/C/D/E/F between basic roads (road 1 to road 9) and between basic road and railroad 1, are obtained (FIG. 72). For each basic road, non-pedestrian area is determined by following the signal flag of all-road data. At the same time, the data of blocks and streets relating to the non-pedestrian area are prepared as shown in FIG. 75A to FIG. 75C.

Figure 73:
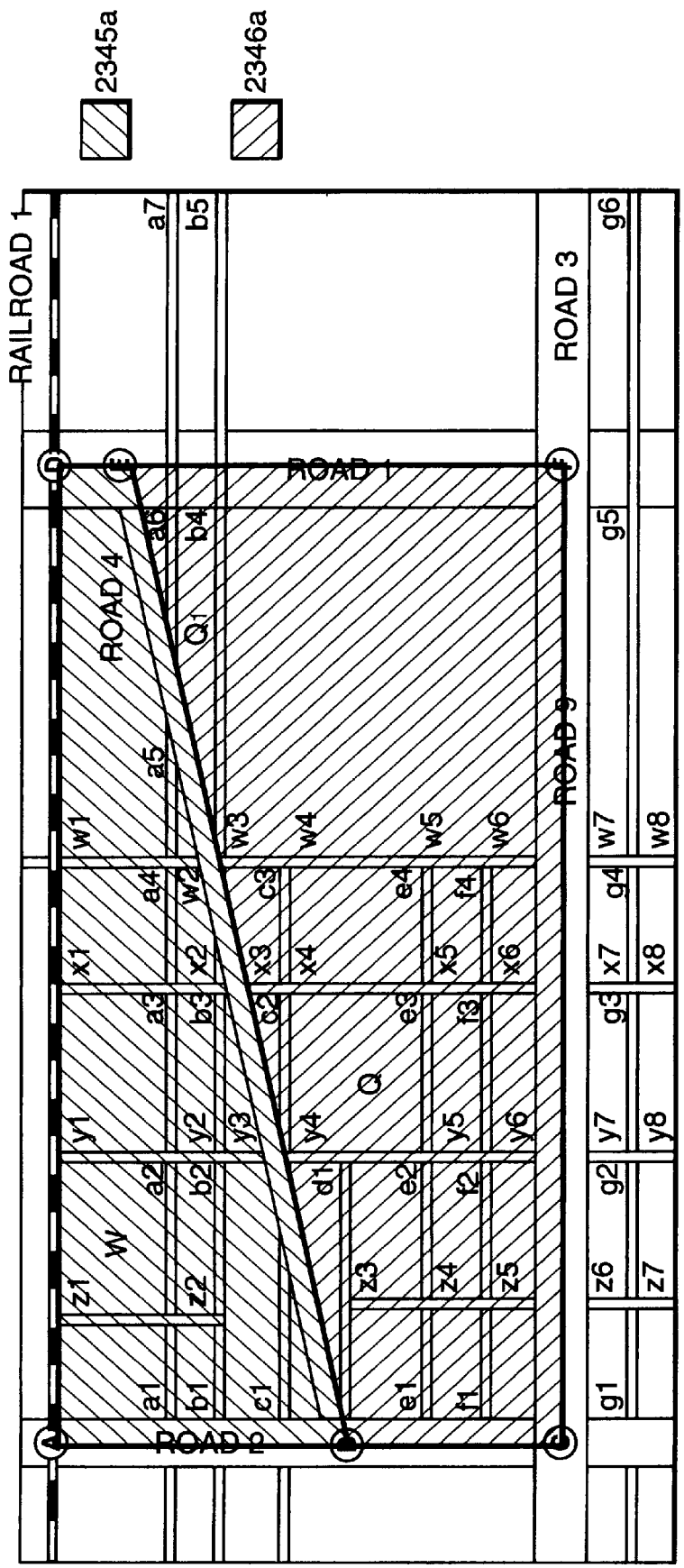
FIG. 73 is a schematical drawing of a third step to generate a map data for pedestrians from a road map data.

Step 9504: Starting from an adequate point of intersection E, points of intersection obtained in Step 9503 are connected with each other counterclockwise (FIG. 73). In this case, if started from E, it goes up to the north and reaches D. Then, it is turned toward left. After reaching A, it is turned toward left. If this procedure is repeated, it goes round in the order of E→D→A→B→E, and this is determined as a contour of the pedestrian area. After confirming that the same contour is not yet registered, it is registered as an area ID 2345*a* in the pedestrian map data. Similarly, a region enclosed by contour of FEBCF is registered as an area ID 2346*a* as shown in FIG. 76.

Step 9505: Referring to the street map, it is calculated that the street block W1 is in the area 2345*a* using vertical line method, and it is registered as block data 2345*b* of the pedestrian map data. Similarly, W2 to W10 are registered as block data of the area 2345*a*. By the same procedure, the street block Q1 is registered as block data 2346*b* of the area 2346*a*. Similarly, the street blocks Q2 to Q15 are registered as block data of the area 2346a. W1 and Q1 are registered as shown in FIG. 77.

Step 9506: From the road map, it is calculated that there is a road a1 with width of 5.5 m or less in the area 2345*a* using vertical line method, and this is registered as the street data 2345st of the pedestrian map data. Similarly, the roads a2–a5, b1–bc, cl, z1–z2, y1–y3, x1–x2, and w1 are registered as streets of the area 2345*a*. Further, the road e3 with width of 5.5 m or less is registered as the street data 2346st of the area 2346*a*. Similarly, the roads a6, b4, c2–c3, d1, e1–e4, f1–f4, z3–z5, y4–y6, x3–x6, and w3–w6 are registered as the streets of the area 2346*a* as shown in FIG. 78.

Step 9507: Following the coordinates of starting point and end point of the streets, connecting street number of the starting point and the end point of the street is registered. From the data of street block, connecting street data of the block are registered. After registration, all of the geographical information are made subordinate to block and street as shown in FIG. 79.

Step 9508: All data are outputted and the procedure is completed.

Thus, the pedestrian map data generating and editing means 115 can automatically prepare pedestrian map data from road map data and street map data.

Also, the pedestrian map editing means may be simultaneously provided, by which the user can add, update or delete the pedestrian map data through user interface. In this case, the user can edit the generated pedestrian map data.

Also, in the pedestrian information providing system, it is possible to display buildings, landmarks, etc. 3-dimensionally at the time of outputting by adding 3-dimensional information to display 3-dimensional configuration to the data of each block and street.

2nd Embodiment

Figure 80:
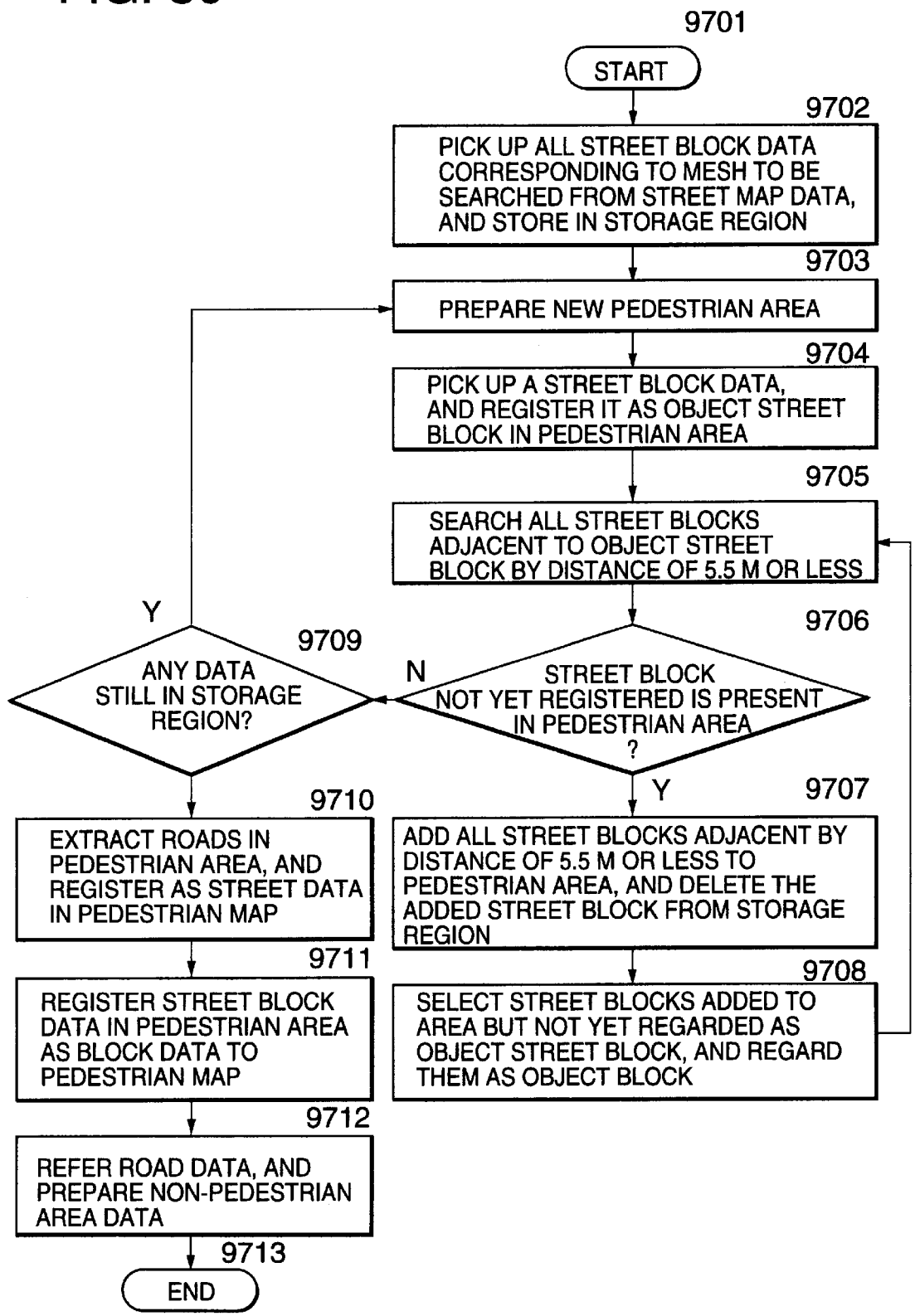
FIG. 80 is a flow chart of means for generating pedestrian map data for generating map data for pedestrians from street map data in the second embodiment.

In the second embodiment, description will be given on the case where the pedestrian map data are generated mainly using street map. FIG. 80 shows the procedure of the pedestrian map data generating and editing means 115 in this case. FIGS. 81(*a*) to (*d*) each represents a schematical drawing to show operation of the pedestrian map data generating and editing means 115 to generate pedestrian map data from street map.

The pedestrian map data generating and editing means 115 as started performs the following steps:

Step 9702: From the street map data, all of the street block data A to T (FIGS. 81(*a*), and FIG. 82) are picked up and are stored in storage region.

Step 9703: Empty pedestrian area data "a" is prepared.

Step 9704: Street block data A is picked up, and this is registered in the pedestrian area data "a" as an object street block.

Step 9705: All street blocks, which are adjacent to the object street block A with a distance of 5.5 m or less are obtained.

Step 9706: It is judged whether a street block is present or not, which is a street block adjacent to the object street block with a distance of 5.5 m or less and which is not yet registered in the pedestrian area "a". If not present (not present in case of FIG. 81A);

Step 9709: It is judged whether there is data in storage region or not. If there is, it is moved to Step 9703.

In this case, the street block data is still in the storage region, and a new pedestrian area "b" is prepared (Step 9703), and the street block data B is picked up, and it is registered as an object street block in the pedestrian area "b" (Step 9704). Then, all street blocks adjacent to the object street block B by a distance of 5.5 m or less are searched (Step 9705). In this case, the street block C is found as such. It is then judged whether there is a street block not yet registered in the pedestrian area "b" (Step 9706). In this case, the street block C is not yet registered.

Step 9707: The street block C is added to the pedestrian area "b", and the street block C is deleted from the storage region.

Step 9708: Among the street blocks added to the area "b", the street block C not yet considered as the object street block is turned to the object street block.

Step 9705: A street block adjacent to C is obtained.

By repeating the procedure of Steps 9705 to 9708, the street blocks B, C, D and E are registered to the area "b".

Similarly, the street blocks are continuously registered to the area until there is no more street block data from the storage region. When there is no more street block data in the storage region (Step 9709);

Step 9710: Line segments of the street block data in each of the pedestrian areas are extracted as roads of 5.5 m or less (FIG. 83 and FIG. 81C), and these are added to the street data.

Step 9711: The street block data in each of the pedestrian areas are registered as block data. In this case, the pedestrian data are prepared as shown in FIG. 84.

Figure 81A:
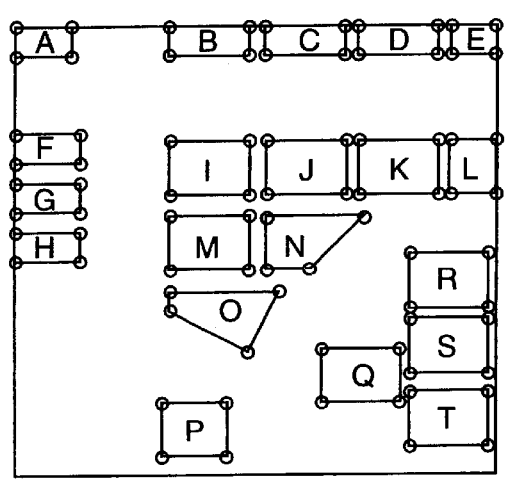
FIGS. 81A to 81D represents first to fourth steps respectively for generating pedestrian map data from street map data by the method of the second embodiment.
Figure 81B:
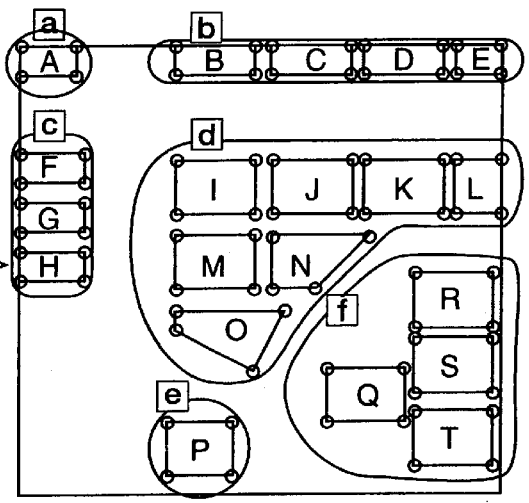
Figure 81C:
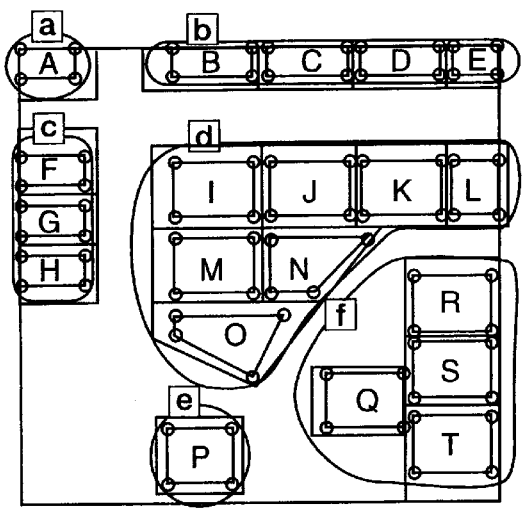
Figure 81D:
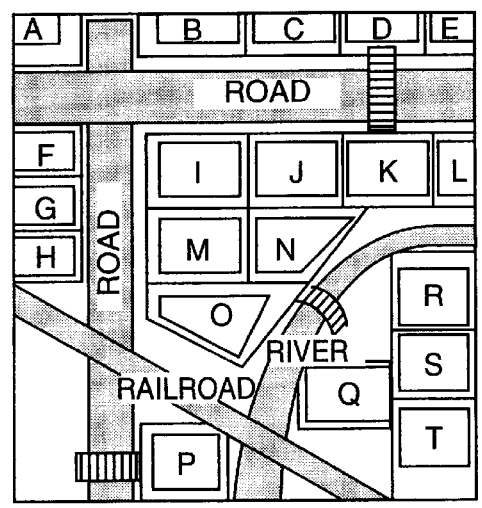

Step 9712: Referring to the road data, non-pedestrian area data are prepared as shown in FIG. 81D.

Step 9713: All of the prepared data are outputted, and the procedure is completed.

In this way, the pedestrian map data generating and editing means 115 can automatically generate the pedestrian map data by mainly using street map.

The pedestrian map data generating and editing means may be arranged in such manner that it comprises a pedestrian map data generating means for preparing pedestrian map data from existing road map as explained in the first embodiment and a pedestrian map data generating means for preparing a pedestrian map data from the street map as explained in the second embodiment.

3rd Embodiment

In the third embodiment, description will be given on a pedestrian map data generating and editing means for determining pedestrian area from a road map data by a simple method. FIG. 138 is a flow chart to show operating procedure of the pedestrian map data generating and editing means, and FIGS. 139A and 139B schematically illustrate a pedestrian area generated from a road map by this method. FIG. 139A shows a road network near a node A in the road map. Thick lines indicate basic roads, and thin lines (thin lines are concealed under thick lines) indicate all roads. By the procedure given below, the pedestrian map data generating and editing means generates each of pedestrian areas shown in FIG. 139B from the data of the road network.

The pedestrian map data generating and editing means as started performs the following steps:

Step 002: Basic road data, river system data and railroad data are picked up from the road map data. Thus, the data of the road network of FIG. 139(*a*) are picked up.

Step 003: The data of each node of the basic road are duplicated, and number of the nodes is increased up to the degree of the node. The degree is defined as number of links entering the node. The degree at the node A in FIG. 139A is 4, and the degree at the node B is 2. Therefore, for the data of the node A with the degree 4, the number of the data is increased to 4 by duplication. As shown in FIGS. 140 and 140B, this means that the node A is split to 4 nodes of A1, A2, A3 and A4.

The node A1 thus split is turned to a node having an internal angle A1 connected to two links adjacent to A, i.e. a link with the node "a", and a link with the node "b". Also, the node A2 is turned to a node having an internal angle A2 connected to two links, i.e. a link between A and the node "b" and link between A and the node "c". The node A3 is turned to a node having an internal angle A3 connected to two adjacent links, i.e. a link between A and the node "c" and a link between A and the node "d". Also, the node A4 is turned to a node having an internal angle A4 connected to two adjacent links, i.e. a link between A and the node "d" and a link between A and node "a". However, in this stage where the node is simply split, connection information between nodes remain the same. As shown in FIG. 140(*b*), the node A1 is connected not only with the nodes a1 and b1 but also with the nodes a2, b2, c1, c2, d1, and d2. Similarly, the nodes of A2, A3 and A4 are also connected to each of the nodes a1, a2, b1, b2, c1, c2, d1, and d2.

Step 004: For the node A1, the connections with the nodes b2, c1, c2, d1, d2, and a2 not found inside the internal angle A1 are cut off. Also, for A2, A3, and A4, the connections to the nodes which are not within the internal angles A2, A3 or A3 are cut off. By this processing, connections between the nodes are turned to the state as shown in FIG. 140C. After the same procedure has been performed for all of the nodes;

Step 005: The procedure is completed.

As the result of this processing, a pedestrian area as shown in FIG. 139B is prepared.

By this method, it is possible to prepare a pedestrian area in simple and quick manner from the road data.

4th Embodiment

Figure 142A:
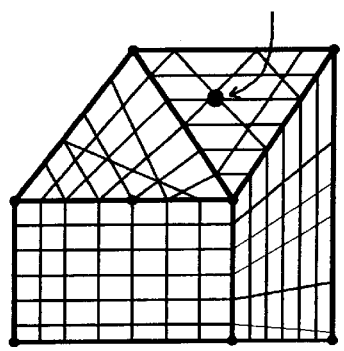
Figure 142B:
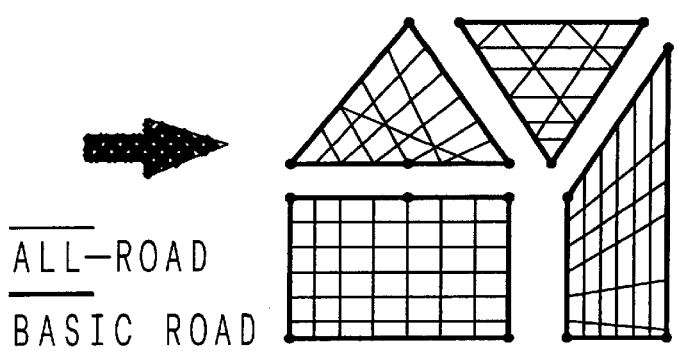

In the fourth embodiment, description will be given on the pedestrian map data generating and editing means for determining a pedestrian area from a road map data in simple manner. FIG. 141 is a flow chart to show operating procedure of the pedestrian map data generating and editing means, and FIGS. 142A and 142B schematically illustrate a pedestrian area generated from the road map by this method.

The pedestrian map data generating and editing means as started performs the following steps:

Step 012: Basic road data, river system data, and railroad data are picked up from the road map data. Thus, the data of the road network of FIG. 142A are picked up.

Step 013: Route searching is started form nodes of all arbitrary roads to all bearings (directions), and route searching is continued until each of the search leaves (tips of search) reaches a basic road. This is illustrated in FIGS. 143A to. FIG. 143A shows a node "a" of each road, for which route searching is started, and FIG. 143B indicates a stage where processing has proceeded from the node "a" to the second node. Broken lines show the links passed through. All nodes passed through and all links are stored in memory. As shown in FIG. 143C, when all of the search leaves reach the basic road, the searching is terminated.

Step 014: All-road nodes passed through, all-road links and basic road nodes and links reached are considered as one group. The connection with the nodes which are not found in this group is cut off, and this is registered as a pedestrian area.

Step 015: The procedure from Step 013 to Step 014 is repeated until all-road data are registered in the area data.

Step 016: When all-road data are registered in the area data, this processing is terminated.

As the result of this processing, a pedestrian area shown in FIG. 142B is formed. By this method, the pedestrian area can be generated by repeating simple procedure from the road map data. Even when attribute information to show degree in the nodes of basic road is not prepared satisfactorily, the pedestrian area can be generated by this method.

5th Embodiment

In the fifth embodiment, description will be given on a method to split one area to a plurality of areas. If number of areas is increased, the burden applied on generation of the pedestrian map data is increased. For this reason, narrow rivers and the like are not discriminated as non-pedestrian area in the initial stage and are included in the pedestrian area. Only when the need to discriminate becomes apparent, it is divided to a plurality of areas. This will make it possible to more efficiently perform generation and searching of the pedestrian map data from general viewpoint.

In such case, flow rate of pedestrians in each link of all roads is calculated in this embodiment. If there are several streets parallel to each other, the flow rate in each street decreases. On the contrary, in case pedestrians from several streets enter a single street, the flow rate of this street increases because it is a sum of the flow rates of all of these streets.

In case there is a link where flow rate exceeds a predetermined value, this link is determined as a street to go over a non-pedestrian area (i.e. If non-pedestrian area is a river, the street is a bridge. If non-pedestrian area is a road, the street is pedestrians' crossing or footbridge.), and the area is split. If there is no link where flow rate exceeds a predetermined value, splitting of the area is not performed.

FIG. 144 is a flow chart to show operating procedure of the pedestrian map data generating and editing means in this case. FIG. 145, FIG. 146, and FIG. 147 each represents a schematical drawing to explain this operation.

The pedestrian map data generating and editing means as started performs the followings steps:

Step 022: From the pedestrian route data, an area data is picked up. Explanation is now given on a case where there is an area data as shown in FIG. 145 and a bridge is detected from an area A. FIG. 146 is an enlarged view of the area A.

Step 023: From all-road node "a" of the area A, flow rate of each link is calculated toward all bearings within the area A.

Step 024: It is checked whether there is a link where flow rate exceeds a predetermined value or not. Flow rate exceeds a predetermined value in each of the links b, c, and d in FIG. 146, and the links b, c, and d are detected as bridges.

Step 025: With the links b, c, and d as borders, the area is split as shown in FIG. 147 to turn it to a new area A1 and a new area A2.

Step 026: For all of the area data, the procedure from Step 023 to Step 025 is repeated.

Step 027: When processing is completed for all of the area data, splitting of the area is terminated.

In this method, only the areas relating to a link with high priority are divided, and the other areas are included in the pedestrian area. In so doing, it is possible to alleviate the burden on generation of the pedestrian map data.

Also, by this method, it is possible to recognize a bridge in the pedestrian map even when attribute information on the road map is not prepared satisfactorily.

6th Embodiment

In the sixth embodiment, description will be given on operation of the pedestrian map data generating and editing means 115, which generates the data of streets from a map data showing a premise such as underground shopping center or facilities.

Figure 111:
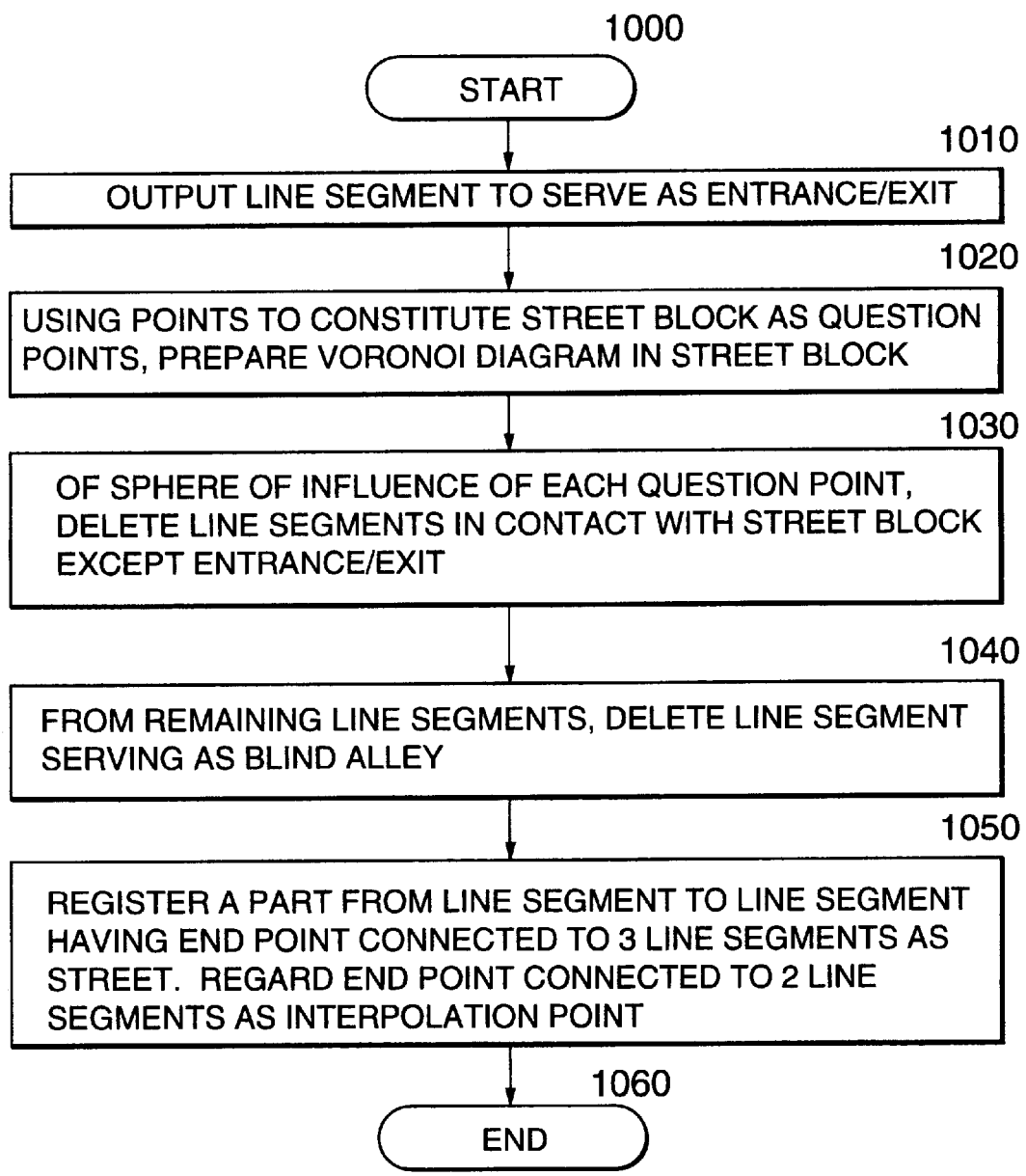
FIG. 111 is a flow chart showing procedure of pedestrian map data generating and editing means for extracting streets from a premise vector drawing in a sixth embodiment.
Figure 112:
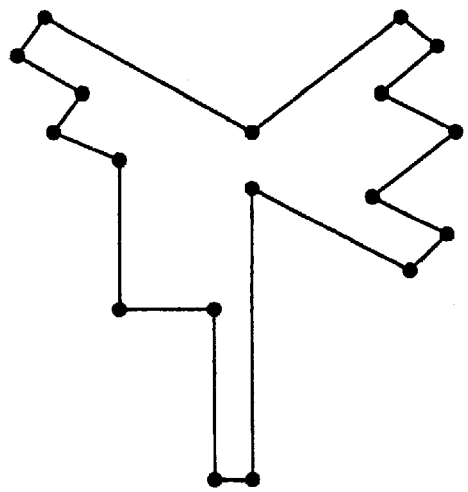
FIG. 112 shows an example of a map of a premise.

The pedestrian map data generating and editing means 115 extracts streets by a procedure shown in FIG. 111 from a vector diagram of a premise map. As an example, explanation is given now on the premise drawing shown in FIG. 112.

Step 1010: Sides a, b, c, and d, which serve as entrances or exits in the premise drawing, are inputted.

Figure 113:
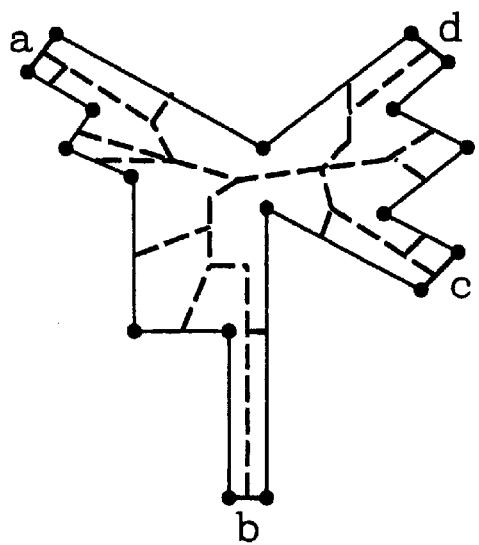
FIG. 113 is a Voronoi diagram.

Step 1020: The pedestrian map data generating and editing means 115 prepares a Voronoi diagram in the premise using vertexes shown by black circles in the premise drawing (FIG. 112) read from the pedestrian map data 13 as question points. In this diagram, borders to indicate spheres of influence of each question point are as shown by broken lines in FIG. 113.

Figure 114:
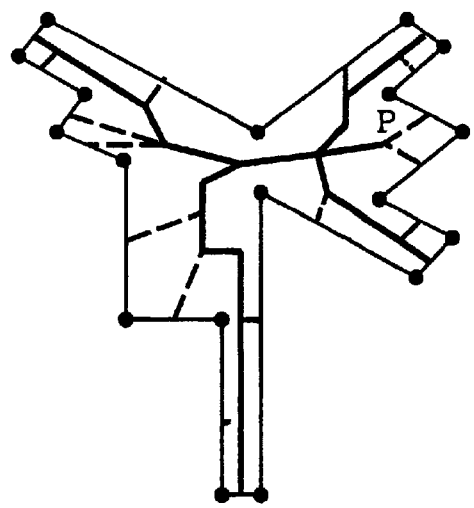
FIG. 114 represents a drawing, in which line segments in contact with sides of a premise are deleted.

Step 1030: Of the borders indicated by broken lines, line segments in contact with sides other than a, b, c, and d are deleted. Only the line segments shown by thick lines in FIG. 114 are left.

Figure 115:
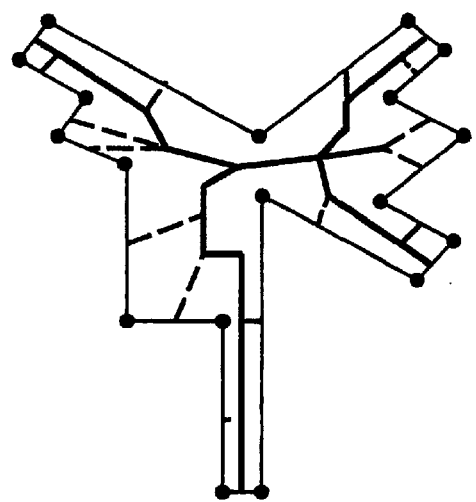
FIG. 115 represents a drawing, in which excessive line segments are deleted.

Step 1040: Next, of the remaining line segments, the line segments, whose end point is not connected to any side or to any line, are deleted. By this processing, only the line segments shown by thick lines in FIG. 115 are left.

Figure 116:
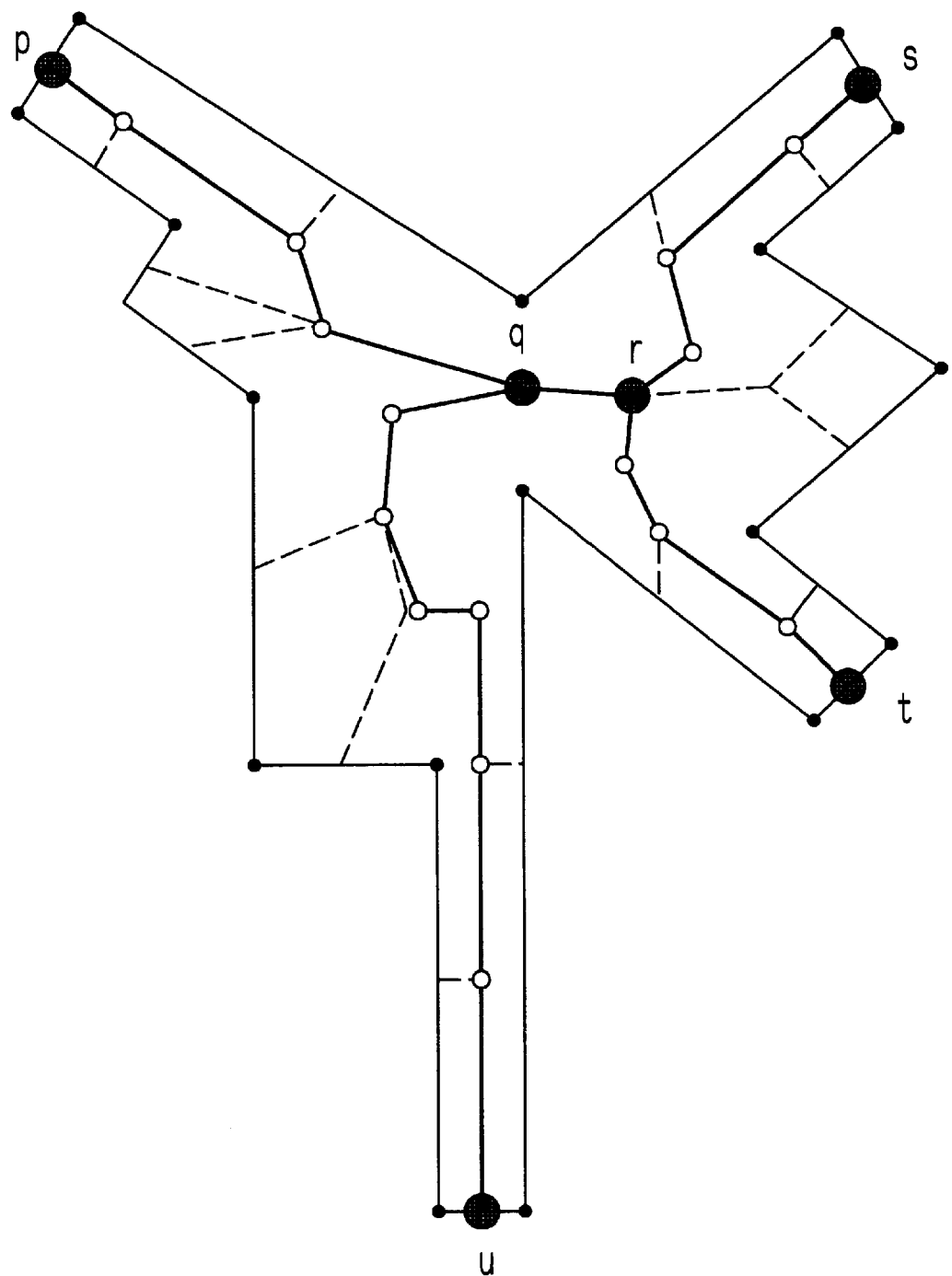
FIG. 116 is a drawing for street data picked up.

Step 1050: When points (q, r) where three or more of the remaining line segments cross each other and points (p, s, t, u), which are on the sides a, b, c or d, and serving as entrance or exit, are indicated by black circles, each continuous line segment from a black circle to a black circle as shown in FIG. 116 is registered as a street. Also, bending point of this street and points of intersection with border in Voronoi diagram are registered as interpolation points of the street. Thus, street data of the premise are generated.

7th Embodiment

In the seventh embodiment, description will be given on a method to correct the generated pedestrian area data. On the generation of the pedestrian area data, explanation has already been given using the flow chart of FIG. 70. Specifically, the pedestrian map data generating and editing means 115 reads road map data and street map data. First, using the road map data, a region and contour streets of the pedestrian area are picked up by starting from intersection point of major roads and by returning to initial intersection point by following the major road clockwise or counter-clockwise. Then, these are registered. Next, using the street map data, street blocks and facilities in the pedestrian area are picked up by point position determining method such as vertical line method, and these are registered.

Figure 126:
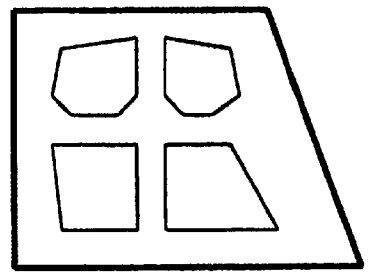

However, this method combines what are obtained from two types of map data, and contour streets of the pedestrian area indicated by thick lines and street blocks and facilities indicated by thin lines may be deviated as shown in FIG. 126, and blanks may be generated between them.

In the seventh embodiment, description will be given on a method, by which it is possible to correct the pedestrian area data having blanks as shown in FIG. 126 to pedestrian area data, in which there are contour streets along peripheries of facilities and street blocks and which are closer to actual conditions.

Figure 125:
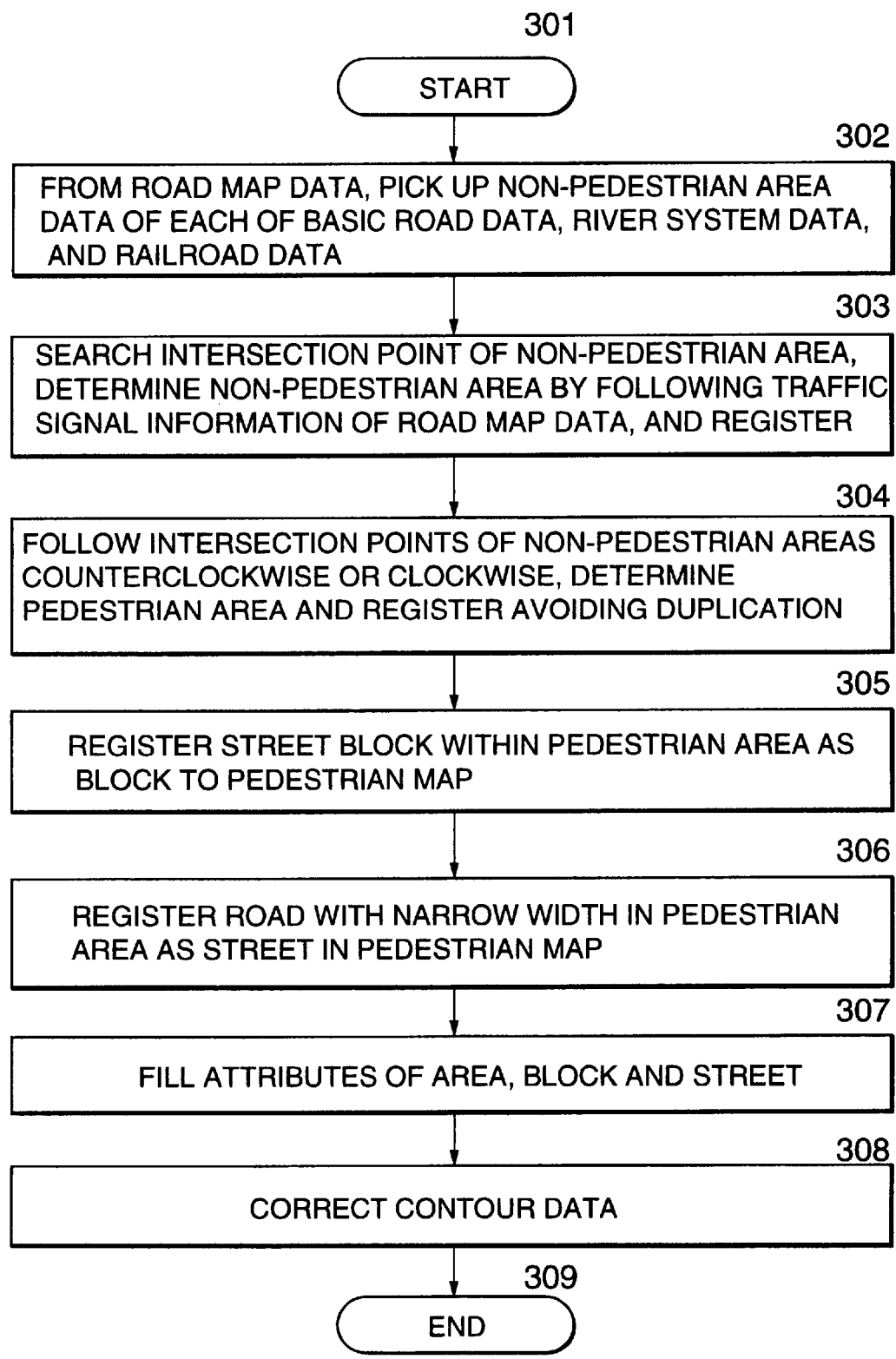

The pedestrian map data generating and editing means 115 generates the corrected pedestrian area data by a procedure shown in FIG. 125.

In the procedure given in FIG. 125, the procedure from Step 302 to Step 307 is the same as the procedure from Step 9502 to Step 9507 of FIG. 70, and it is the procedure to generate the pedestrian area data of FIG. 126.

Step 308: The pedestrian map data generating and editing means 115 correct the data of the pedestrian area thus obtained to the data closer to the actual condition.

Figure 127:
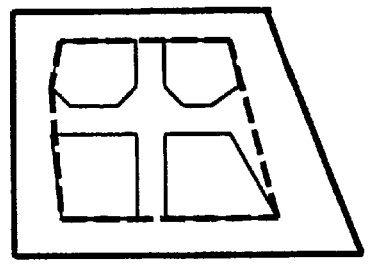
Figure 128:
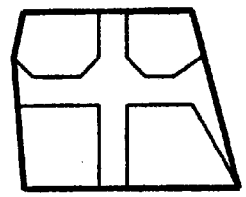

In the correcting procedure, for example, by applying convex closure method to street blocks in the pedestrian area as shown in FIG. 127, contour streets indicated by broken lines are obtained. Then, the portion indicated by the broken lines is registered as a new pedestrian area as shown in FIG. 128.

Convex closure (or convex hull) method is a method, in which a straight line at the outermost position is selected when a straight line is drawn from a certain vertex of a street block to each vertex of the other street block, and from the vertex connected by this straight line, a straight line at the outermost position is selected when straight lines are drawn similarly to each vertex of the other. By repeating this procedure sequentially, a polygon is obtained.

Figure 129:
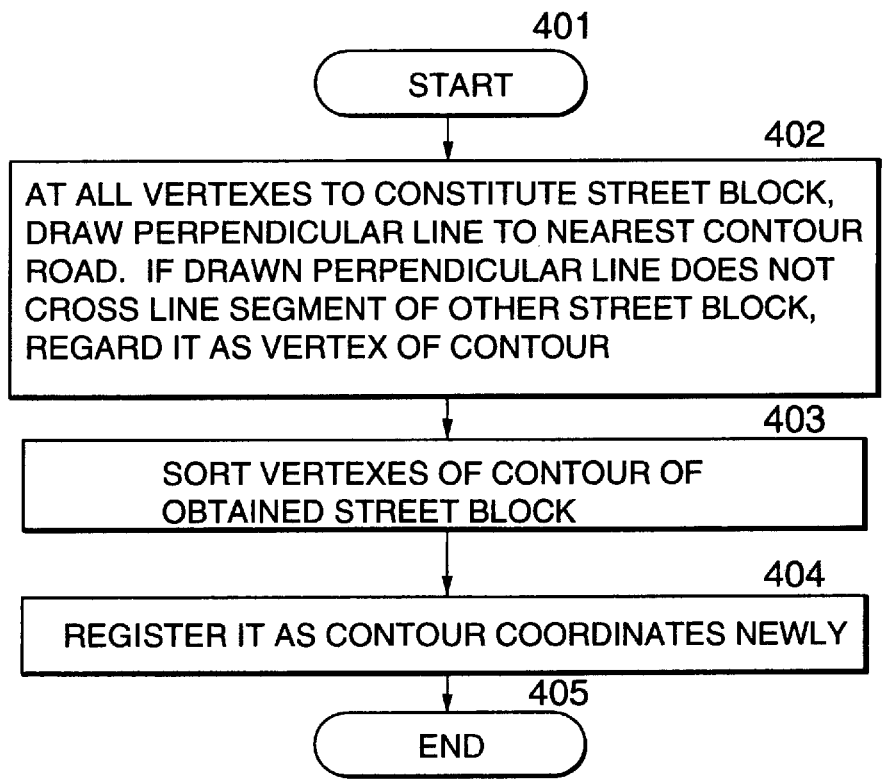

The correction of the pedestrian area data of FIG. 126 can be performed by the procedure of FIG. 129.

Step 402: Of the vertexes constituting a street block, from all vertexes, which are within a predetermined distance from the contour road, lines are drawn perpendicularly to the nearest contour road. If the vertical line does not cross a line segment of the other street block, this vertex is considered as the vertex of the contour street.

Figure 130:
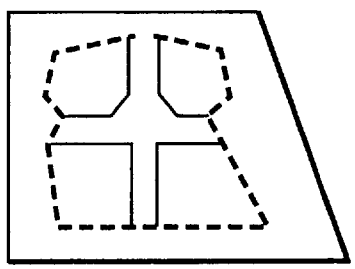

Step 403: By connecting the vertexes thus obtained, a contour street shown by broken line in FIG. 130 is obtained.

Step 404: The portion indicated by the broken lines is registered as a new pedestrian area as shown in FIG. 131.

By this method, it is possible to obtain contour streets, which are running along the street block and are closer to actual condition than the contour streets obtained by the convex closure method (FIG. 128).

Also, the correction of the pedestrian area data of FIG. 126 can be performed by the procedure of FIG. 132.

Step 501: As shown in FIG. 133, the center (black circle) of the area is obtained.

Step 502: A straight line is drawn, which passes through vertexes constituting a street block (vertexes which are within a predetermined distance to contour street) or a point on a line segment of the street block and the center of the area. If the line segment of the street block, which crosses this straight line, is not at a position outer than the vertex (or a point on the line segment), this point is considered as the vertex of the contour street.

Step 503: By connecting the vertexes thus obtained, a contour street shown by broken line in FIG. 133 is obtained.

Step 504: The portion indicated by the broken line is registered as a new pedestrian area as shown in FIG. 134.

The correcting method of FIG. 126 and FIG. 132 is applied only to vertex or line segment, which is within a predetermined distance to the contour road. The distance from the contour road may be changed in such manner that it is shorter when road width of the contour link is wider, and the distance is longer when the road width is narrower.

In this way, by correcting the data of the pedestrian area to the condition closer to actual condition, it is possible to provide more accurate route guidance for pedestrians.

8th Embodiment

In the eight embodiment, description will be given on the pedestrian map data generating and editing means for generating pedestrian map data by adequately using the methods as described above.

As shown in FIG. 148, this pedestrian map data generating and editing means comprises a first pedestrian map data generating means 1151 for performing a method to generate pedestrian map data using a road map and a street map as explained in the first embodiment, a second pedestrian map data generating means 1152 for performing a method to generate the pedestrian map data using a street map data explained in the second embodiment, a third pedestrian map data generating means 1153 for performing a method to generate a pedestrian area by splitting a road map data as explained in the third embodiment, a fourth pedestrian map data generating means 1154 for performing method to generate a pedestrian map data by grouping links and nodes where leaf of route searching reaches basic road as explained in the fourth embodiment, a fifth pedestrian map data generating means 115 for generating data of streets from premise map data as explained in the sixth embodiment, a pedestrian bridge detecting means 1156 for performing a method to detect a link with higher flow rate and to split relevant areas as explained in the fifth embodiment, a first pedestrian map data correcting means 1157 for performing a method to correct pedestrian area data shown in FIG. 125, a second pedestrian map data correcting means 1158 for performing a method to correct pedestrian area data shown in FIG. 129, a third pedestrian map data correcting means for performing a method to correct pedestrian area data shown in FIG. 132, and a generating means determining means 1160 for selecting and starting one of the means 1151 to 1159.

Upon receipt of the parameters relating to map data generation from the input/output control means 111, the generating means determining means 1160 starts map data generating means and correcting means in response to the parameters and generates a pedestrian map data.

By this pedestrian map data generating and editing means, pedestrian map data with less errors can be efficiently generated by combining various types of pedestrian map data generating means and correcting means.

9th Embodiment

The pedestrian information providing system of the ninth embodiment of the invention can provide route information for pedestrians in a manner easily understandable to the pedestrians.

The present system comprises the arrangements of FIG. 1, FIG. 2, and FIG. 3 similar to the first embodiment as hardware arrangement. The pedestrian route searching means 112 of the present system searches with priority a sidewalk of a contour road (contour street) in contact with outer periphery of a pedestrian area. The input/output control means 111 converts a route searched by the pedestrian route searching means 112 to a route information data shown in icons and outputs it, and icons are displayed on a display screen of the portable terminal equipment, which receives the data.

Figure 86:
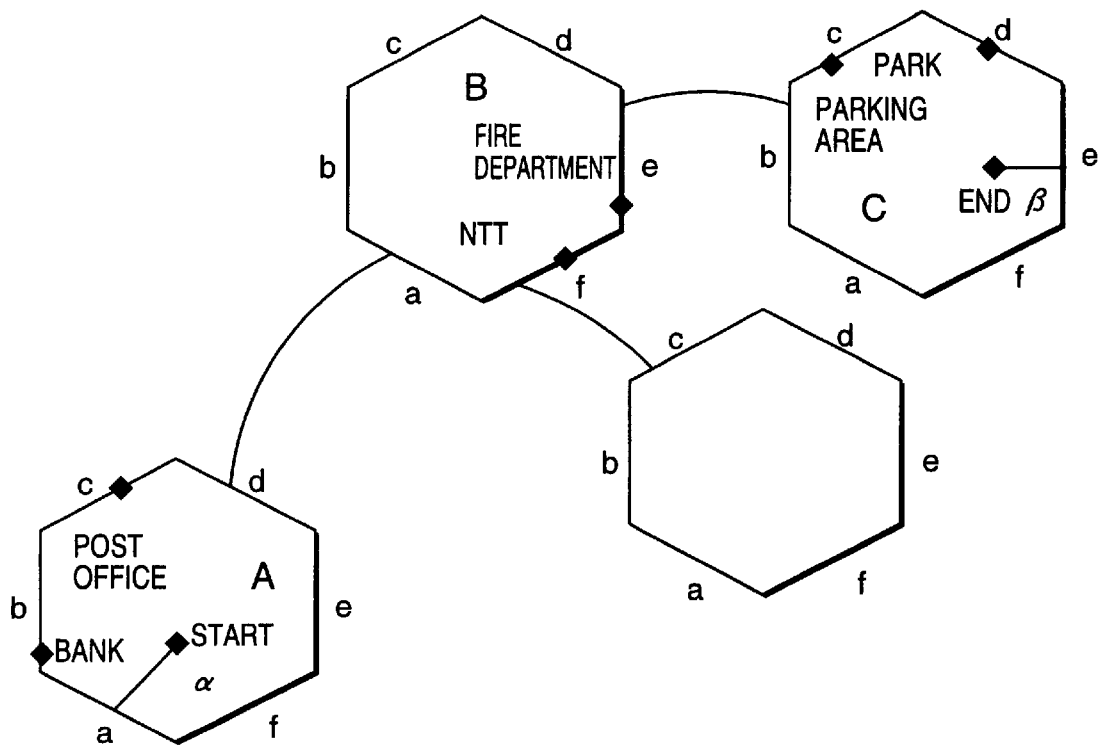
FIG. 86 is a schematical map for explaining route searching with priority on contour road.

First, on the route searching with priority on the contour street by the pedestrian route searching means 112, description will be given on the schematical map of FIG. 86 as an example. The results of the route searching are shown by thick lines in FIG. 87.

Figure 85:
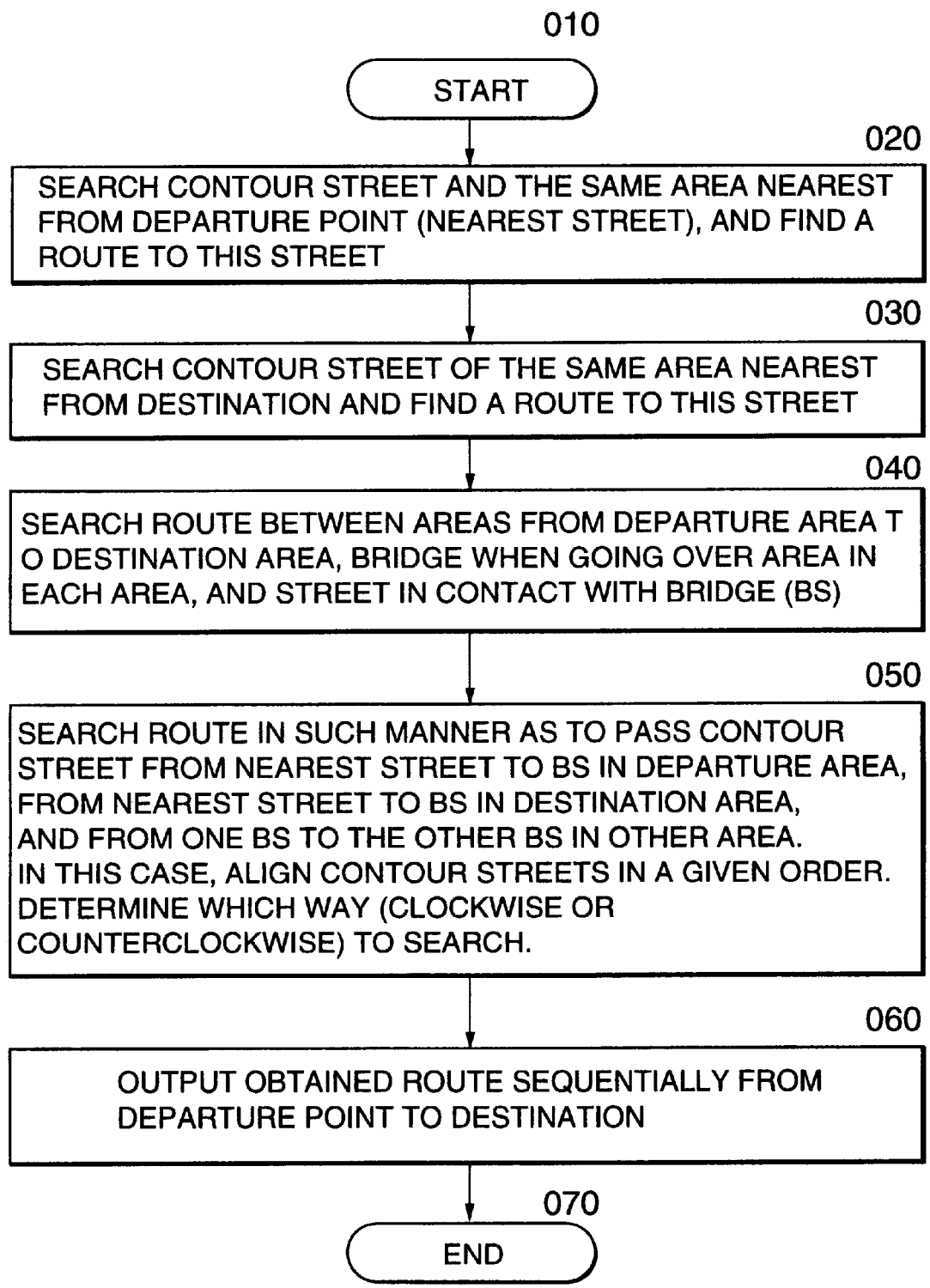
FIG. 85 is a flow chart showing procedure of route searching means for pedestrians for searching route with priority on contour road in a ninth embodiment.

The pedestrian route searching means 112 performs route searching by the procedure shown in FIG. 85.

Step 020: In an area (A), to which the departure point (Start) belongs, a street (sidewalk) of a contour road (a) with the shortest straight distance from the departure point is obtained (this is called "the nearest street"), and a route (α) from the departure point to the nearest street is obtained.

Step 030: In an area (C), to which the destination (End) belongs, the nearest street (e) of the contour road with the shortest straight distance from the destination is obtained, and a route (β) from the departure point to the nearest street is obtained.

Step 040: Next, an area is obtained, which is to be passed through when going from the departure area (A) to the destination area (C) (A→B→C). Then, a bridge to pass when going from an area to another area, and a street, with which the bridge is in contact (BS) (street "d" in the area A, streets "a" and "e" in the area B, and street "b" in the area C) are obtained.

Step 050: Next, in the departure area (A), a contour street from the nearest street (a) to BS street (d) in contact with the bridge is obtained. In the destination area (C), a contour street from the nearest street (e) to BS street (b) is obtained. In the other area (B), a contour street from one BS street (a) to the other BS street (e) is obtained. In this case, the pedestrian route searching means 112 determines whether to turn round clockwise or counterclockwise according to the time required, attribute, etc.

Step 060: The pedestrian route searching means 112 searches a route from the departure point to the destination as shown by thick lines in FIG. 87, and the route data (shown in FIG. 88) thus obtained are outputted sequentially to the input/output control means 111.

The route searching for pedestrian with priority on the contour street can be efficiently performed by preparing the data arrangement of the pedestrian map data 13 as given below.

First, the streets in the pedestrian area are classified to contour streets and streets inside the area. For the contour streets, one street is used as a starting point, and street data are sequentially arranged clockwise or counterclockwise from that point.

In this case, after the nearest street and the BS street and the BS street have been obtained, the pedestrian route searching means 112 can obtain data of a series of contour streets by sequentially reading adjacent street data to correspond to advancing direction of the pedestrian by following the arrangement of the data.

When the route data of the results of searching are inputted from the pedestrian route searching means 112, the input/output control means 111 outputs the data of the contour street instead of the route information data of icons. On the other hand, the portable terminal equipment is provided with characters to match the data of icons. On the display screen of the portable terminal equipment, route information in icons is displayed according to the data sent from the input/output control means 111.

Figure 90:
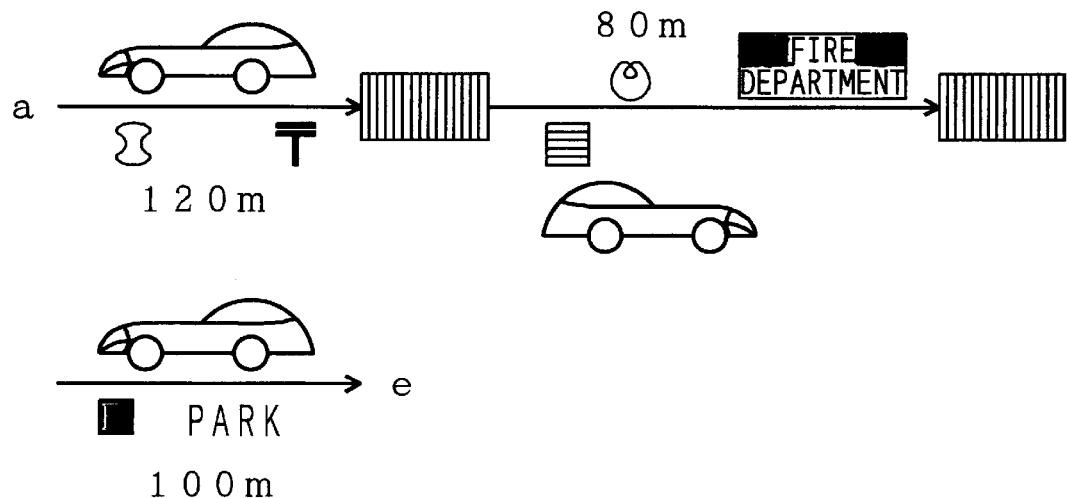
FIG. 90 shows examples of icon display.

FIG. 90 shows an example of route information in icons relating to a contour road. Advancing direction of the pedestrian is displayed in relation to advancing direction of vehicles along a traffic lane closer to sidewalk of the contour road. Also, information data such as facilities along the road, distance of the street, etc. are displayed at the same time.

Figure 89:
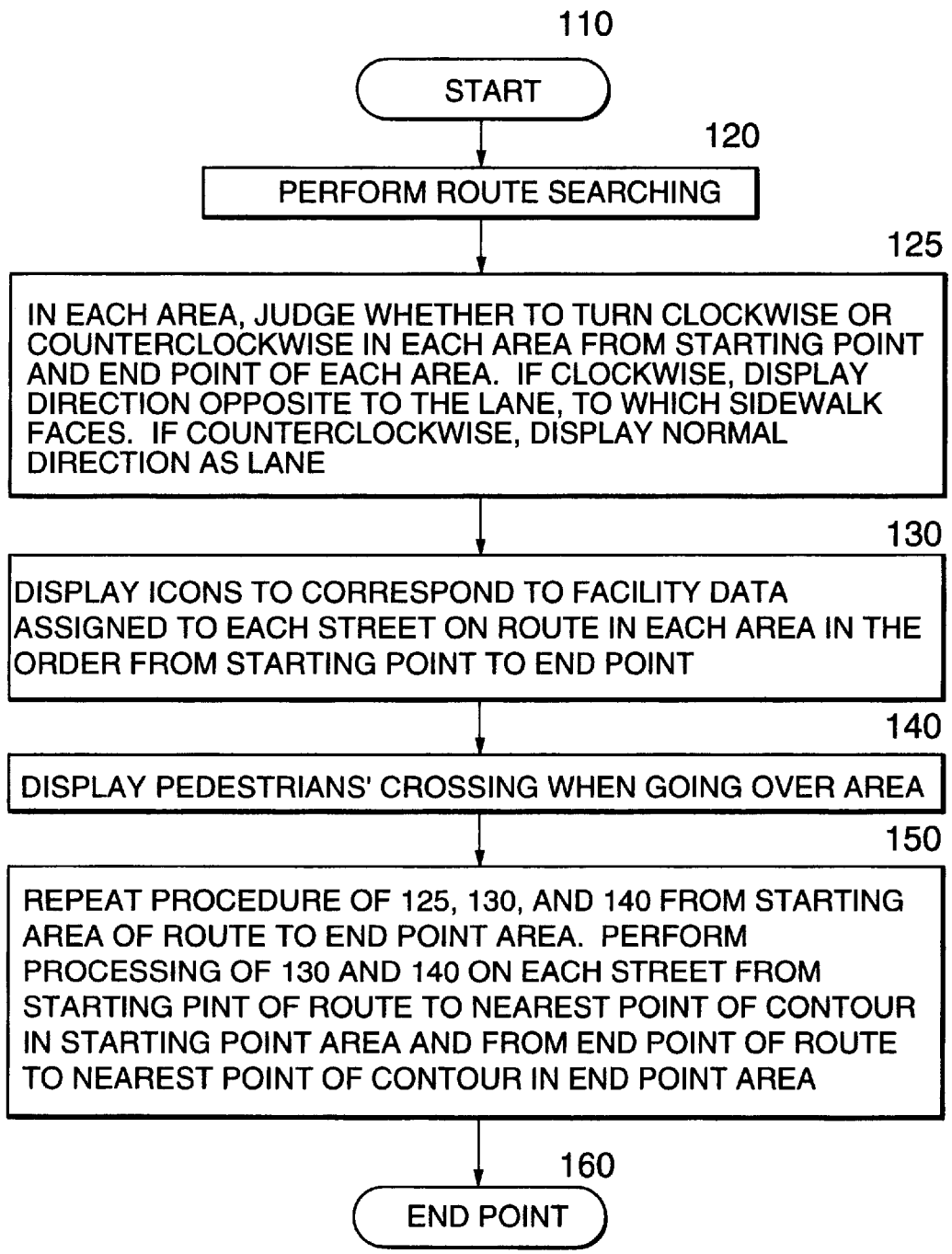
FIG. 89 is a flow chart showing procedure of input/output control means for displaying icons in the ninth embodiment.

The input/output control means 111 prepares and outputs route information in icons relating to the contour street by the procedure shown in FIG. 89.

Step 120: Route data of the results of route searching processing is inputted from the pedestrian route searching means 112.

Step 125: In each of the areas, it is judged whether the pedestrians turn round the contour road from the starting point to the end point clockwise or counterclockwise. In case the pedestrians turn clockwise, icon information is prepared in such manner that advancing direction of vehicles is opposite to advancing direction of pedestrians. In case the pedestrians turn counterclockwise, it is prepared in such manner that advancing direction of vehicles is consistent with advancing direction of pedestrians. This is because, in the countries where vehicles are driven on the left side of road, vehicles are driven counterclockwise on the lane closer to outer periphery of the pedestrian area.

Figure 87:
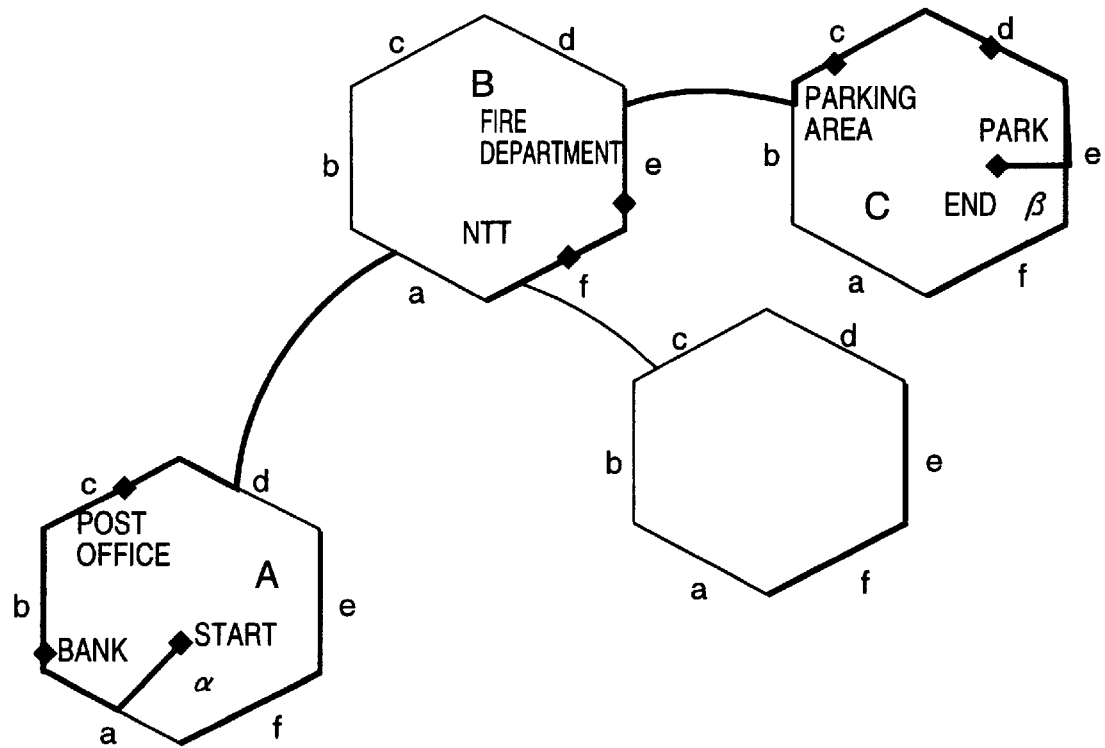
FIG. 87 is a drawing to show results of route searching with priority on contour road.

Step 130: When facility data are assigned to the street along the route, icon information to match the facility data is outputted. In the example of FIG. 87, when going round the contour street of the area A, there is a bank on the street "b", and a mark for bank is displayed. There is a post office on the street "c", and a mark for post office is displayed. In this case, if these facilities are on this side (as seen from the reader) of the contour road, marks of these facilities are displayed under an arrow, which indicates advancing direction of the pedestrian. If these facilities are on the other side of the contour road, marks of these facilities are displayed above the arrow. In case advancing direction of vehicles is consistent with advancing direction of pedestrians, a vehicle mark facing toward the direction of the arrow is displayed under the arrow. In case advancing direction of vehicles is opposite to advancing direction of the pedestrians, a vehicle mark facing toward the direction opposite to the arrow is displayed above the arrow. Also, a distance to a pedestrians' crossing to go over to the next area is displayed on the side of an arrow without vehicle mark.

Step 140: Going from an area to the next area is displayed by drawing a pedestrians' crossing in front of an arrow.

Step 150: Procedure from Step 125 to Step 140 is repeated from the area of the starting point to the area of the end point. In the area B, advancing direction of pedestrians is counterclockwise from the street "a" to the street "e", and a vehicle mark facing toward the direction of the arrow is displayed under the arrow. The marks of pedestrians' crossing, NTT company and fire department which are found when going along the streets "a", "f" and "e" are displayed. Also, a distance from the pedestrians' crossing of the street "a" to the pedestrians' crossing of the street "e", i.e. end point of the area B, is displayed. Similarly, in the area C, advancing direction of pedestrians is clockwise, and a vehicle mark facing toward the direction opposite to the arrow is displayed above the arrow, and marks of parking area and park which are found when going along the streets "c" and "d" are displayed. Also, a distance from pedestrians' crossing of the street "b" to the street "e" is displayed.

Figure 91:
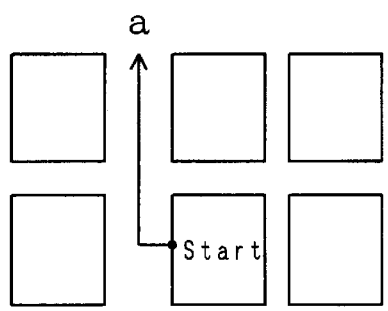
FIG. 91 shows a deformed map of the vicinity of a departure point.
Figure 92:
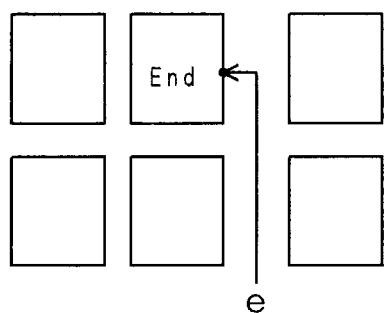
FIG. 92 shows a deformed map of the vicinity of an arrival point.

For the starting point area A, a route from the searched starting point to the nearest street "a" of the contour road is displayed on a map as shown in FIG. 91. For the end point area C, a route from the nearest street "e" to the end point is displayed on a map as shown in FIG. 92.

Thus, the present system can provide guidance with priority on the contour road with heavy traffic and give instruction on advancing direction of pedestrians in relation with the flow of vehicles. For this reason, pedestrians can easily understand which route should be followed even when there is no direct indication such as map or landmark when they are away from the departure point and the destination.

In the present system, a route guidance is provided by icons. By preparing characters to match landmarks, arrows, vehicles, etc. on the portable terminal equipment, it is possible to decrease the amount of data transfer to the portable terminal equipment.

10th Embodiment

In the pedestrian information providing system of the tenth embodiment, map data to be offered are deformed, and the amount of data to be transferred to the portable terminal equipment is decreased.

In the present system, when the pedestrian route searching means 112 searches a route for pedestrians, the input/output control means 111 deforms the data and sends it to the portable terminal equipment.

Figure 93:
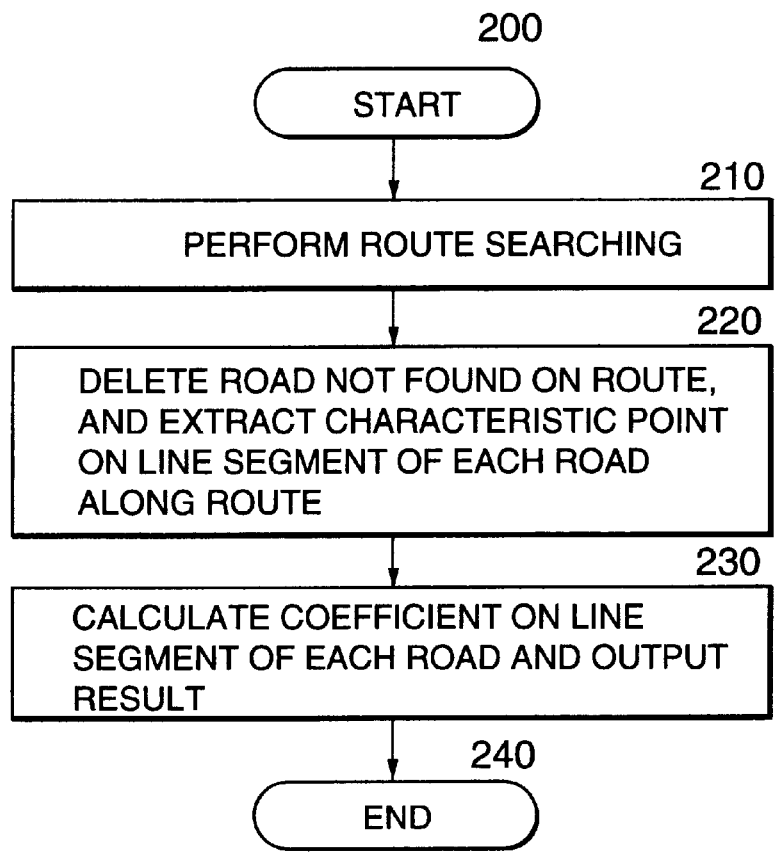
FIG. 93 is a flow chart showing procedure of input/output control means for providing deformed display using polynomial function in a tenth embodiment.

The input/output control means 111 performs this deforming processing according to the procedure shown in FIG. 93.

Step 210: When route search processing by the pedestrian route searching means 112 is completed and map data and the searched route are inputted;

Step 220: The input/output control means 111 deletes a road not found along the route from the map data and extracts characteristic points on line segment of each road along the route.

Figure 94:
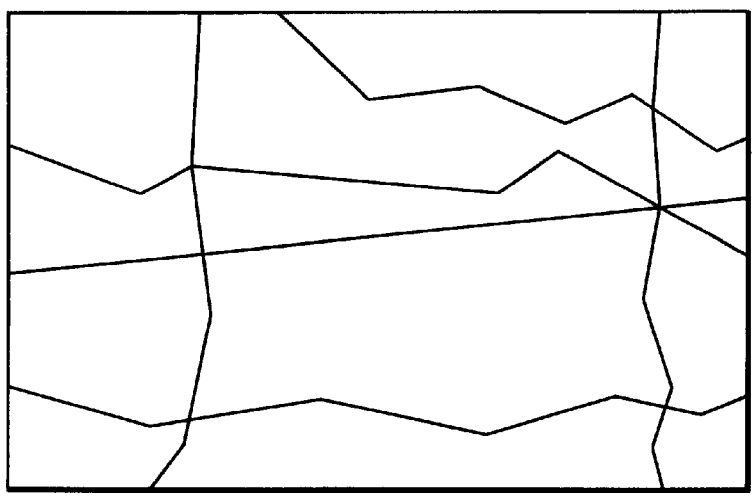
FIG. 94 shows a map before deforming.
Figure 95:
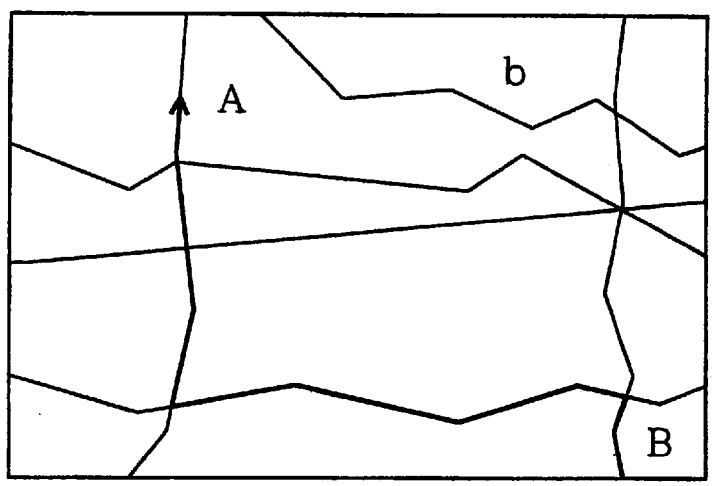
FIG. 95 represents a map showing results of route searching.
Figure 96:
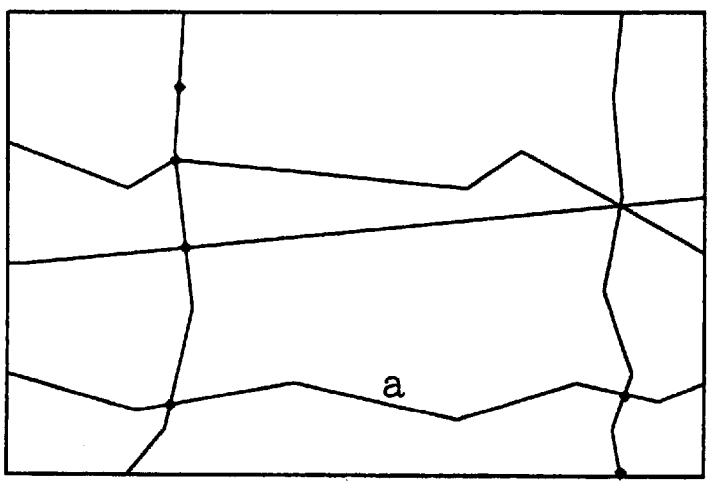
FIG. 96 represents a map with intersections extracted.
Figure 97:
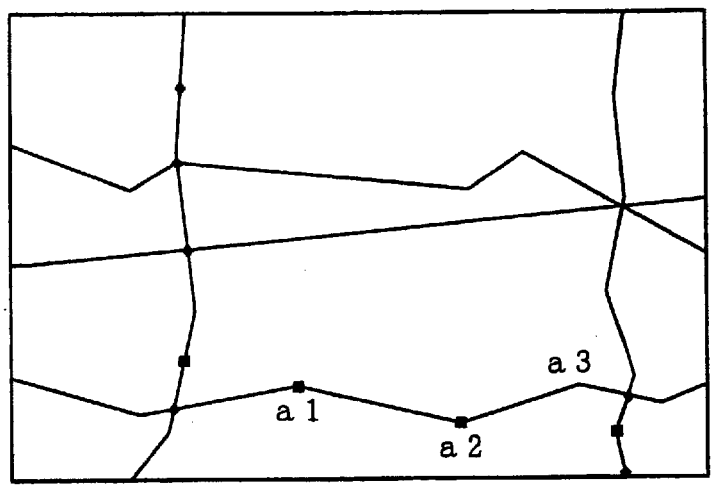
FIG. 97 represents a map with characteristic points extracted.

FIG. 94 shows an example of map data when deforming processing is performed, and FIG. 95 represents results of route search processing by the pedestrian route searching means 112. In Step 220, as shown in FIG. 96, departure point and destination of the route from A to B as indicated by thick lines and intersections where the route crosses the other roads are extracted. In FIG. 96, these points are indicated with black circles. Next, a road "b", which is not related to the route from A to B, is deleted. Then, as shown in FIG. 97, characteristic points along links connecting between the black circles are extracted. In FIG. 97, the extracted characteristic points are indicated with black rectangles. For the link "a", points a1 and a2 are extracted as characteristics points, and point a3 is not extracted as characteristic point.

Step 230: The input/output control means 111 draws a curve, which passes through black circles along each link and has black rectangles as interpolation points, using polynomial approximate function. Coefficient of the function is calculated, and coordinates of starting point and end point of each link and the calculated coefficient are outputted to the portable terminal equipment.

For example, when a value:

$$y = a_n x^n + a_{n-1} x^{n-1} x^{n-1} + \ldots + a_0 x^0$$

is used as the polynomial approximate function, the values of coefficients a n, a n−1 ... and the value of x of the starting point and the end point of link are outputted to the portable terminal equipment as shown in FIG. 100. The portable terminal equipment introduces the given values to the polynomial approximate function, and x-y coordinates of the starting point and the end point of the link and shape of the link passing through the starting point and the end point are reproduced. In case of a road running along y-axis, link shape can be more easily given by a polynomial using inverse function. Thus, inverse function is used. In this case, an inverse function flag is added to facilitate the identification.

Figure 98:
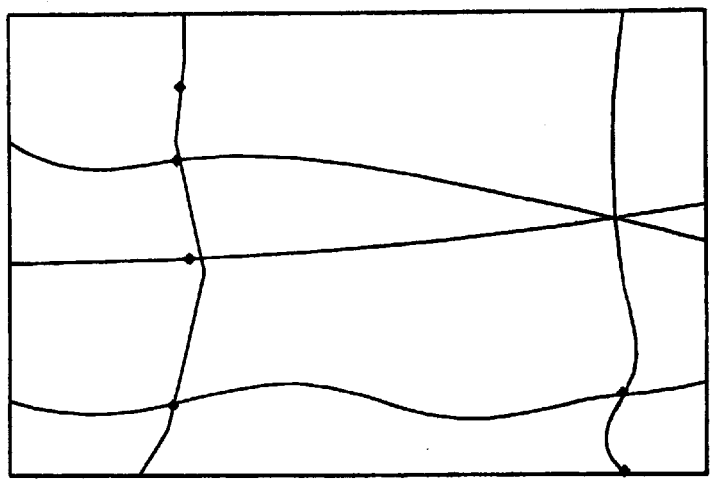
FIG. 98 represents a map to show deformed results of links having interpolation point.

FIG. 98 shows a deformed map, which can be reproduced at the portable terminal equipment. On a deformed map, a route shown in FIG. 99 is displayed.

Thus, in the present system, the amount of data to be transferred to the portable terminal equipment can be reduced by deforming of the map. For this reason, it is possible to provide route information to the portable terminal equipment at high speed. Also, it is possible to transfer a plurality of geographical information to the portable terminal equipment and to display a plurality of maps simultaneously on the screen of the portable terminal equipment.

11th Embodiment

In the pedestrian information providing system of the eleventh embodiment, unlike the case of the tenth embodiment, map data are deformed using the moving average method. The input/output control means of this system performs the deforming processing according to the procedure shown in FIG. 101.

Step 310: When route search processing by the pedestrian route searching means 112 is completed and the map data and the searched route are inputted;

Step 320: The input/output control means 111 extracts departure point and destination of this route and also intersection where this route crosses the other roads from the map data. Also, roads not found along the route are deleted, and an interpolation point of the links connecting between the intersections is obtained by 3-point moving average method.

Figure 102:
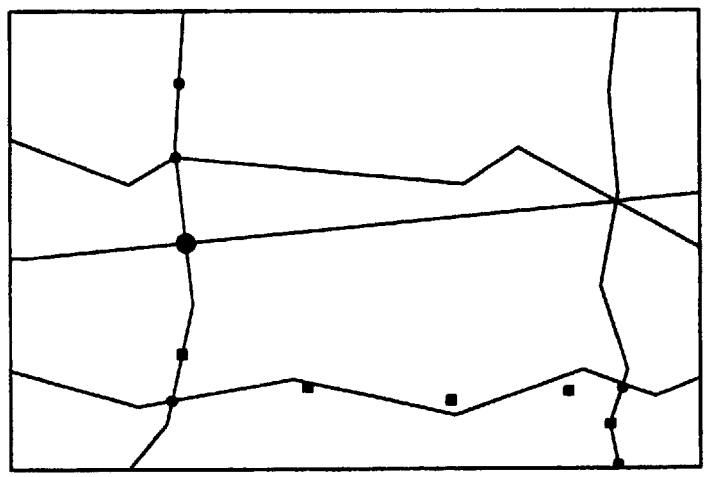
FIG. 102 shows a map before deforming.

It is now supposed that the deforming processing is performed on the map of FIG. 94 and that the result of route search processing by the pedestrian route searching means 112 is as shown in FIG. 95. The extraction of departure point and destination of the route and the intersection and deletion of the road not found along the route in Step 320 are performed by the same procedure as in the tenth embodiment. The departure point, destination and intersections thus extracted are indicated with black circles in FIG. 102. For the links connecting between intersections, coordinates of geographical points at every constant distance along the link are obtained. By deviating these points one by one, average value of coordinates to 3 geographical points is calculated. The average point is set as an interpolation point. In FIG. 102, the interpolation points are indicated with black rectangles.

Step 330: The input/output control means 111 outputs coordinate data of the departure point, destination points, intersections and interpolation points of the route thus obtained to the portable terminal equipment.

Figure 103:
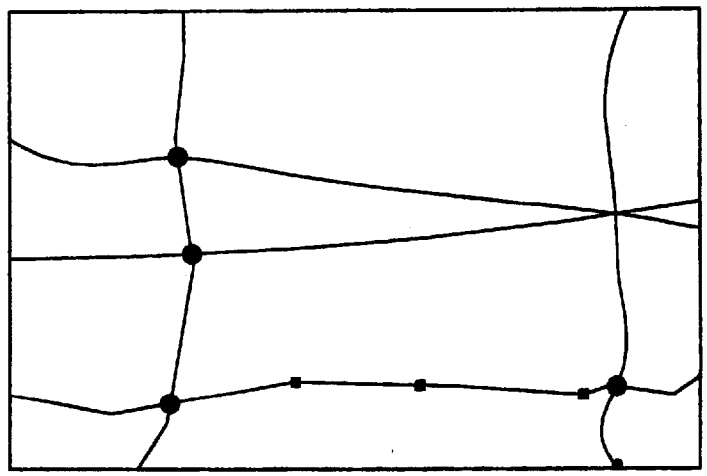
FIG. 103 shows a deformed map.
Figure 104:
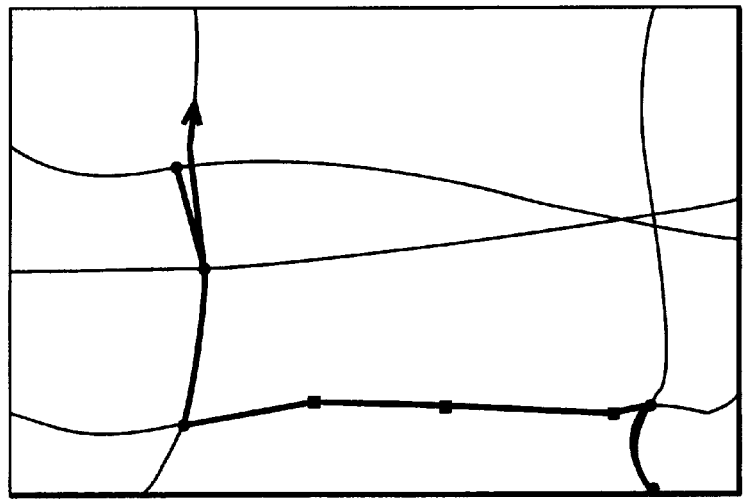
FIG. 104 represents a map showing a route on the deformed map.

In the portable terminal equipment, a map as shown in FIG. 103 is displayed by connecting these points, and the searched route is displayed as shown in FIG. 104. In this way, according to the present system, the map is deformed by simple calculation, and the amount of data to be transferred to the portable terminal equipment can be reduced.

12th Embodiment

Figure 106:
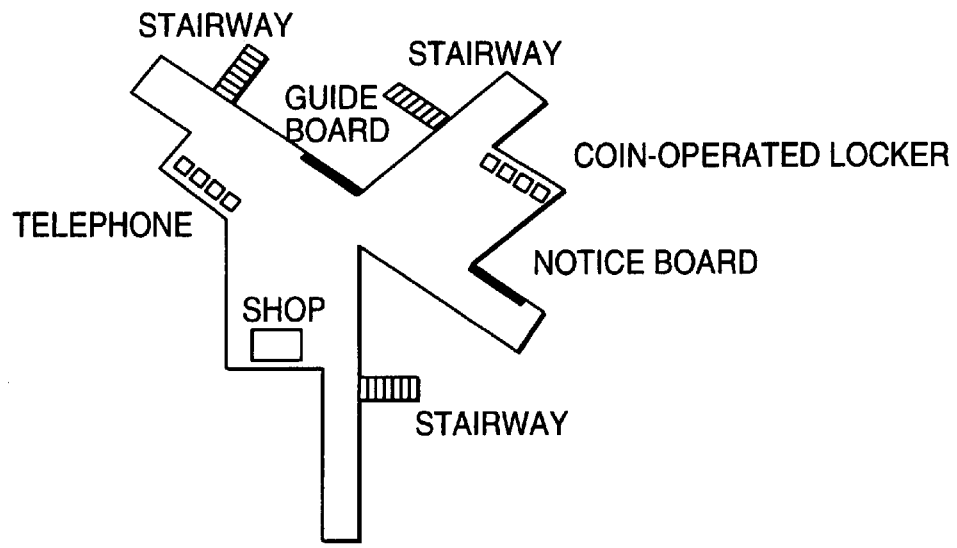
FIG. 106 is a schematical drawing of a premise.

In the pedestrian information providing system of the twelfth embodiment of the invention, guidance is provided on a route in underground shopping center or in a building by indicating what can be seen on lateral sides when pedestrians advance along the route. In the pedestrian map data 13 of this system, map data showing a premise such as underground shopping center/buildings shown in FIG. 106 are retained. Also, as the data of the facilities in the premise, graphic data of the facilities given below, attribute information such as position, height, etc. are retained:

Notice board/guide board/escalator/elevator/toilet/coin locker/telephone box/hydrant/stairway/emergency exit/shops/clocks/(train stop position/vehicle number)/information of nodes and links in the premise The structure of the data of the facilities is the same as that of the data of normal facilities.

Figure 107:
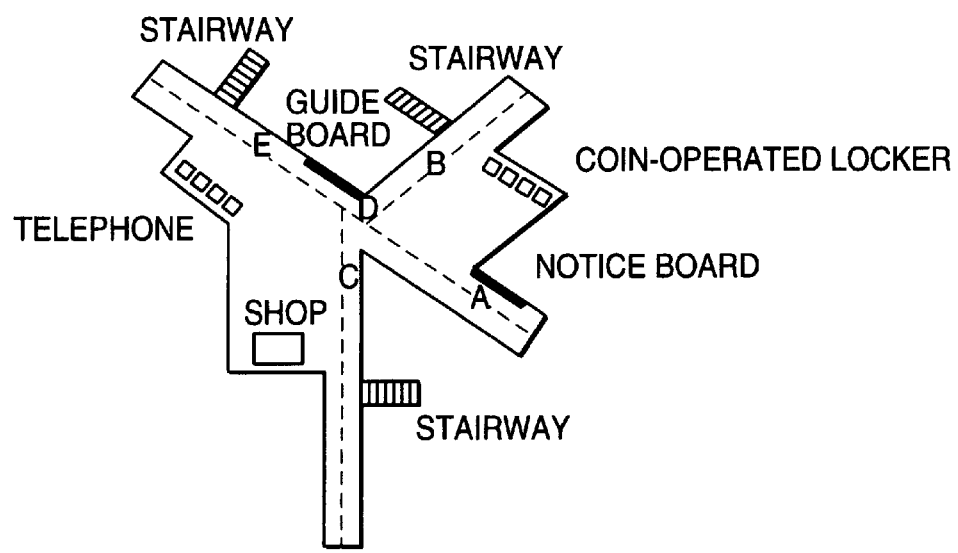
FIG. 107 is a schematical drawing to show information of street in a premise by broken line.

From the map data of FIG. 106, the data of the streets in the premise as shown by broken lines in FIG. 107 are generated by the pedestrian map data generating and editing means 115 (the sixth embodiment), and these street data are retained in the pedestrian map data 13. The structure of the street data is the same as that of the normal street data.

Figure 105:
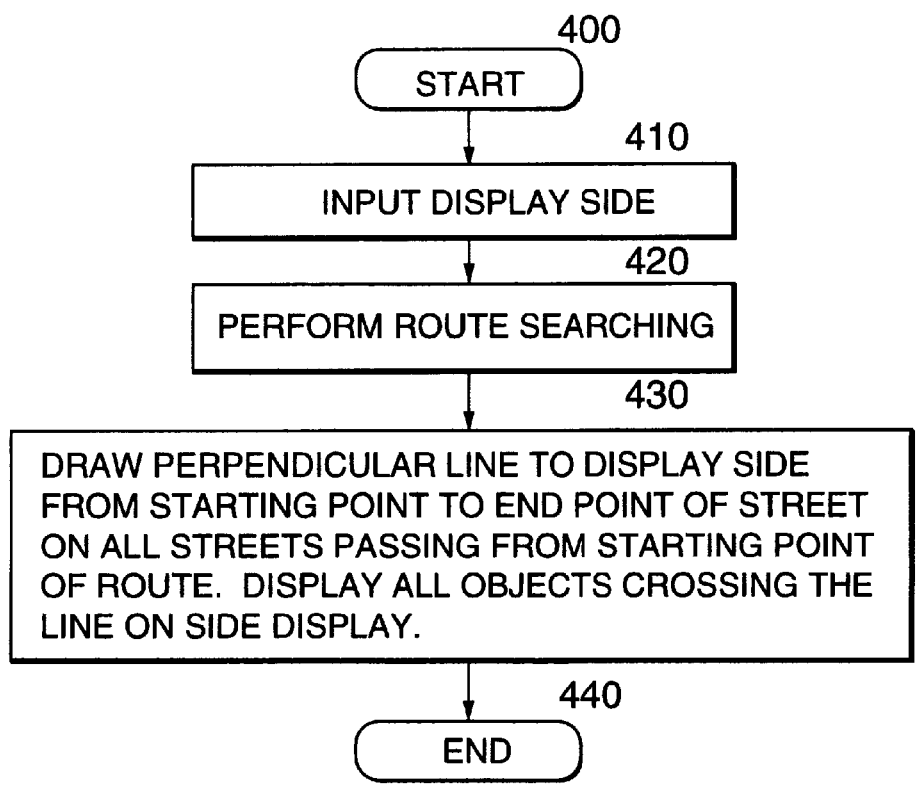
FIG. 105 is a flow chart showing procedure of input/output control means for preparing a side view of a twelfth embodiment.

The pedestrian route searching means 112 searches a route in the premise using the street data in the premise, and the results of searching are outputted to the input/output control means 111. Upon receipt of these data, the input/ output control means 111 reads graphic data of the pedestrian map data 13 and provides information on a side view of the premise along the pedestrian route. The input/output control means 111 performs this operation according to the procedure shown in FIG. 105. Here, description will be given on a case where a street is passed through in the order of A→D→E as a route.

Step 410: The user specifies either the right side or the left side as a lateral view to be displayed (it is supposed that the right side is specified in this case).

Step 420: When the searched routes A, D and E are inputted from the pedestrian route searching manes 112;

Step 430: The input/output control means 111 follows this route sequentially and draws a perpendicular line on the right side of each of all streets passing through, and objects, which cross the perpendicular lines, are displayed on after another.

Figure 108:
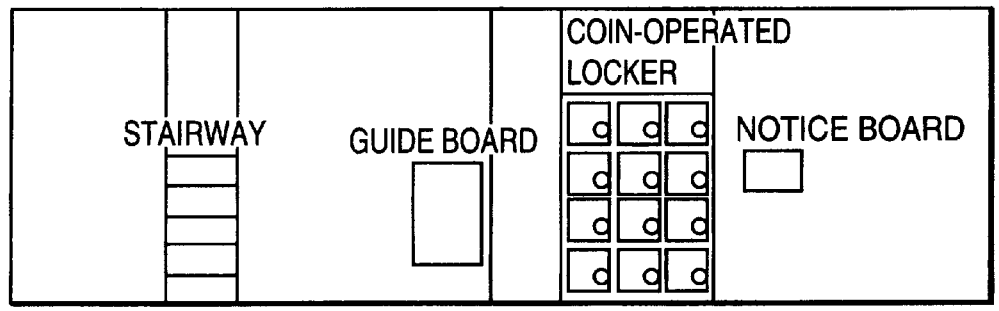
FIG. 108 is a drawing to show a premise from lateral side.

FIG. 108 shows a side view to be displayed on the screen of the portable terminal equipment according to graphic data outputted from the input/output control means 111. First, when we look at the right side of the street A in FIG. 107, wall/notice board/corner/coin-operated locker/corner/wall can be seen one after another. The input/output control means 111 refers to the corresponding facility data, determines size of characters and displays them. Next, along the street D, wall/corner/guide board can be seen, and these are displayed. Next, for the street E, guide board/wall/stairway can be seen, and these are displayed. On the street E, the route in the premise comes to an end, and the processing is terminated.

As described above, it is possible in the present system to provide guidance on a route in the premise by side view.

Figure 109:
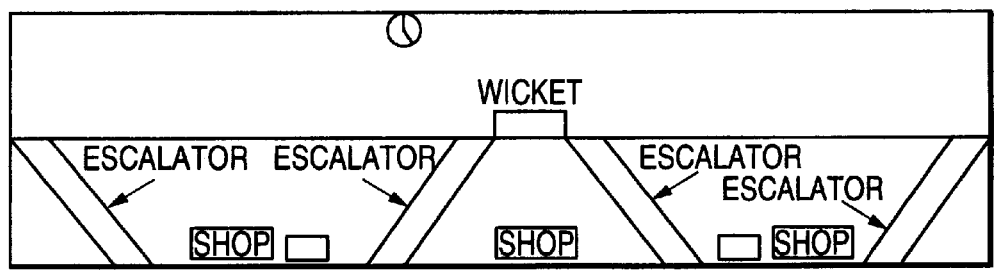
FIG. 109 is a drawing to show a platform in a station from lateral side.
Figure 110:
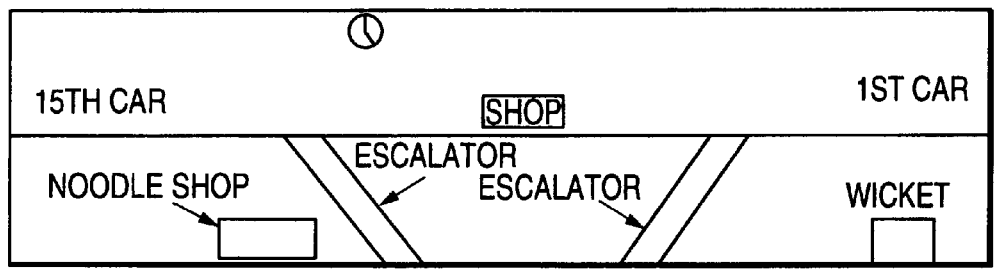
FIG. 110 represents another drawing to show a platform in a station from lateral side.

Also, it is possible in this system to provide guidance not only for underground shopping center or in a building, but also for platform of a station. FIG. 109 and FIG. 110 each represents an example of a station platform displayed from lateral side. In the guidance for the premise of a station, side view of platform is generated and registered in advance according to the procedure described above for each station, and the registered side view may be displayed upon request of the user on route guidance.

13th Embodiment

In the thirteenth embodiment of the invention, description will be given on a method to directly search a route between two points from a vector diagram of the premise.

Figure 117:
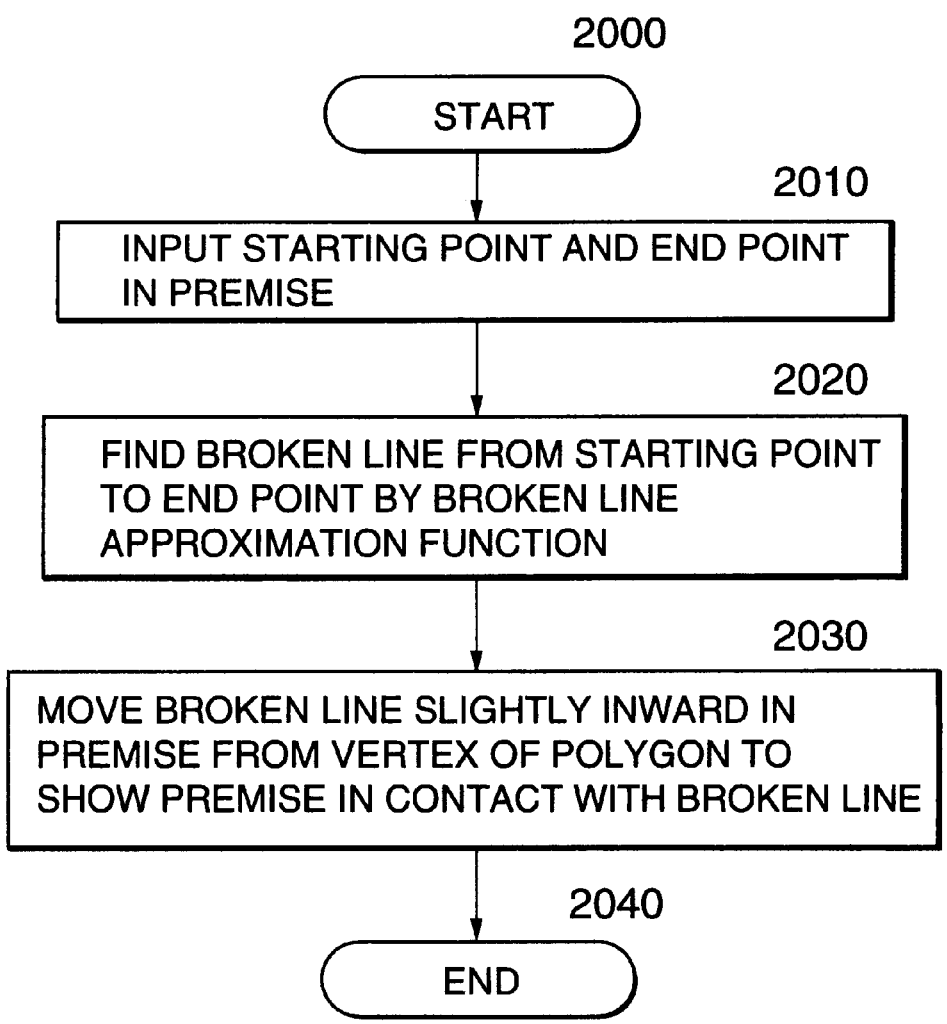
FIG. 117 is a flow chart to show procedure of a pedestrian route searching means for searching a route from a premise vector drawing in a thirteenth embodiment.

The pedestrian route searching means 112 can search a route in the premise according to the procedure of FIG. 117 even when street data of the premise are not prepared satisfactorily.

Figure 118:
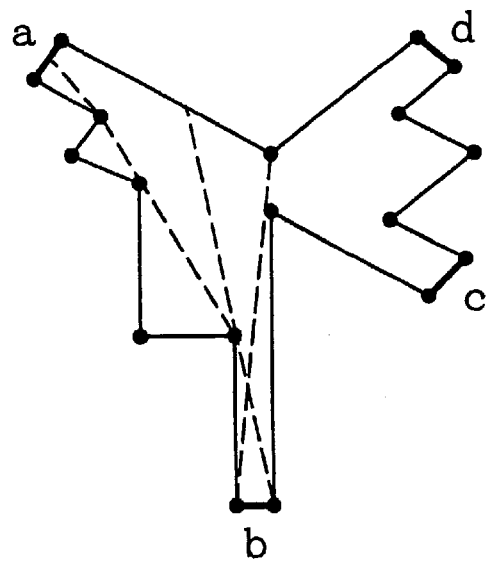
FIG. 118 shows an example of a premise drawing.
Figure 119:
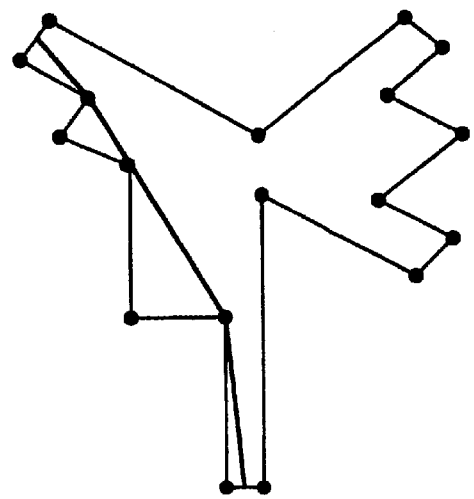

Step 2010: For example, when a starting point "b" and an end point "a" are inputted in a premise drawing shown in FIG. 118;

Step 2020: The pedestrian route searching means 112 obtains a vertex, which interrupts light beam for the first time when the light beam is irradiated from the starting point "b" toward the end point "a". Next, from this vertex, the light beam is irradiated in the same manner, and a vertex is obtained, which interrupts the light beam for the first time when the irradiating direction of the light beam is moved toward the end point "a". By repeating this procedure until the light beam reaches the end point "a", a broken line approximate function from "b" to "a" as indicated by black thick line in FIG. 119 is obtained.

Figure 120:
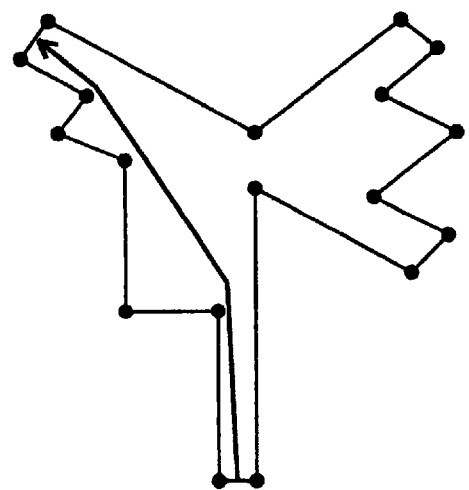

Step 2030: Next, as shown in FIG. 120, bending point of the broken line at the vertex of a polygon of the premise drawing is slightly moved toward inner side of the premise, and the broken line is separated from the vertex of the polygon of the premise drawing.

Figure 121:
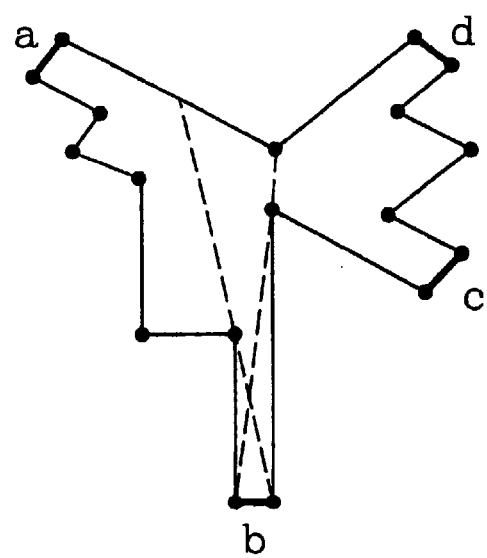
Figure 122:
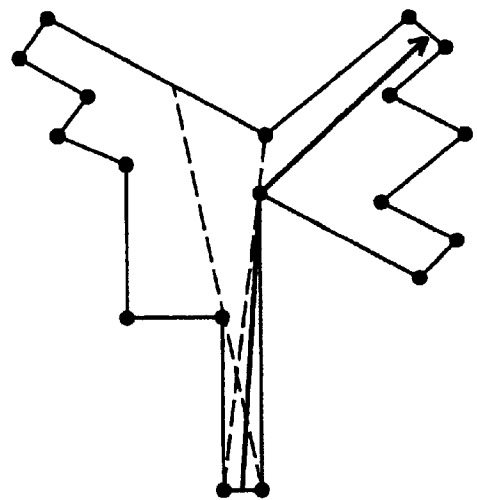
Figure 123:
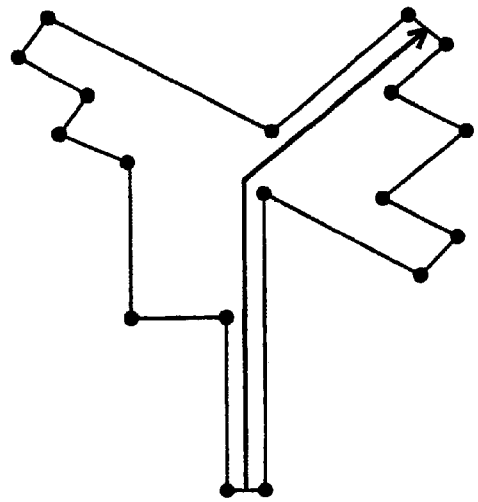

FIG. 121 to FIG. 123 each represents a procedure to obtain a route from the starting point "b" to the end point "d" by the same method. Thus, it is possible according to the present system to directly search a route in the premise from a vector diagram of the premise even when the street data of the premise are not available.

Figure 124:
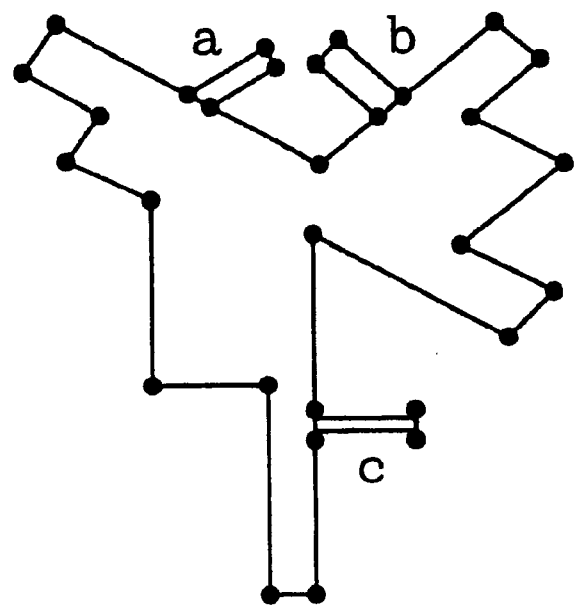

As shown in FIG. 124, in case there are blind alleys such as "a", "b" and "c" in the premise map, by performing processing to remove excessive leaves (alleys) in advance, it is possible to reduce the amount of calculation in the street extraction processing in the sixth embodiment or in the route search processing by broken line approximation in the thirteenth embodiment.

14th Embodiment

In the pedestrian information providing system of the fourteenth embodiment, shape of intersections of the route for pedestrians are presented to pedestrians in a manner easily visible. The input/output control means 11 of the present system enlarges and displays the intersection by the procedure shown in FIG. 135.

Step 2010: Intersections along the searched route for pedestrian are extracted.

Step 2020: By referring to information such as town information recorded on the pedestrian map data 13, a map of the vicinity of the intersection is prepared, and this is attached on the extracted intersection.

FIG. 136 shows a route for pedestrians thus searched, and FIG. 137 represents enlarged maps each attached near each intersection on the map. By overlapping the enlarged view of intersection on the map, pedestrians can more easily understand the route to be followed than the case where these are displayed separately. The enlarged view of the intersection may be overlapped near the intersection on the map.

In this way, the pedestrian information providing system of the present invention can provide information useful for pedestrians in a manner easily understandable as explained in connection with the above embodiments. Various types of data as illustrated here are presented simply as examples. The invention is not limited to these examples, and various modifications and additions can be made. For example, a place of a bench for elderly people may be added as attribute of the street data, and more elaborate route searching information can be provided for elderly people.

In the embodiments described above, description has been given on the terminal equipment on the user side, provided with an arrangement of a pedestrian information processing unit 11, which reads the pedestrian map data 13 stored in a storage unit at the center and performs a predetermined processing and displays the result of the processing to the screen of the terminal equipment, while it may be designed in such manner that a storage unit with pedestrian map data recorded may be incorporated in advance in the user terminal, i.e. the portable terminal equipment. In this case, wireless communication between the center and the portable terminal equipment is not required.

As it is evident from the above description, upon request from the user, who is a pedestrian, the pedestrian information providing system of the present invention can execute searching of the corresponding map and route searching at high speed and can provide various types of information useful for pedestrians and suitable for walking condition. Also, it is possible to provide guidance information for underground shopping centers, buildings, intersections or contour roads in a manner easily understandable for pedestrians. Further, it is possible to provide information quickly to the portable terminal equipment because the amount of data transfer can be reduced.

What is claimed is:

1. A pedestrian information providing system, comprising:

a storage unit for storing pedestrian map data for storing data of an area divided to a non-pedestrian area where pedestrians cannot walk freely and a pedestrian area where pedestrians can walk freely, a data of street where pedestrian can walk in each of said areas, a data of block where pedestrians cannot walk in each of said areas, an index for searching said block or said street from an address or a name, and a table where said areas belonging to each section on a map are described; and a pedestrian information processing unit, comprising an input/output means for receiving input from a user, a pedestrian map data searching means for acquiring a pedestrian map data suitable for inputting from said storage unit, a pedestrian route searching means for searching a route for pedestrians using said data acquired, wherein a pedestrian map data required is acquired from said storage unit upon an input instruction from said user and an information to be presented is generated.

2. A pedestrian information providing system according to claim 1, wherein said data of area comprises an area ID, an area ID of an adjacent area, a data of entrance and exit to and from the adjacent area, IDs of blocks and streets belonging to the areas, and a data indicating positions of the areas on a map, said data of block comprises a block ID, a block name, an ID of the belonging area, an ID of the street, to which an entrance of the block is connected, an address of the block, and a data showing position of a block on a map, said data of street comprises street ID, street name ID of the belonging area, attribute data peculiar to the street, connecting information between streets, address of street, and data showing positions of the starting point and the end point of the street on a map.

3. A pedestrian information providing system according to claim 2, wherein said data of said street comprise, geographic information of the street, information on attached facilities provided on roadside, and time-related information to indicate conditions varying over time of the street as inherent attribute data.

4. A pedestrian information providing system according to claim 2, wherein, in case said block is a building, the data of said block comprises 3-dimensional information for displaying said building 3-dimensionally.

5. A pedestrian information providing system according to claim 1, wherein a part of said block has an element of an area in it.

6. A pedestrian information providing system according to claim 1, wherein said pedestrian map data searching means comprises an address corresponding data searching means for searching data of block or street using an index from the inputted address.

7. A pedestrian information providing system according to claim 1, wherein said pedestrian map data searching means comprises a name corresponding data searching means for searching data of block or street using an index from the inputted name.

8. A pedestrian information providing system according to claim 1, wherein said pedestrian map data searching means comprises a latitude/longitude corresponding data searching means for searching a block corresponding to a latitude/longitude data for calculating a section on a map from an inputted latitude/longitude data, searches an area belonging to said section using said table, searches an area corresponding to said latitude/longitude data from said area, and searches a block corresponding to said latitude/longitude data.

9. A pedestrian information providing system according to claim 1, wherein said storage unit stores a town table describing various types of objects included in each area and blocks where the objects are present as classified for each area, and there is provided a nearest information searching means where said pedestrian map data searching means searches a block where the inputted objects are present by extending object area to be searched to adjacent area using said town table.

10. A pedestrian information providing system according to claim 1, wherein said pedestrian route searching means comprises an attribute determining means for determining attribute of a route to be selected according to categories of pedestrian, time zone or weather inputted.

11. A pedestrian information providing system according to claim 10, wherein said attribute determining means determines said attribute using a neural net.

12. A pedestrian information providing system according to claim 10, wherein said pedestrian route searching means comprises a point-to-point route searching means for searching an optimal route from a departure point to a destination by giving consideration on the attribute determined by said attribute determining means.

13. A pedestrian information providing system according to claim 12, wherein said pedestrian map data searching means searches an optimal route between areas from the area of the departure point to an area of the destination, and then searches an optimal route of a street in each area along said optimal route by giving consideration on the attributes determined by said attribute determining means.

14. A pedestrian information providing system according to claim 10, wherein said pedestrian route searching means comprises a route searching means between a plurality of geographical points for searching an optimal route to go round from the departure point to a plurality of destinations by giving consideration on the attributes determined by said attribute determining means.

15. A pedestrian information providing system according to claim 10, wherein a transportation means data relating to lines and schedule of transportation means are stored in said storage unit, and said pedestrian route searching means comprises a route searching means for searching a route using transportation means for searching the nearest station of the departure point and the destination, searches an optimal route from the departure point and the destination to said nearest station by giving consideration on the attributes determined by said attribute determining means, and searches an optimal line from the station nearest to the departure point to the station nearest to the destination using said transportation means data.

16. A pedestrian information providing system according to claim 1, wherein said pedestrian information processing unit comprises a scheduling means for searching an optimal route after determining an order to visit destinations, for which visiting time is already determined, a visiting order to all destinations including a destination, for which visiting time is not determined, is determined, and an optimal route for visiting said destinations is searched.

17. A pedestrian information providing system according to claim 1, wherein said pedestrian information processing unit comprises a time simulation means for calculating time required from a departure point to a destination when a searched route is followed.

18. A pedestrian information providing system according to claim 1, wherein said pedestrian information processing unit comprises a transportation means determining means, whereby a route from a departure point to a destination using all transportation means is searched, and by comparing the time required form the departure point to the destination through each of these routes, a transportation means to be used is determined.

19. A pedestrian information providing system according to claim 1, wherein there is provided a pedestrian map data generating means for preparing said pedestrian map data from a road map.

20. A pedestrian information providing system according to claim 1, wherein there is provided a pedestrian map data generating means for preparing said pedestrian map data from a street map.

21. A pedestrian information providing system according to claim 1, wherein said pedestrian route searching means searches with priority a contour street on outer periphery of the pedestrian area as a route for pedestrians.

22. A pedestrian information providing system according to claim 21, wherein streets of a pedestrian area are divided to contour streets and streets within the area and are stored in said storage unit, and said contour streets are sequentially arranged clockwise or counterclockwise from a starting point.

23. A pedestrian information providing system according to claim 1, wherein said pedestrian route searching means provides guidance on a searched route by associating with advancing direction of vehicles.

24. A pedestrian information providing system according to claim 1, wherein a route searched by said pedestrian route searching means is converted to a route guidance information in icons displayed by characters.

25. A pedestrian information providing system according to claim 1, wherein a route searched by said pedestrian route searching means is display after its original shape is deformed.

26. A pedestrian information providing system according to claim 25, wherein said deforming processing is performed using a polynomial function.

27. A pedestrian information providing system according to claim 25, wherein said deforming processing is performed by calculating moving average of coordinates of the searched route.

28. A pedestrian information providing system according to claim 1, wherein guidance is provided for a route in a premise searched by said pedestrian route searching means using a side view of the premise as seen from said route.

29. A pedestrian information providing system according to claim 28, wherein graphic information and attribute information relating to each of facilities in the premise are stored in said storage unit.

30. A pedestrian information providing system according to claim 1, wherein there is provided a pedestrian map data generating means for preparing street information in a premise using a Voronoi diagram.

31. A pedestrian information providing system according to claim 1, wherein said pedestrian route searching means searches a route in a premise by broken line function approximation using a map data of the premise.

32. A pedestrian information providing system according to one of claim 28, wherein said premise is a premise of an underground shopping center, a building, or a station.

33. A pedestrian information providing system according to claim 19, wherein said pedestrian map data generating means picks up a region of pedestrian area and contour street of said region from a road map, generates data of the pedestrian area by incorporating information of street block in said pedestrian area from a street map, and corrects the data of said contour street to follow said street block.

34. A pedestrian information providing system according to claim 33, wherein said pedestrian map data generating means searches position after correction of said contour street using convex closure method.

35. A pedestrian information providing system according to claim 33, wherein said pedestrian map data generating means searches position after correction of said contour street by sequentially connecting vertexes of a street block where perpendicular lines to the nearest contour street can be drawn without crossing borderline of the street block.

36. A pedestrian information providing system according to claim 33, wherein said pedestrian map data generating means searches position after correction of said contour street by sequentially connecting borderlines of the outermost street block, which cross a straight line extending from the center of said pedestrian area.

37. A pedestrian information providing system according to claim 1, wherein said pedestrian route searching means provides an enlarged view of an intersection along the searched route by overlapping said enlarged view on a map to show said route.

38. A pedestrian information providing system according to claim 35, wherein vertexes or borderlines of said street block to find out a position after correction are limited to vertexes or borderlines within a predetermined distance from said contour street, and said distance is changed according to road width of said contour street.

39. A pedestrian information providing system according to claim 19, wherein said pedestrian map data generating means forms as many nodes as equal to number of links connected to said nodes from each node on a basic road on a road map, each of said formed nodes is connected only with two adjacent links forming different internal angles within said link, and a pedestrian area is generated by following the formed nodes.

40. A pedestrian information providing system according to claim 19, wherein said pedestrian map data generating means performs route searching for all bearings from an arbitrary node on a road map, and a pedestrian area is generated by grouping nodes and links of all roads where each of tips of the route searching passes through until the basic road is reached.

41. A pedestrian information providing system according to claim 19, wherein said pedestrian map data generating means calculates flow rate ot pedestrians in each link with the pedestrian area, and in case there is a link where said flow rate exceeds a predetermined value, said link is considered as a street going over a non-pedestrian area, and a non-pedestrian area is generated within said pedestrian area.

42. A storage unit for storing a pedestrian map data used in a pedestrian information providing system, which comprises a storage unit for storing a pedestrian map data, and a pedestrian information processing unit for acquiring pedestrian map data required from said storage unit for storing pedestrian map data and for generating information to be offered, said storage unit comprising a data of an area divided to
a non-pedestrian area where pedestrians cannot walk freely and a pedestrian area where pedestrians can walk freely, a data of street where pedestrians can walk within each of said areas, a data of block where pedestrians cannot walk in each of said areas, an index for searching said block or said street from an address or a name, and a table describing said areas belonging to each section on a map.

43. A pedestrian information processing unit used for a pedestrian information providing system, which comprises a storage unit for storing a pedestrian map data, and a pedestrian information processing unit for acquiring a pedestrian map data required from said storage unit for storing pedestrian map data and for generating information to be offered, said pedestrian information processing unit comprising an input/output control means for receiving input from a user, a pedestrian map data searching means for acquiring a pedestrian map data suitable for inputting from said storage unit, and a pedestrian route searching means for searching a route for pedestrians using said data acquired, and a pedestrian map data required is acquired from said storage unit according to input instruction from said user and an information to be offered is generated.

* * * * *